(12) United States Patent
Ortiz et al.

(10) Patent No.: US 11,934,540 B2
(45) Date of Patent: Mar. 19, 2024

(54) SYSTEM AND METHOD FOR MULTIPARTY SECURE COMPUTING PLATFORM

(71) Applicant: ROYAL BANK OF CANADA, Toronto (CA)

(72) Inventors: Edison U. Ortiz, Orlando, FL (US); Arya Pourtabatabaie, Orlando, FL (US); Ambica Pawan Khandavilli, Orlando, FL (US); Margaret Inez Salter, Orlando, FL (US); Jordan Alexander Richards, Orlando, FL (US); Iustina-Miruna Vintila, Bucharest (RO); David Ian McKay, Toronto (CA); Christoph Knoess, Sag Harbor, NY (US); Justin Simonelis, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 187 days.

(21) Appl. No.: 17/474,012

(22) Filed: Sep. 13, 2021

(65) Prior Publication Data
US 2022/0108026 A1 Apr. 7, 2022

Related U.S. Application Data

(63) Continuation-in-part of application No. 17/169,221, filed on Feb. 5, 2021, which is a continuation of (Continued)

(51) Int. Cl.
| | |
|---|---|
| *H04L 29/06* | (2006.01) |
| *G06F 12/14* | (2006.01) |
| *G06F 21/60* | (2013.01) |
| *G06N 20/00* | (2019.01) |
| *H04L 9/08* | (2006.01) |
| *H04L 9/32* | (2006.01) |

(52) U.S. Cl.
CPC ........ *G06F 21/602* (2013.01); *G06F 12/1408* (2013.01); *G06N 20/00* (2019.01); (Continued)

(58) Field of Classification Search
None
See application file for complete search history.

(56) References Cited

U.S. PATENT DOCUMENTS

| | | | |
|---|---|---|---|
| 8,161,527 B2 * | 4/2012 | Curren | ................ G06F 21/6227 726/28 |
| 9,560,014 B2 | 1/2017 | Grobman et al. | |

(Continued)

OTHER PUBLICATIONS

Canadian Intellectual Property Office (CIPO), International Search Report and Written Opinion against PCT Application No. PCT/CA2022/050430, dated Apr. 27, 2022.

(Continued)

*Primary Examiner* — Maung T Lwin
(74) *Attorney, Agent, or Firm* — Norton Rose Fulbright Canada LLP

(57) ABSTRACT

Systems, methods, and corresponding non-transitory computer readable media describe a proposed system adapted as a platform governing the loading of data in a multiparty secure computing environment. In the multiparty secure computing environment described herein, multiple parties are able to load their secure information into a data warehouse having specific secure processing adaptations that limit both access and interactions with data stored thereon.

20 Claims, 48 Drawing Sheets

Related U.S. Application Data application No. 16/424,242, filed on May 28, 2019, now Pat. No. 10,956,585.

(60) Provisional application No. 63/189,611, filed on May 17, 2021, provisional application No. 63/164,444, filed on Mar. 22, 2021, provisional application No. 63/141,788, filed on Jan. 26, 2021, provisional application No. 63/130,540, filed on Dec. 24, 2020, provisional application No. 63/077,368, filed on Sep. 11, 2020, provisional application No. 63/077,373, filed on Sep. 11, 2020, provisional application No. 62/824,697, filed on Mar. 27, 2019, provisional application No. 62/806,394, filed on Feb. 15, 2019, provisional application No. 62/697,140, filed on Jul. 12, 2018, provisional application No. 62/691,406, filed on Jun. 28, 2018, provisional application No. 62/677,133, filed on May 28, 2018.

(52) U.S. Cl.
CPC ............ *H04L 9/0844* (2013.01); *H04L 9/321* (2013.01); *H04L 9/3247* (2013.01); *G06F 2212/1052* (2013.01)

(56) References Cited

U.S. PATENT DOCUMENTS

| | | | |
|---|---|---|---|
| 2005/0289119 | A1 | 12/2005 | Weinberg et al. |
| 2007/0011736 | A1* | 1/2007 | Kalibjian ............... G06F 21/52 726/14 |
| 2010/0251360 | A1* | 9/2010 | Sinclair ................. H04L 9/3234 726/19 |
| 2013/0191223 | A1 | 7/2013 | Harris et al. |
| 2013/0339729 | A1* | 12/2013 | Novak .................... G06F 21/57 713/167 |
| 2015/0156174 | A1 | 6/2015 | Fahey et al. |
| 2016/0028728 | A1* | 1/2016 | Hampel ................ H04L 9/3234 713/181 |
| 2016/0105402 | A1 | 4/2016 | Soon-Shiong et al. |
| 2017/0323029 | A1 | 11/2017 | Rissanen |
| 2018/0096137 | A1 | 4/2018 | Trostle et al. |
| 2018/0212939 | A1 | 7/2018 | Costa |
| 2019/0042937 | A1 | 2/2019 | Sheller et al. |
| 2019/0318102 | A1* | 10/2019 | Araya ................... H04L 9/0891 |
| 2019/0362083 | A1 | 11/2019 | Ortiz et al. |
| 2020/0014691 | A1 | 1/2020 | Ortiz et al. |

OTHER PUBLICATIONS

Priebe C. et al., Enclave DB: A Secure Database using SGX, 2018 IEEE Symposium on Security and Privacy (SP), May 24, 2018, pp. 264-278, online, retrieved on Apr. 6, 2022, <DOI:10.1109/SP.2018.00025>.

Canadian Intellectual Property Office (CIPO), International Search Report and Written Opinion against PCT Application No. PCT/CA2021/051273, dated Dec. 7, 2021.

Canadian Intellectual Property Office (CIPO), International Search Report and Written Opinion against PCT Application No. PCT/CA2021/051272, dated Dec. 1, 2021.

United States Patent & Trademark Office (USPTO), Non Final Rejection issued to U.S. Appl. No. 17/474,007, dated Feb. 9, 2024.

\* cited by examiner

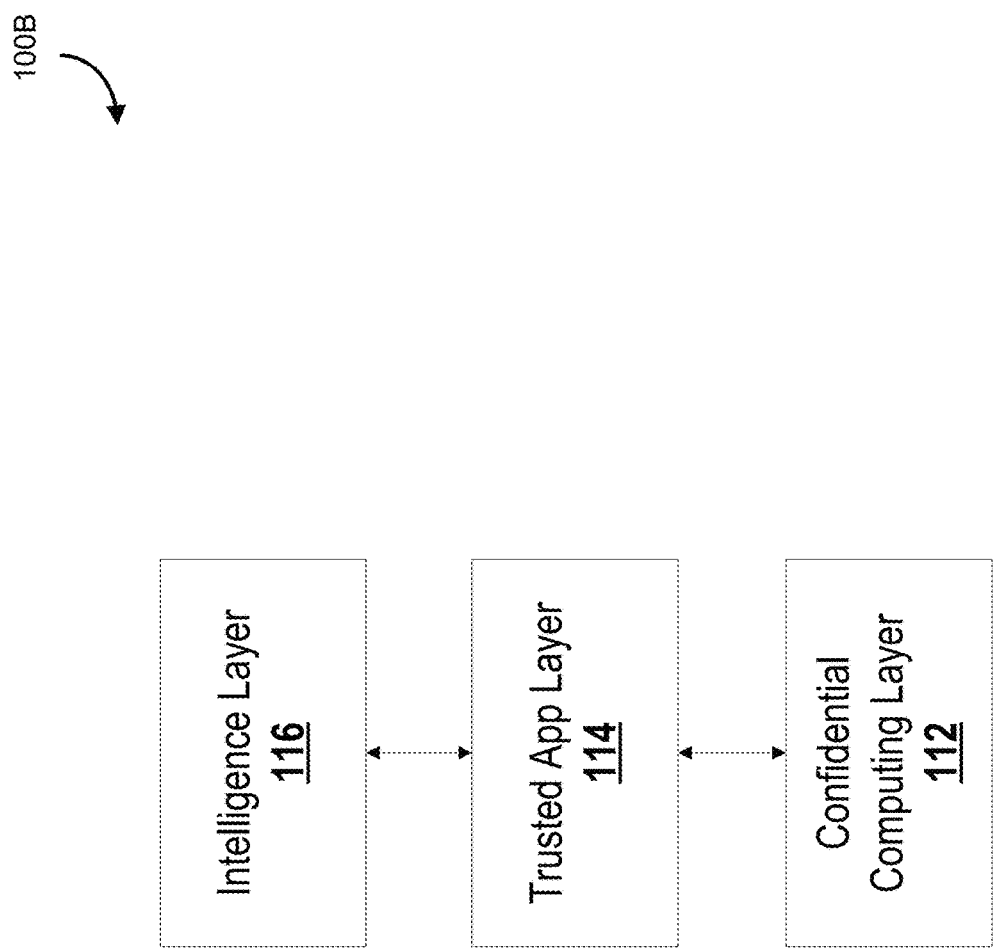

SYSTEM AND METHOD FOR MULTIPARTY SECURE COMPUTING PLATFORM

CROSS-REFERENCE

This application is a non-provisional of, and claims all benefit including priority to, U.S. Provisional Application Nos. 63/077,373, 63/077368, both filed Sep. 11, 2020, and entitled SYSTEM AND METHOD FOR DATA PROCESS CONTROL IN MULTIPARTY SECURE COMPUTING ENVIRONMENT and SYSTEM AND METHOD FOR LOADING SECURE DATA IN MULTIPARTY SECURE COMPUTING ENVIRONMENT.

This application is also a non-provisional of, and claims all benefit including priority to, U.S. Provisional Application No. 63/130,540, filed Dec. 24, 2020, and entitled SYSTEM AND METHOD FOR MULTIPARTY SECURE COMPUTING PLATFORM.

This application is also a non-provisional of, and claims all benefit including priority to, U.S. Provisional Application No. 63/141,788, filed Jan. 26, 2021, and entitled SYSTEM AND METHOD FOR MULTIPARTY SECURE COMPUTING PLATFORM.

This application is also a non-provisional of, and claims all benefit including priority to, U.S. Provisional Application No. 63/164,444, filed Mar. 22, 2021, and entitled SYSTEMS AND METHODS FOR ESTABLISHING DATA LINKAGES.

This application is also a non-provisional of, and claims all benefit including priority to, U.S. Provisional Application No. 63/189,611, filed May 17, 2021, and entitled SYSTEM AND METHOD FOR LOADING SECURE DATA IN MULTIPARTY SECURE COMPUTING PLATFORM.

This application is also a continuation in part of U.S. application Ser. No. 17/169,221, which is a continuation of U.S. application Ser. No. 16/424,242, filed May 28, 2019 which claimed priority to U.S. Provisional Application No. 62/677,133 filed May 28, 2018; U.S. Provisional Application No. 62/691,406 filed Jun.28, 2018; U.S. Provisional Application No. 62/697,140 filed Jul. 12, 2018; U.S. Provisional Application No. 62/806,394 filed Feb. 15, 2019; and U.S. Provisional Application No. 62/824,697 filed Mar. 27, 2019; all of which are entitled SYSTEM AND METHOD FOR SECURE ELECTRONIC TRANSACTION PLATFORM.

The contents of the above applications are hereby incorporated by reference in their entireties.

FIELD

This disclosure relates to the field of secure electronic data analytics, and in particular to a secure computing infrastructure platform.

INTRODUCTION

A challenge with existing eCommerce services and products is a lack of transparency and control over private information, such as personal information, preferences, search queries, among others. Services are increasingly biased (e.g., search), and it is often unclear who the downstream user of data (either in raw or aggregated form) is or what the downstream user of data is doing with the data. As data is aggregated, transformed, and transferred from party to party, it is difficult to track the provenance of the data and control access or how the data is being used. This risk is increasingly apparent as more facets of every day interactions are being tracked, labelled, and collected. For example, a malicious party may be able to aggregate data from various data sets about a customer to reverse-engineer the customer's identity and access information that the customer did not intend to become public.

For example, metadata and web browser data based approaches (e.g., tracking cookies, tracking pixels) have been utilized, among other approaches, as a mechanism for tracking information, machine interactions, web activity, among others. These approaches typically send the information to a third-party analytics platform, which aggregates the data and allows users to conduct various types of analytics. A challenge of these types of tracking approaches is that there is an inherent lack of privacy associated with the underlying data of individuals. For example, one must trust that a particular website has applied various consent requirements faithfully, and it is often difficult for one to identify the source of leakage of one's personal information when there is a privacy breach.

Increasingly, there is a shift in policy to limit the use of such technologies due to privacy concerns, especially as browsers are beginning to remove support for tracking cookies. However, without these types of technologies available, it can become difficult for companies to continue to engage in legitimate marketing analytics, such as conducting queries against customer data sets to test or identify target audiences for a particular marketing campaign.

Furthermore, the third-party analytics platform provider may also be providing competing services, and there may be concerns by partner parties over continuing access (and/or an ability to withdraw access) to the centralized repository of data.

SUMMARY

A secure computing infrastructure platform is described in various embodiments that utilizes secure computing and cryptographic approaches to store sensitive information that can then only be accessed, in accordance with one or more automatically enforced data custodian policies, for conducting analytics while preserving privacy and confidentiality.

A trusted, neutral, cross-party platform spanning across multiple services and interaction points is desirable to provide a scalable, un-biased solution providing transparent levels of control to stakeholders. The usage of specific encryption mechanisms and automated custodian data processes can be established to automatically enforce access and privacy controls (e.g., on-board, grant, deny, withdraw) at various levels of granularity (e.g., data table-wide, data field, data value, conditional access). The platform, for example, may be used to provide, among others, solutions that can be neutral gateways into everyday eco-system activities, whereby a customer (or an originating party) is able to control downstream access and usage of their data.

The secure computing infrastructure platform is adapted as a middleware platform supporting a computing ecosystem where multiple parties providing different services are able to establish a pooled set of data having fully established privacy protections (in some embodiments, multi-layered). The secure computing infrastructure platform operates on infrastructure provided by a confidential computing layer, which, in some embodiments, can be configured to securely and automatically control encryption key management activities (e.g., key generation, key distribution, key storage, key de-activation), providing stability, security, and speed at scale.

The platform can thus provide a set of interconnected service offerings supported by underlying computing devices including, for example, computing services for search (e.g., web searching applications) and discovery (e.g., shopping applications), customer offers, product/service catalogues, logistics fulfillment, payments (including subscriptions), and loyalty.

At each computing touchpoint, the secure computing infrastructure platform is adapted to periodically or continually receive data sets storing various types of structured information in accordance with one or more established digital contracts with the various parties. For example, each of search (e.g., web searching applications) and discovery (e.g., shopping applications), customer offers, product/service catalogues, logistics fulfillment, payments (including subscriptions), and loyalty can be utilized to generate data which can be collated and stored using a mechanism that maintains privacy and data controls throughout a data lifecycle.

The secure computing infrastructure platform, through a data loader, can be coupled with various types of devices, such as point-of-sale terminals, website interaction logs, network connection logs, search logs, inventory records, financial records, health records, rewards program records, among others. These devices, in some embodiments, may be configured to by default load data into the secure computing infrastructure platform using the data loader. For example, each and every transaction that is processed by a point-of-sale device can be loaded into the secure computing infrastructure platform.

The data loader is adapted to load the data sets into a "virtual clean room" (VCR) data warehouse that is especially adapted for the secure loading of secure information into a data warehouse having specific secure processing adaptations that limit both access and interactions with data stored thereon. The loading can be conducted in accordance with one or more digital contracts establishing the permitted usages and associated access constraints associated with the loaded data, which, in some embodiments, can be established globally (e.g., all data cannot be individually queried or returned), or established on a per field level (e.g., address fields, phone number fields, postal code fields). The secure computing infrastructure platform may interact with an identity token and identity network service to securely associate identity with the loaded data records (e.g., the data loader itself and/or the data custodian, in an embodiment, do not have access to the actual identity of the parties but rather operate using tokens managed by the identity token and identity network service).

The data is transformed upon loading such that the data is encrypted and stored in protected database elements. The loaded data warehouse can be interacted with to conduct data operations using combinations of the data sets, but access can be strictly controlled by the secure computing environments. In some embodiments, the secure computing environments (e.g., secure enclaves) do not store significant amounts of data. The data can be stored in data warehouses (e.g., file systems) that are protected under keys that are protected via attestation policies and to conduct data processing as needed, such as "always encrypted databases". In variant embodiment, the secure enclaves store the data warehouses or a hybrid approach is utilized (e.g., partial storage in the secure enclaves such that both parts are required to reconstitute the data).

Because strong privacy controls are utilized in conjunction with a centralized secure data storage (e.g., the loaded data warehouse), users of the system are able to still utilize their data in supporting data analytics (or at their discretion, allow others to access) so that the user can obtain personalized, contextual, and local offers based on searches, purchases, and behavioral data, for example. However, a core differentiator is that access or use can be monitored and/or revoked through, for example, triggering a change in a data custodian policy that is automatically enforced by a data custodian process. While an initial data custodian policy may be established during data load (e.g., highest privacy levels can be by default), the user may consent to various data being used in specific settings.

When the consent is logged, the consent can be computationally implemented using the provisioning of a key and/or automatic update of how the data is protected on the secure data storage, including restrictions on the types of access or query commands (e.g., direct access to data, only indirect access to data), among others. In some embodiments, only approved, pre-defined queries can be executed, and in other embodiments, restrictions are placed on the types of ad-hoc queries that are possible. For example, certain types of SQL commands may be restricted during in-warehouse interactions, so that either only a rough location of the user can be established (e.g., postal code, but no addresses), or while the raw information itself cannot be directly accessed at all, a query may still be able to return derivatives from the raw information (e.g., while the individual gender identity of a user is protected, the data custodian may permit queries that count the number of identifying-as-male individuals buying a certain product). More granular privacy controls are also possible (e.g., only permit queries that count a number of individuals when the count value will return more than 50). In some embodiments, individual users may be assigned unique identifiers, but the unique identifiers may only be accessible by the system itself and no query may direct interact with the unique identifiers.

An intelligence layer may provide an application programming interface through which queries can be run using combined aspects of both data sets that would otherwise be inaccessible to a single party. These queries can include regular queries where information stored in the secure data warehouse is queried directly to return a result, and also more challenging machine learning-based queries where a machine learning model operates within the secure computing infrastructure platform that is periodically or continually trained using data stored in the secure data warehouse, and generates machine learning outputs, such as prediction data values, logits, classifications, clusters, etc.

This approach is particularly useful where the parties operate in different fields or lines of trade, and the combined information can be used to run outreach campaigns based on combined information for improved targeting. The combined information can be utilized to conduct query operations that are not otherwise available to both parties, such as combining transaction data of a financial institution with SKU-level data of a merchant. Queries, for example, can be conducted on joined versions of separate tables based on a primary or foreign key that is common to both (e.g., a userID, a user name, an address, a phone number), or a schema that is common to both (e.g., two tables of insurance claims that can be used to more accurately identify a typical payout amount for a particular type of event, such as flooding). As noted above, the queries may be limited by the specific types of data policies established through the usage of one or more encryption keys that can be provided or withheld by various parties (e.g., end users, merchants, financial institutions).

Accordingly, through the accessing of the platform, users of the system are able to secure exchange data without compromising privacy, while the data loader seamlessly integrates the mechanism into every day life while allowing parties to maintain true control over data associated with the parties.

In a further embodiment, the combined data sets can be utilized for secure machine learning, for example, by a machine learning data architecture that is adapted to run within or coupled to the limited computational confines of the one or more secure enclaves. The machine learning data architecture can thus be adapted to conduct complex analyses on a broader data set, and periodically generate output data sets indicative of the one or more outputs of the machine learning data architecture (e.g., logits, normalized predictions). Being able to conduct complex analyses on the broader data set allows for enhanced "big data" computations on larger sample sizes or with more complex characteristics being considered (e.g., conducting analyses on rare diseases or "black swan" events that occur so infrequently that they are often poorly represented in any one data set alone). The queries can thus be extended not only to analyses of existing information, but also forward looking or predictive outputs, such as the predictive payout amount for a type of or extent of an event that has not occurred before (e.g., full separation of San Andreas fault-line).

However, the parties may not trust the data policies of one another, network security, or the security of the computing infrastructure, and require enhanced technological assurances that sensitive data has strong data security provisions in place. Enhanced privacy and security are required as the data sets typically contain sensitive and proprietary data of the parties, or surrogates/derivatives of such data.

In particular, a data custodian architecture and a corresponding data agent architecture (including a data loader) are described for interoperation with a trusted execution environment having a segregated (e.g., computationally segmented, virtually segmented, or electrically segregated) or isolated data processing subsystem controlling access to protected database elements (e.g., in the context of a relational database, protected tabular database tables, or in a non-relational database, protected non-tabular data, such as documents or dynamically defined schemes).

The data custodian and the data agent, in some embodiments, can be implemented as data processes that operate in as software modules, for example, as daemon processes that can be interacted with through query requests, etc., by way of an application programming interface (API). In some embodiments, the data agent can provide an interface layer through an API that translates various requests for automatic provisioning through the secure enclave system (e.g., data load or query processing). For example, for a specific user or process, it may appear simply that the interface is able to conduct queries across multiple data sets, even if the data set is not owned by party making the query.

The data custodian is a data process that, in an embodiment, is operated by a secure enclave data processor that conducts automated policy enforcement of data protection policies to periodically or continuously ensure that privacy principles of the secured environment are being adhered to. The data custodian data process can operate at various interactions with protected data, such as validating a query when the query is received, controlling the underlying access to protected information, or validating a final output data object before it is exposed outside of the secure enclave environment.

The data custodian applies the data protection policies to control whether the query should be processed or rejected, and the data protection policies can include data-level data protection policies, global data protection policies, or party-specific data protection policies.

For data-level data protection policies, the underlying data may be associated or flagged with (e.g., in accompanying metadata) including the types of query operations that are permitted or prohibited, or if additional transformations are necessary to the data before it can be surfaced (e.g., replacement with a hashed surrogate version).

Transformations can be used, for example, to conduct hashing of sensitive information in some aspects to replace information with a surrogate (e.g., John Smith→ 328faa9b4e0a798947a8c80913e993d4). As described in some embodiments, the transformations may modify data even further by perturbing the data to cause loss of fidelity.

For global data protection policies, various types of underlying data can always be set as having specific permissions or prohibitions always occurring.

Party-specific data protection policies can include specific requirements provided by a party in respect to all original data owned by or provided by the party, and in some embodiments, can be inherited by any data derived from the original data owned by or provided by the party as well.

Party-specific data protection policies can also be used to control access by various parties and to control remuneration (e.g., a compensated data exchange wherein the underlying data is always protected with privacy preserving principles) or other type of statistical usage tracking.

The data custodian data process accordingly controls the processing of a query received in the form of a query data object. The query data object represents a proposed query to be operated on one or more protected database elements residing on the protected memory region, and the proposed query can include, in some embodiments, domain-specific language instructions for parsing (e.g., SQL queries), natural language processing queries, or other types of query language based queries.

Upon a determination that the query data object adheres to the data protection policies, the data custodian data process generates and transmits a control message (e.g., a "quote message") to an attestation process to validate that the data custodian data process is operating on the secure enclave data processor.

The control message can include elements of information, such as a hash of the software code of the secure enclave to attest that the code is of a specific version and has not been tampered with, a version number or a firmware number of the secure enclave, various physical or identifying characteristics of the enclave (e.g., operation on a processor bearing the serial number 1GH5HY, on software build 1503), among others.

The control message is provided, for example, to an attestation service or process which responds with an attestation token data object. The attestation token data object is then utilized by the data custodian data process to release data protection keys for the unlocking of the protected database elements.

In some embodiments, the query response data object is encrypted using a public key associated with a requesting party prior to provisioning as an encrypted output data object. In this embodiment, the query response data object is not exposed, and instead, only the encrypted output data object is exposed to further improve computational security and reduce potential exposure.

In some embodiments, the query response data object is inspected based on at least one of the data protection policies to ensure that the query response data object also adheres to the data protection policies.

A subset of policies can be adapted to investigate the query response data object as a secondary sanity check to ensure the policies were indeed adhered to. An example subset of policies can include preventing the output of any query results where a nine digit number is output (e.g., which may be a social insurance number).

In an example implementation, the systems and methods can be provided in the form of a physical computer device, such as a computer server or a special purpose computer appliance (e.g., a rack mounted device that is interconnected with a message bus). The physical computer device may house one or more secure enclaves in one or more trusted execution environments. In some embodiments, multiple enclaves can be hosted together using virtual machines orchestrated by a hypervisor.

In another embodiment, a single enclave can be established across many different machines using distributed resources through the coupling of multiple sub-enclaves.

A machine learning model architecture, in some embodiments, can reside within a protected memory portion and can operate autonomously with a data custodian data process, periodically requesting updated information for conducting iterative training. In another embodiment, the machine learning model architecture itself is protected alongside the data and runs alongside the data, and access is required from the data custodian data process to access the machine learning model architecture.

In another aspect, the data agent is a data process that can reside within or can be coupled to a party's computing systems. The data agent data process does not necessarily need to reside within the secure enclave, and in some embodiments, the data process can be an interface or a software module that is operable on partner computer devices, or an intermediary computer device adapted for interoperability.

The data agent data process is configured to receive data inputs indicative of a schema of data elements (e.g., data tables) that the data agent is adapted to load data into. The data agent data process receives raw data from a data repository (e.g., SKU-level transaction data) and conducts one or more validation processing steps to process the raw data in accordance with the schema requirements. The data agent data process can be coupled to the data custodian data process such that the two operate together (e.g., the data agent data process can request schema information and specific table characteristic information from the data custodian to aid in the proper loading of data to support future queries).

The data custodian data process can also provide additional instruction sets relating to data quality, such as specific formatting required, time zone information, how blanks/unavailable information should be handled, information relating to how to communicate confidence bands (e.g., the timestamp needs to indicate that it is up to a 1 second level of accuracy). These validation processing steps are particularly important as once loaded into the secure enclave, it may be very difficult or impossible to change or update the data. Accordingly, the insertion of unclean, incorrect, malicious, or incomplete data could have significant negative effects that the data agent data process is adapted to mitigate.

These validation processing steps can include, in some embodiments, the application of formatting (e.g., time code formatting), security (e.g., avoiding SQL injection attacks), or sanity checks (e.g., blank avoidance, numerical validation), and in some embodiments, additional transformation to the data is conducted, for example, to perturb specific data values to add a level of uncertainty (e.g., credit scores can be adjusted so specific credit scores are never provided, even into the secure enclave). In some embodiments, the data is transformed such that the data is replaced with surrogate data at this step.

The data can have one or more associated data-level data protection policies applied at this step through, for example generation of metadata or adding information into the database structure (e.g., adding rows or columns to the table). In some embodiments, the schema itself includes space (e.g., columns) for metadata indicative of data-level data protection policies.

Data-level data protection policies can include aspects such as ensuring that specific data is never exposed ("NE") as is, and this can be used, for example, for sensitive information, such as addresses or names. On the other hand, information such as ZIP codes, can be coded as exposable. In some embodiments, the data itself is formatted with metadata associated with a confidence level/score attesting to the accuracy of the data. For example, time data obtained by a GPS system can be extremely precise, while time data obtained by a computer clock has limited precision.

The confidence level/score can be used during downstream processing to indicate the limits of possible precision as the lowest accuracy level of the combined data, for example. In this example, the combined data should likely not be utilized for location determinations requiring highly precise time values.

In some embodiments, the data agent data process operates with a key manager data process to encrypt the data prior of encrypted data packets to the secure enclave system for loading onto as protected data elements. In some embodiments, the encryption is conducted using a public/private key shared in advance with the secure enclave so that the secure enclave is able to decrypt the transmitted data and load the data into the protected data elements (in some embodiments, encrypting it again using an internal key and inserting it into the secure enclave).

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 1B is an example schematic diagram illustrating different layers of a secure computing architecture, according to some embodiments.

DETAILED DESCRIPTION

Figure 1A:
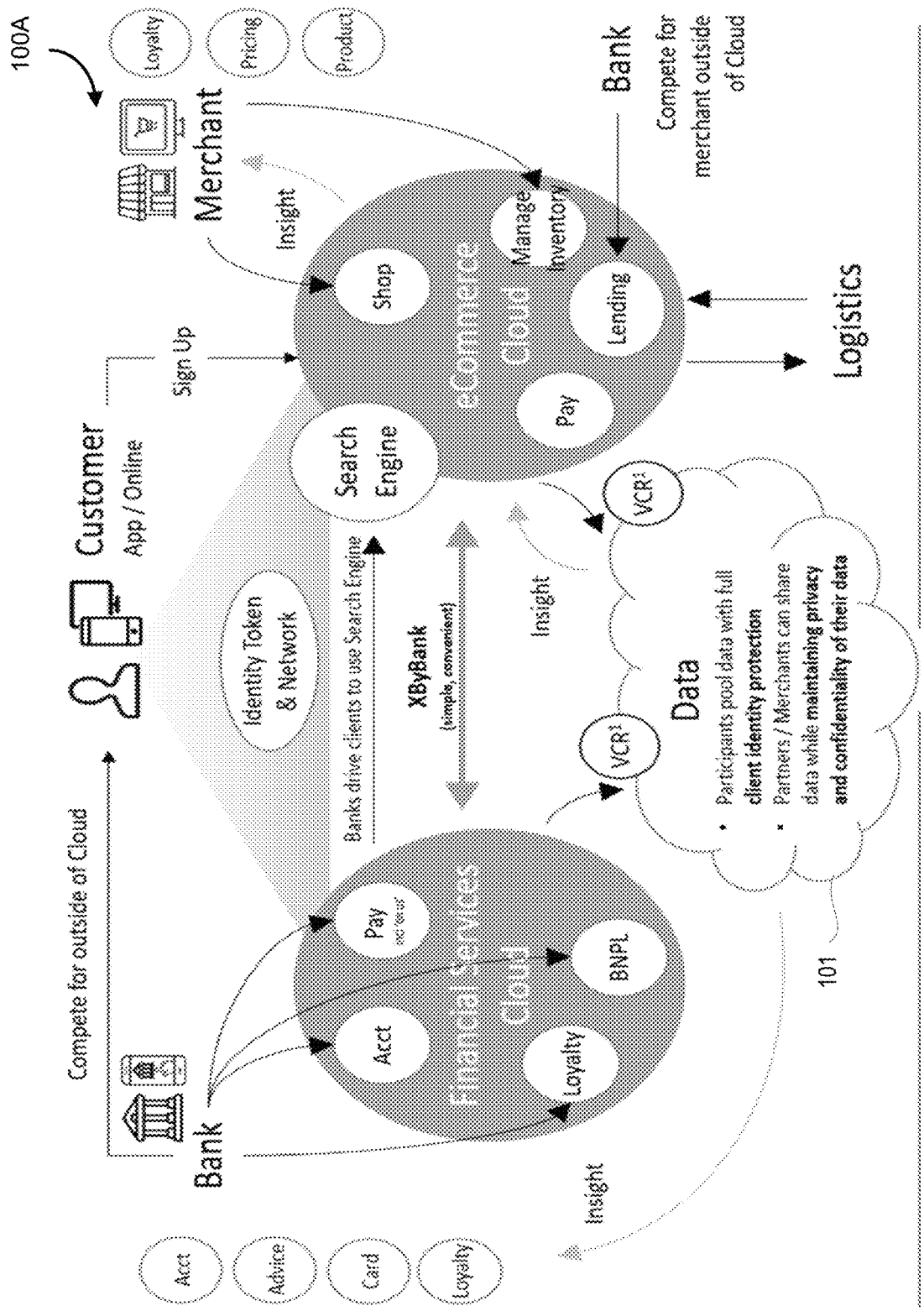
FIG. 1A is a diagram illustrating an example secure computing infrastructure ecosystem, according to some embodiments.

A secure computing infrastructure platform 101 is shown in FIG. 1A that utilizes secure computing and cryptographic approaches to store sensitive information that can then only be accessed, in accordance with one or more automatically enforced data custodian policies, for conducting analytics while preserving privacy and confidentiality. The secure computing infrastructure platform 101 is particularly useful in respect of data handling and processing where parties require a greater level of assurance for privacy and data security, whereby specific cryptographic and/or encoding approaches are utilized such that additional control is obtained for restricting/providing access to underlying data sets that have been loaded thereon.

Automatic mechanisms are described herein are specially configured to aid in the data load process and data security enforcement (e.g., data custodian) processes such that transparently enforced data processes are periodically or continuously applied, primarily to limit or provide access in terms of handling potential queries and their corresponding outputs based on defined roles and/or credentials that are assigned and attributed through the provisioning of a corresponding encryption or encoding key that is necessary to access the underlying data for processing the query.

Queries, in some embodiments, can be highly constrained and/or system generated so that queries cannot be independently generated on an ad-hoc basis in an attempt to access information that should not be accessible. In another variant, ad-hoc queries can be used but they are pre-processed (or as described in a variant below, results are also post-processed) for validation. The range of available queries can be established based on available permissions associated with a particular role assignment for the party initiating the query. For example, in a role definition, two organizations may be data providers, and may be defined as "level 1" collaborators having access to specific data fields of the counterparty's data, and full access to their own (e.g., they are conducting a joint marketing campaign).

The available queries may thus be limited to a pre-defined set of queries that account for these limitations. Additional query capabilities may be obtained, for example, by increasing a designated level of collaboration which can be tracked in metadata and provide additional access capabilities. An example of a situation where enhanced level of collaboration and thus access could include a public health campaign whereby a deeper level of access is given to a trusted academic or governmental party that is conducting a deeper analysis into pandemic-related trends and the trusted academic party has additional safeguards for handling secure data. This deeper level of access can be granted by the data providers directly by assigning an enhanced privileges type role. Role assignments or escalations can be permanent or for a limited duration (e.g., limited for a particular time or a number of "runs") or scope (e.g., limited to a particular campaign).

In other embodiments, queries can be generated ad-hoc but are processed against a set of logical rules to track adherence to query restrictions that may be associated with security permissions. In a further embodiment, query results can also be processed (in addition or as an alternative) to track adherence to results restrictions as an additional safeguard against potential sensitive data leakage. While query result processing is particularly useful in respect of preventing malicious ad-hoc queries, query result processing can be configured even when queries are constrained to pre-generated queries (as a safeguard even in this situation). Enforcing restrictions both at a query entering and at a query result level, while computationally expensive, is utilized in some embodiments to provide two layers of safeguarding in respect of access rule enforcement.

Where access permissions are to be revoked (e.g., in the event of an identified breach by a partner or the dissolution of a combined marketing campaign), the system is configured to update roles and/or credentials, and access to corresponding encryption or encoding keys is revoked (e.g., certificate authority no longer allows the use of a particular encryption or encoding key to access specific data). In some embodiments, the keys themselves may further be rotated periodically or as roles change as an additional security measure. In some embodiments, the keys are never exposed or provided to the party computing systems, rather, they are accessed within the system internally for loading the protected data sets (or entire data tables) into a data storage area for processing the query, and the protected data sets are unloaded and the data storage area is wiped (e.g., all sectors overwritten, permanently erased) after the results are generated (e.g., countOf Bank1_Customer AND Retailer1_Purchased_SKU2123=151).

In some embodiments, the system only loads the specific data fields that are accessible or relevant into the data storage area. In another embodiment, the system loads relevant data tables into the data storage area. More complex queries are possible where data sets are joined on specific attributes for processing, and results are obtained by running various queries against the joined data sets (e.g., identifying matched records). To enhance trust, even where the heterogeneous data sets are joined within the system for the purposes of conducting a query, the underlying joined data sets are not accessible by either party directly. The system may indicate that the loaded data set is a joined data set and may, for example, provide the relevant accessible labels of the data fields that are useable for a query, but the underlying values of the data fields (or just the data fields of data that does not belong or was not contributed by a party) is not accessible.

Audit records for accessed data (e.g., timestamps, loaded data sets, queries conducted) can be tracked by the system such that downstream analysis is possible in the event of a breach. In some embodiments, data is only loaded after a query is submitted and each of the data providers has expressly input an affirmation signal indicating a re-confirmation prior to data load.

The automatically enforced restrictions are useful both in respect of query processing as well as potential shared machine learning approaches where a combined set of data from heterogeneous sources (e.g., parties who may not trust each other directly to house the data) is used for machine learning. For machine learning embodiments, a machine learning model data architecture may be maintained either in a secure protected storage, or in a separate mechanism and updated periodically. The machine learning model data architecture may be operated by a machine learning engine that periodically requests access to run pre-determined queries whose results are provided as part of a training process, such as supervised learning processes (e.g., input/result pairs/tuples to refine/optimize a transfer function), unsupervised learning processes (e.g., automatic cluster identification or summarization), or reinforcement learning processes (e.g., state-action pairs to tune a Q function over time).

As the machine learning model weights are tuned, the data may not be stored directly and thus a trained model can be refined over time and deployed for various usage, trained from a cross-section of different heterogeneous data sources. The same approved query can be run periodically to continually refine a model, and versions of the model itself can be deployed for downstream usage.

This improved approach to storing sensitive information yields greater technical challenges for practical implementation, as it is important to be able to transparently and effectively establish access controls that are consistently applied and enforced. There are increased computational burdens associated with initial onboarding/loading of data from the original data providers, and then after the data resides thereon the system in a protected area, loading and unloading the protected data for analysis and query processing. In some embodiments, a parallel initial data loading process is utilized whereby a large upload is segmented into multiple portions (e.g., 30,000 records each), and checksums are conducted for each portion during the load and indexed to portion indices to confirm and validate receipt of all data portions and the integrity thereof.

As shown in FIG. 1A, a computing ecosystem 100A can include multiple parties providing a variety of computing services that may interoperate with one another. These services, for example, can be grouped into various types of related cloud-based services, such as financial services provided by a financial institution, such as a bank (e.g., online banking, payments, loyalty programs, buy now pay later (BNPL)) services. Another type of related cloud-based services can include eCommerce cloud services, such as electronic shop/shopping cart services, inventory management services, lending, electronic check out/physical point of sale services, search engine/web re-direction services, among others.

In a further example, the secure computing infrastructure platform 101 can provide configurable shopping portals that provide an ability to search based on preferences and parameters without no bias through steering or search placement purchases as the data and algorithms being utilized by the secure computing infrastructure platform 101 can be established in a privacy enabled approach that is transparent about how the secure computing infrastructure platform 101 generates the specific preferences or parameters.

The secure computing infrastructure platform 101 can be configured to interoperate with services that link to local and everyday life, such as search engines, purchasing portals, self-service portals (e.g., online banking, insurance claim systems), logistics platforms, inventory management systems, among others. The secure computing infrastructure platform 101 is not limited only to customer data, but can also include data stored or generated by merchant providers (e.g., loyalty data, SKU-level information, inventory information), logistics providers (e.g., shipping data), or derivative data from data analytics companies (e.g., demographic level preference data).

The various services can have disparate data sets, which, in some embodiments, may be associated with fields that overlap as between data sets (e.g., a unique customer number), or may not have overlapping fields (e.g., search engine search queries entered into a search engine and inventory data showing inventory levels for specific SKU numbers at stores).

The data sets can be used locally for improving or tailoring approaches based on a defined set of input sources or parameters, or combined, in a privacy considerate approach, to generate, for example, personalized, relevant, and configurable offers that utilize aspects of data from a set of data elements, such as identifying purchase trends from a population of similar user profile.

As disparate data sets themselves have various interconnections, these interconnections can be used to further augment the utility of obtained and/or collected data (for example, by combining the analytical scope of a query by combining either laterally similar data sets (e.g., multiple insurance companies attempting to right-size an insurance premium for a rare event), vertically similar data sets (e.g., purchase platform data set combined with logistics handler data set) or distinct data sets (e.g., insights obtained from data sets from different verticals or representing different touchpoints). Utilizing a homogenous mix of data sets can be helpful in ascertaining complex analytics, such as using machine learning models to sort through large volumes of data to identify various interrelationships or to generate predictive outputs that utilize complex interactions as between data points of the data sets (e.g., unexpected correlations in data).

In some embodiments, specific transactions and/or records may also be associated with various tokens, such as identity tokens that are utilized by a separate identity token network for increased reliability in authentication relating to the identity of the individuals and authorization of activities by the individuals. The identity token network can be utilized to track, for example, unique identifiers associated with the individuals while rigorously controlling access to the unique identifiers.

The unique identifiers can be useful, for example, where there are disparate data sets that may have some fields that overlap with one another (e.g., vehicle records and mobile phone usage records). Where there are fields that overlap, the data can be used to stitch together a view associated with a particular customer or individual, or groups of individuals.

Even where there are no fields overlap, there may still be value in pooling the data from an aggregate level (e.g., although transaction records and search queries may not overlap, analytic results using both rough location information from the search queries and the specific location of transaction records may be useful in assessing whether a particular product is trending for a particular demographic heavily clustered in a geographical area).

Accordingly, even parties, such as adjacent businesses, whose services do not ostensibly overlap with one another in terms of data fields may be able to derive useful analytics from the secure computing infrastructure platform 101.

These services are often provided by a number of different parties, each having their own silos of customer information obtained, for example, from transaction records, entered searches, referral links, promotion codes, among others. Given the paramount importance of customer privacy, parties are typically reluctant to provide full access to structured customer information as such information can be prone to mis-use by downstream malicious actors.

However, the lack of pooled data due to mistrust yields a poor level of insights and analytics for individual organizations, especially organizations that do not have a high level of vertical integration or horizontal integration. This issue becomes especially prevalent when a core technology for analytics, third party tracking cookies, are no longer viable due to prevailing privacy concerns.

The secure computing infrastructure platform 101 is adapted as a middleware platform supporting a computing ecosystem where multiple parties providing different services are able to establish a pooled set of data having fully established privacy protections (in some embodiments, multi-layered).

Referring to FIG. 1B, the secure computing infrastructure platform 101 operates on infrastructure provided by a confidential computing layer 112, which, in some embodiments, can be configured to securely and automatically control encryption key management activities (e.g., key generation, key exchange, key distribution, key storage, key de-activation), providing stability, security, and speed at scale. The confidential computing layer 112 can be configured, in some embodiments, to establish varying levels of encryption and associated keys to provide variations and flexibility in respect of privacy and access.

For example, a customer may be provided a personal master key that can be used to access any stored data that only the customer may utilize, and the customer may also be provided with keys associated with varying levels of consent that can be provided to various third parties. The keys may allow for differing digital contracts outlining the permissible data operations, and in some embodiments, the increased levels of consent can automatically be enforced through the providing or withholding of a corresponding key. In this example, the customer may wish to provide a baseline level of consent (e.g., only aggregated data) in exchange for being able access certain services, and may provide an increased level of consent (e.g., third parties able to access the customer's actual postal code) in exchange for enhanced services.

The key management mechanism of confidential computing layer 112 can be accessed when data from a protected data storage is to be obtained for loading into a data storage space for the purposes of conducting a query. The confidential computing layer 112 may receive a query request from trusted application layer 114 or intelligence layer 116, the request indicating the specific data tables or data records being requested to satisfy a particular query. The confidential computing layer 112 utilizes the keys stored therein or provided to it to decrypt or decode the specific data being requested associated with the request and the parties, and then loads the data into the data storage space and processes the query to obtain the result.

The loaded data can then be transformed (if required or computationally useful, such as through a JOIN), and the query is processed against the loaded data. Once the query results are generated, the confidential computing layer 112 is configured to conduct an erasure of the data storage space (e.g., a data wipe or overwrite) to limit an ability of a third party to attempt to read the decrypted data left in residual traces in the data storage space, and accordingly, the data is unloaded.

Other types of access levels associated with consent can include keys provided to government agencies for the purposes of conducting academic research, auditors reviewing customer logs for privacy breaches, among others.

The secure computing infrastructure platform 101 is a trusted application layer 114 adapted to periodically or continually receive data sets storing various types of structured information in accordance with one or more established digital contracts with the various parties. The secure computing infrastructure platform 101, through a data loader, can be coupled with various types of devices, such as point-of-sale terminals, website interaction logs, network connection logs, search logs, inventory records, financial records, health records, rewards program records, among others. The data loader can be preconfigured with a set of default privacy parameters or fields, allowing the data to be preconfigured with specific privacy controls, among others.

These devices, in some embodiments, may be configured to, by default, load data into the secure computing infrastructure platform 101 using the data loader. For example, each and every transaction that is processed by a point-of-sale device can be loaded into the secure computing infrastructure platform 101. In scenarios where a significant adoption of the system is in place (e.g., across a large number of merchants and personal services systems), and there is sufficient coverage across a corpus of the population, the utility and predictive power of the loaded data increases.

The data loader loads the data sets into a "virtual clean room" data warehouse that is especially adapted for the secure loading of secure information into a data warehouse having specific secure processing adaptations that limit both access and interactions with data stored thereon. In some embodiments, the loaded data sets are modified in accordance with the digital contract such that certain underlying data values can be perturbed with a level of uncertainty to improve privacy and reduce the impact of leakage. For example, postal codes may be probabilistically altered, among others. Having controllable access to the secure computing infrastructure platform 101 can thus be useful in providing limited (or unlimited) access to conduct queries on source data to generate insights or to establish improved targeting of users or customers.

For example, a merchant may wish to conduct a marketing campaign with specific customer targeting and the secure computing infrastructure platform 101 can be adapted to receive encryption keys representing consent.

Figure 2A:
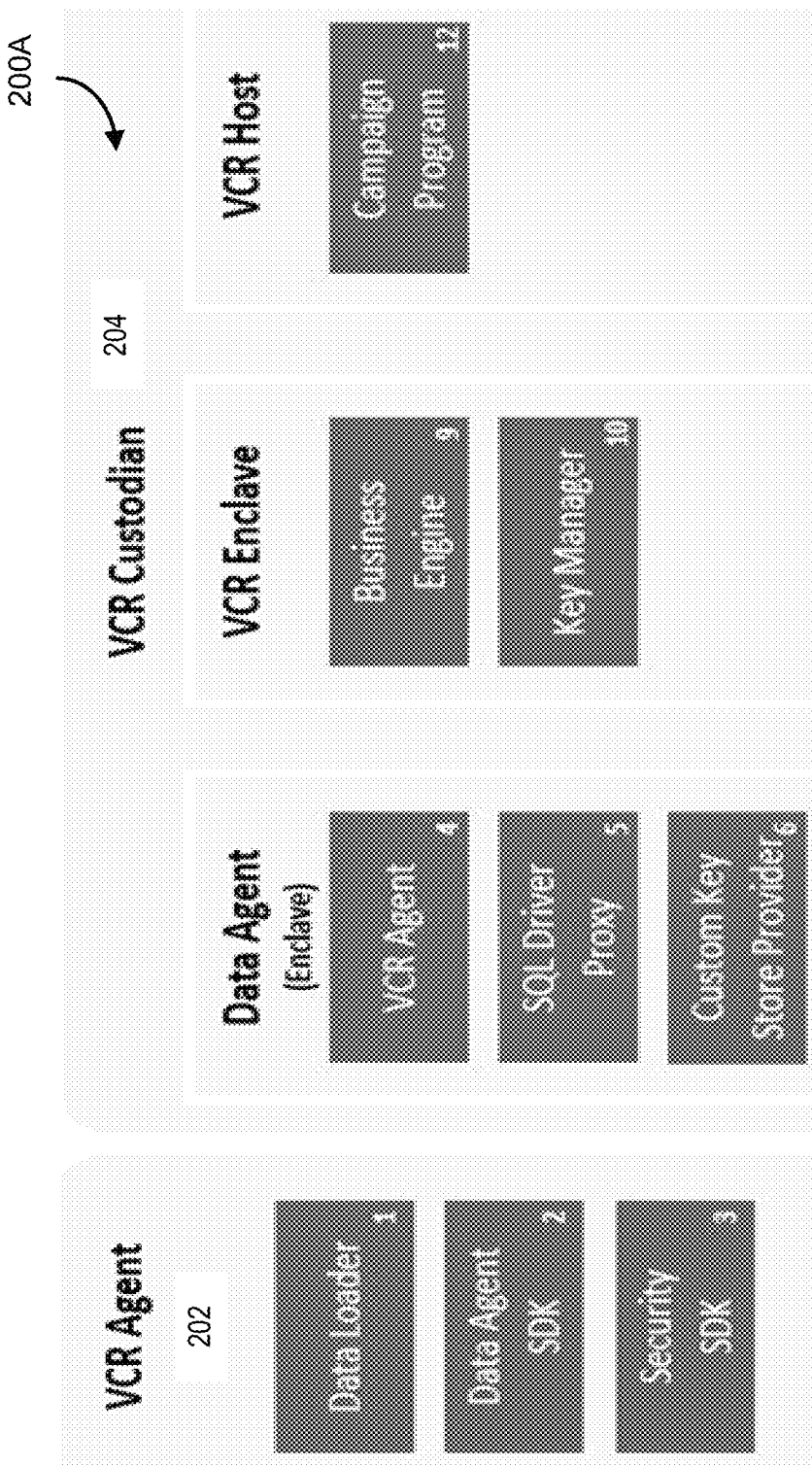
FIG. 2A is a block diagram of an example VCR Agent and VCR data custodian data process, according to some embodiments.

The specific architecture is described in more detail at FIG. 2A, where the data warehouse is adapted such that a custodian process 204 continually operates to ensure that privacy polices are enforced when new queries are received or new data outputs are generated. For example, the privacy policies can be established by default in a digital contract, and without specific consent provided by an individual, the queries can be limited to only returning aggregate data (e.g., not individual addresses), and certain fields may automatically be flagged as never being directly query-able (e.g., social insurance numbers). As the privacy policies are automatically enforced by the custodian process 204 in respect of any queries received, the risk of malicious or inadvertent leakage of sensitive customer information is greatly reduced.

In some embodiments, available queries are limited to a set of pre-defined "safe" queries that the user is able to select from in conducting the query. These queries can be safer than ad-hoc queries as the risk of surreptitiously obtaining privacy breaching results is reduced through testing and validation of the pre-defined "safe" queries. The available pre-defined queries can be established through what permissions are associated with various roles, mapped against the permissible roles associated with the underlying data sets (e.g., verified against metadata) and established during the initial data load process or periodically updated by the parties. In some embodiments, the intelligence layer 116 is configured to handle ad-hoc queries, and in this variation, the ad-hoc queries are validated against permissions and roles to ensure that the ad-hoc queries can be validly processed. As described some The loading is conducted in accordance with one or more digital contracts establishing the permitted usages and associated access constraints associated with the loaded data, which, in some embodiments, can be established globally (e.g., all data cannot be individually queried or returned), or established on a per field level (e.g., address fields, phone number fields, postal code fields).

The data is transformed upon loading such that the data is encrypted and stored in protected database elements. The loaded data warehouse can be interacted with to conduct data operations using combinations of the data sets, but access can be strictly controlled by the secure computing environments. In some embodiments, the secure computing environments (e.g., secure enclaves) do not store significant amounts of data. The data can be stored in data warehouses (e.g., file systems) that are protected under keys that are protected via attestation policies and to conduct data processing as needed. In variant embodiment, the secure enclaves store the data warehouses or a hybrid approach is utilized (e.g., partial storage in the secure enclaves such that both parts are required to reconstitute the data).

An intelligence layer 116 may provide an application programming interface through which queries can be run using combined aspects of both data sets that would otherwise be inaccessible to a single party. In some embodiments, the intelligence layer 116 also provides graphical user interfaces from which dashboards or other visual representations using interactive visual elements and/or controls derived from the results of the queries can be rendered.

These queries can include regular queries where information stored in the secure data warehouse is queried directly to return a result, and also more challenging machine learning-based queries where a machine learning model operates within the secure computing infrastructure platform 101 that is periodically or continually trained using data stored in the secure data warehouse, and generates machine learning outputs, such as prediction data values, logits, classifications, clusters, etc. The intelligence layer 116 can be adapted for providing an analytics dashboard whereby a party, such as a merchant, is able to submit queries or request machine learning outputs to support a particular advertising or data analytics campaign.

In some embodiments, the platform 101 may be adapted to provide a baseline level of analytics (such as generation of collective insights or output data objects), and require permission provided in the form of signed tokens or keys from other parties (e.g., customers, other merchants, other service providers) to be able to conduct certain types of queries (e.g., proprietary or confidential outputs) against the data sets securely loaded into the platform 101. In some embodiments, the platform 101 may be configured to track the provisioning of consents between parties, as evidenced by the provisioning of time-limited keys that can be used for a period of time to request increased query access into the data loaded into platform 101. A party may also designate another party as trustworthy and automatically increase the query access for that particular party (e.g., a government party such as an anti-money laundering party or a trusted financial institution).

The intelligence layer 116, in some embodiments, is configured to generate analytical insight data objects based on query results or machine learning results from the trusted application layer 114. Depending on a level of access available and consent level associated with the query, the intelligence layer 116 may be configured to estimate similarities between records to establish an estimated concordance between data records that may not be directly linked, for example, by a common field or identifier.

For example, records having a same address may not necessarily linked to a same person (e.g., there may be more than one person living at the address, or the address information may be out of date), but there may be other fields having information which do suggest it is a same person (e.g., consistent purchase trends), among others. When conducting queries or conducting machine learning, the intelligence layer 116 may be configured to flag certain records as potentially related to common entities (e.g., such as the same person or same company) when generating query results or machine learning results.

In some embodiments, a lack of precision unless specific keys are provided may be a deliberate technical feature of the platform, as, for example, when an individual does not provide consent (or has not received compensation for such consent) as evidenced by the provisioning of keys or the establishment of the digital contract, the data custodian does not allow a specific level of granular access to particular fields or does not allow certain query types to be run on those fields of those records. Where such consent is obtained, for example, through informed consent of the individual in exchange of various services or compensation, a corresponding key or tracked consent aspect can be recorded by the platform and the data custodian may allow for more granular access to the data for improved precision in analytics.

To provide an example embodiment, an individual may utilize a browser that is specially configured such that the individual's search behavior can be monetized with the consent of the individual. The browser may generate search result data records, such as "Date: 2020-09-10; time: 10:35 UTC; Search string: how to get from Tokyo to Osaka; IP address: 15.29.155.205, MAC address: 00000ABB28FC; user name: John Smith; user location: Detroit, Michigan, USA; unique identifier 00-AA-BD-4E; email address johnsmith@example.com".

The browser may be configured to automatically load data into the data warehouse described in various embodiments herein, protected (e.g., encrypted) at various levels based on the consent requirements of a digital contract associated with the individual. The data loader may also augment or modify the data fields on loading, for example, generating a country field based on the IP address, or deliberately perturbing certain aspects of the data, such as a timestamp (to increase privacy). The custodian data process may also be configured to restrict query types and access types to the underlying data. In this example, certain fields, in some embodiments, are not protected and are generally query-able and accessible, such as date, and search string.

An advertising company may desire access to customer data for the purposes of conducting a legitimate marketing campaign, and wishes to combine the data with records of a financial institution to conduct analyses for a travel marketing campaign in Japan.

The individual may provide informed consent through the provisioning of one or more encryption keys or providing access through consent records stored or accessible by the platform 101. The informed consent, for example, can be provided through compensation provided to the individual. In some embodiments, the consent may be provided based on one or more rules established by the individual (e.g., for accessing the individual's data in aggregate, a per query rate of $0.01 is required).

Different tiers of access can thus be established, for example, a per query rate of $0.10 can be required if access to the user's unique identifier is provisioned for the campaign (which allows for analyzing across all search queries by the same user), or a per query rate of $1.00 can be required if access to the user's name or email address is provisioned for the campaign (which allows for analyzing across other disparate records where the same name or email address was used). Access can also be granularly controlled in respect of individual types of query operations, such as only allowing for usage in aggregate counting ("how many example.com email addresses") as opposed to direct requests of an email address ("requests for specific email addresses so that the individual can be sent advertising emails").

As the platform 101 tracks a pooled set of data obtained across multiple parties and/or devices, the advertising company is able to conduct coordinated analytics to obtain insights across a larger data set while the platform 101, through the data custodian and the data loader, is able to automatically enforce privacy controls by allowing or denying access to queries and/or machine learning inputs/outputs. The platform 101 may be utilized as an exchange where compensation may also be tracked for usage of certain personal information of individuals or organizations (e.g., to track information reciprocity).

Figure 1C:
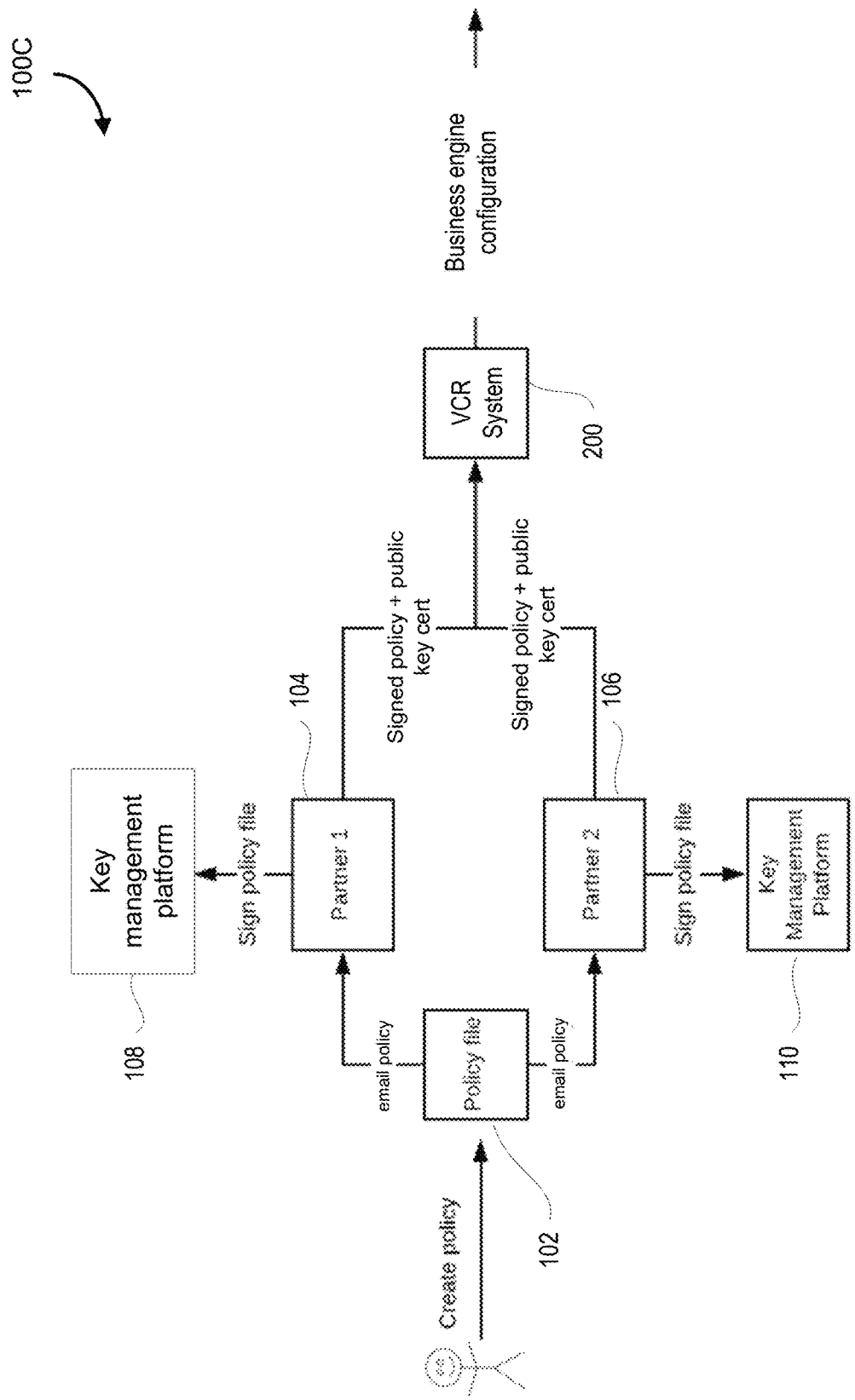
FIG. 1C is a block schematic diagram of an example workflow of the system with two partners, according to some embodiments.

FIG. 1C is a block schematic diagram of an example workflow of the system with two partners, according to some embodiments. In workflow 100, a policy file 102 is emailed to the partners involved, in this case, two partners 104 and 106. Both partners sign a policy file 102, the policy file, for example, including a set of machine interpretable policy instructions which are uploaded in accordance with the respective key management platforms 108 and 110. The signed policy and public key certification are sent to the VCR system 200, and the business engine configuration.

The VCR system 200 refers to a "virtual clean room" system, which is adapted for the secure receipt, protection, and processing of data from the parties (or other additional parties). On other types of systems, an Operating System (OS) kernel may have unrestricted access to a machine's hardware resources. The kernel in this example exposes most of its access permissions to a root user without any restrictions. Additionally, a root user can extend or modify the kernel on a running system. This means that if an attacker is able to gain root level privileges, they can compromise every secret and bypass every security policy on the machine.

Accordingly, the VCR system 200 is a secure enclave based system that is specially configured to ensure that information inside a secure enclave is protected from malicious insiders, compromised host operating systems, and firmware compromises, among others. The technical tradeoff is that the enhanced security and constrained environment yields more technical challenges in implementation as privacy techniques need to be considered and automatically implemented at all steps.

The involved parties (partners) may not trust the data policies of one another, network security, or the security of the computing infrastructure, and require enhanced technological assurances that sensitive data has strong data security provisions in place. Enhanced privacy and security are required as the data sets typically contain sensitive and proprietary data of the parties, or surrogates/derivatives of such data.

The secure enclave interoperates with secure blocks of memory containing code and data. The contents of an enclave are transparently encrypted every time the contents written to a RAM. The processor governs access to the enclave memory: any attempt to access the enclave's memory from outside the enclave is blocked. The value that the enclave offers is that it allows these secure environments to be created without having to trust the integrity of the operating system, hypervisor, or any other layers of the system. The processor itself validates and protects the enclave, so as long as the processor is trusted, the enclave can be trusted. This is attractive in, for example, cloudhosting scenarios: while most people trust that the cloud host isn't malicious and isn't spying on sensitive data used on its systems, the enclave removes the need to assume. Even if the hypervisor and operating system are compromised, the integrity and confidentiality of the enclave would be unaffected.

In particular, a data custodian architecture and a corresponding data agent architecture (including a data loader) are described for interoperation with a trusted execution environment, such as the secure enclave, having a segregated or isolated data processing subsystem controlling access to protected database elements (e.g., in the context of a relational database, protected tabular database tables, or in a non-relational database, protected non-tabular data, such as documents or dynamically defined schemas). The access to protected database elements can be provisioned to the secure enclave for query/machine learning processing at various levels, such as at a database level, a table level, a row/column level, or an individual field level.

In some embodiments, protected database elements can also be extended within the protected database elements beyond the initially loaded data, and can include machine learning intermediate outputs, joined versions of various tables, future looking data extrapolated from existing data, derivative data, among others, and these additional elements may inherit restrictions or permissions from their parent data. Where there is a conflict of restrictions, in some embodiments, the most restrictive of restrictions is inherited.

The data encryption technology can include, for example, SQL databases and SQL servers, among others, that are configured to protect sensitive data at rest on the server, during movement between client and server and while the data is in use to ensure that sensitive data never appears as plaintext inside the database system.

Differing levels of protection can be established through the use of multiple or separate keys that can be established for each (e.g., a database level key, a table level key, a row/column level key, keys for individual fields), which can then be exposed accordingly so that the secure enclave only receives a minimum level of access required for processing the query or machine learning activities.

In the example of FIG. 1C, partner 1 104 can be a financial institution (e.g., Bank), and partner 2, 106, can be a grocery store (e.g., MyGrocery Inc.). MyGrocery and Bank are part of the VCR consortium that allows partners to share data in a secure manner and allow privacy preserving computations on the data. Bank and MyGrocery Inc, have their data schemes uploaded into a tamper proof replicated data store that allows either party to look at available data elements.

MyGrocery Inc wants to understand how many Bank users bought environmentally friendly product at their stores in the Greater Toronto Area (GTA) geospatial area. They want to understand the demand for these products and increase the number of environmentally friendly products in GTA stores. This can be achieved by combining Bank customer transaction data with merchant itemized SKU data. This combination can be achieved through loading both data tables and their corresponding records and conducting queries on both tables with relationships established through corresponding identifiers, such as a primary key or a foreign key, or in other embodiments, both data tables are loaded and then first joined together using the primary key or a foreign key (e.g., a join key), and then the query is then processed on the joined data tables.

In some embodiments, the confidential computing layer 112 is further configured to include automatic conflicts flagging or resolution logic during the joins, which can be useful where data from different heterogeneous sources may have some differences in syntax or data cleanliness. Flagging or resolution logic can be adapted to enable "fuzzy" matching or to accept a level of noise in establishing correspondence between the key values shared between the two data tables. For example, there may be differences in people's names, the syntax for area codes, phone numbers, email addresses, among others.

This amount of fuzzy matching may be varied or toggled based on, for example, the type of query being conducted and a requisite level of accuracy. For example, if a query is being conducted simply to identify a market size through counting a common element across both data tables and accuracy is not particularly important, the fuzzy matching trigger could be toggled on. Conversely, if accuracy is particularly important, such as in situations where a number of cases or open tickets is being counted, the fuzzy matching trigger could be toggled off. Fuzzy matching is particularly important for some embodiments as it can be more difficult for the parties to identify how good the matching is as there may not be an opportunity to directly access the joined data set to assess data integrity. For example, if the parties are blinded to the joined data sets, erroneous results may be obtained where dates are stored in one data table based on DD/MM/YYYY while the other data table has MM/DD/YYYY. In some embodiments, during the load/join process when processing a query, an additional metadata output may be a level of correspondence for the join key for the data sets, which can be used as an additional sanity check on the data combination.

Please note that the data here is provided to explain an example workflow, and variants are possible.

Step 1: Policy Initiation

MyGrocery looks at the available metadata from Bank on the VCR platform and construct a policy data object as data file 102 and sends it for approval to Bank. The policy data file 102 is inserted into the network and Bank is notified of a pending policy. The policy can be public or private based on the use-case and configuration, and in an embodiment, no other participant in the network expect Bank can see the entry. Any entry into the application tables is signed by the private key of the loader that allows other parties to validate that the policy came from a legitimate partner of the VCR ecosystem.

"PolicyID": "988119d6cca702beb1748f4eb497e31-6467f69580ffa125aa8bcb6fb63dce237", "KEKHandle": "MGKEK@MYGROC.NET",
"DatabaseURL": "@ConnectionString"
"ResultDestination": "@MyGROCDataAgnent.NET",
 "Query": "CNT ((Bank.CRD_NO==MYGRC.CRD_NO && MYGRC.PSTL_CDE IN (M2,M1) && SKU_LIST STARTSWITH("ECO"))"
 "DateRange": "Start: "08/01/2020"," End: "08/31/2020"

Step 2: Policy Acceptance

Bank receives a notification from the network that a partner is waiting on confirmation.

An Bank approved administrator/VCR user processes the request and either approves the request or denies the request. The act of approval will create the Bank version of the policy that will be appended to the policy definition as a data object in policy file 102 started by MyGrocery.

"PolicyID": "988119d6cca702beb1748f4eb497e3164-67f69580ffa125aa8bcb6fb63dce237", "KEKHandle": "BankKEK@Bank.NET",
"DatabaseURL": "@ConnectionString"
"ResultDestination": "@MyGROCDataAgnent.NET"
 "Query": "CNT((Bank.CRD_NO==MYGRC.CRD_NO && MYGRC.PSTL_CDE IN (M2,M1) && SKU_LIST STARTSWITH("ECO"))"
 "DateRange": "Start: "08/01/2020"," End: "08/31/2020"

Step 3: Table Creation and Data Load

Once the policy 102 has been verified and agreed upon, both parties can create tables and metadata and upload data to the encrypted datastore.

All the data sent to the datastore is protected by keys owned by the respective parties.

Each column of data can have a unique data encryption (or in some embodiments, rows, tables, individual cells).

Key Encryption Key (KEK): Asymmetric key based on Elliptic curve or RSA-2048

Data Protection Key (DPK): Symmetric key based on AES

Bank Data

| Column Name | Description | Additional Metadata |
|---|---|---|
| CRD_NO | Credit card number | "Restrictions":"NE", "DPK":"encryptedBankDEK" |
| TXN_DT | Date of transaction | "Restrictions":"NE", "DPK":"encryptedBankDEK" |
| MRCHT_NM | Name of merchant | "Restrictions":"NE", "DPK":"encryptedBankDEK" |
| PRCH_AMT | Amount of Purchase | "Restrictions":"NE", "DPK":"encryptedBankDEK" |

MyGrocery Inc

| Column Name | Description | Additional Metadata |
|---|---|---|
| CRD_NO | Credit Card Number | "Restrictions":"NE", "DPK":"encryptedMGDEK" |
| TXN_DT | Date of transaction | "Restrictions":"NE", "DPK":"encryptedMGDEK" |
| MRCH_NM | Name of Merchant | "Restrictions":"NE", "DPK":"encryptedMGDEK" |
| SKU_LIST | Itemized list of SKU purchases | "Restrictions":"NE", "DPK":"encryptedMGDEK" |
| PSTL_CDE | Postal code of Purchase | "Restrictions":"NE", "DPK":"encryptedMGDEK" |

FIG. 2A is a block diagram of an example VCR Agent and VCR Custodian, according to some embodiments. The diagram illustrates the VCR System 200, which can be split into two components, the VCR Agent 202 and VCR Custodian 204. In 202, an orchestrator loads partner data, which is bulk imported by the Data Agent, authenticated and authorized.

VCR Custodian 204 is organized into three sub-components, Data Agent (enclave), VCR Enclave, and VCR Host. VCR Custodian 204 forwards the query to SQL Driver Proxy and to ODBC, and decrypts ECEK. The business engine analyzes, rejects or accepts the query based on the policy agreed upon by the partners, 102, and the key manager calls into exposed APIs. The query is executed for an example campaign within the campaign program. An example campaign may be conducted by one or more parties, which, for example, can include a query or a machine learning processing task associated with the combined information of the one or more parties.

In an example, a campaign may be related to two companies operating in different fields, such as a grocery store and a financial institution seeking to generate highly targeted offers using queries on combined data (e.g., identify the number of bank customers having high credit scores that bought toast as identified by a SKU at a particular store location), while improving privacy of the data such that the underlying data is not accessible in an exposed format.

The data custodian and the data agent, in some embodiments, can be implemented as data processes that operate in software modules, for example, as daemon processes that can be interacted with through query requests, etc., by way of an application programming interface (API). In some embodiments, the data agent can provide an interface layer through an API that translates various requests for automatic provisioning through the secure enclave system (e.g., data load or query processing). For example, for a specific user or process, it may appear simply that the interface is able to conduct queries across multiple data sets, even if the data set is not owned by party making the query.

Figure 2B:
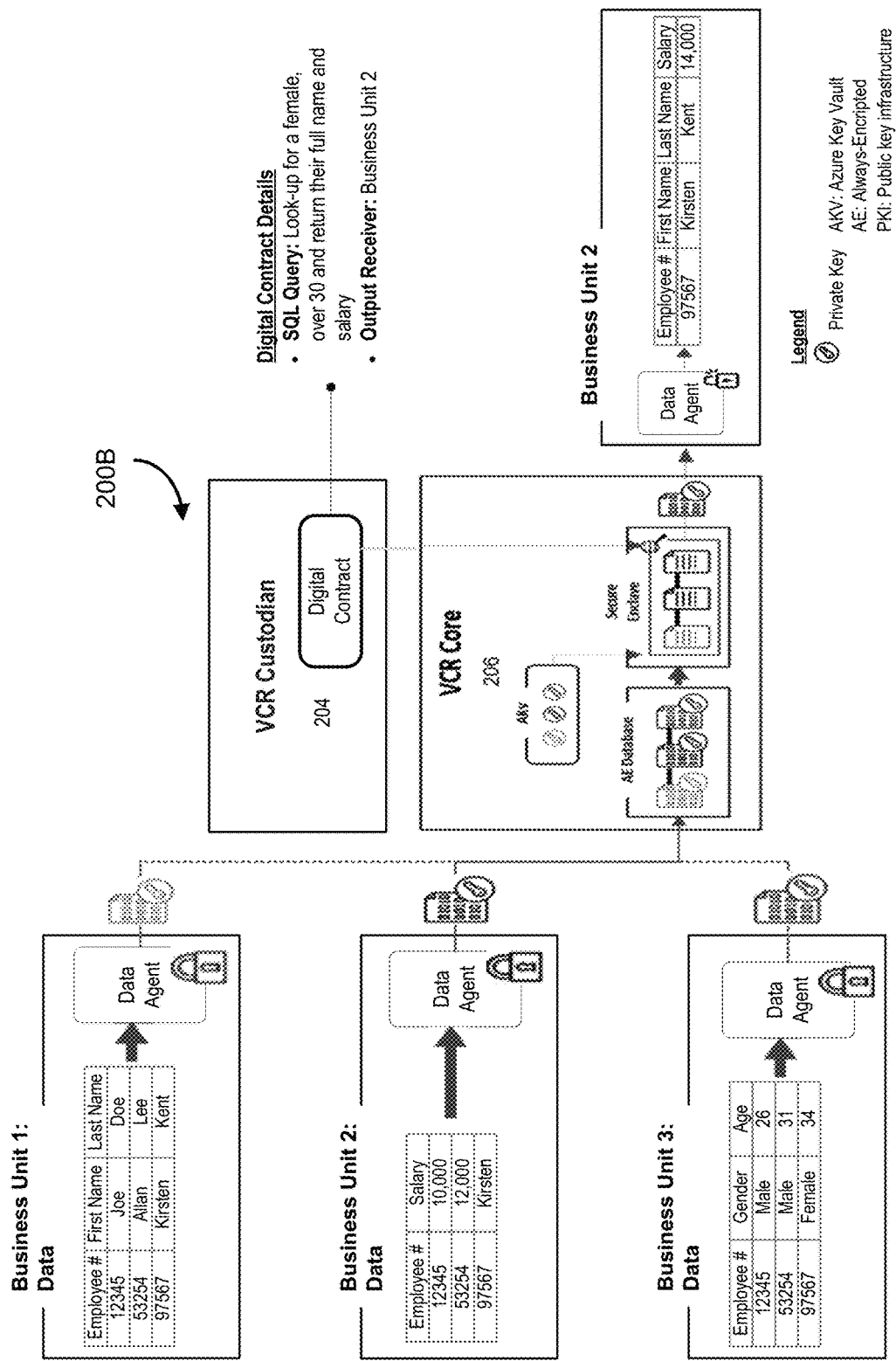
FIG. 2B is a flow diagram example of three business units performing an SQL query using the VCR data custodian data process and VCR Core, according to some embodiments.

FIG. 2B is a flow diagram example of three partners (in this example, business units) performing an SQL query using the VCR Custodian 204 and VCR Core 206, according to some embodiments. The diagram demonstrates that the data is protected from any person, system or process, and is only decrypted during query execution, per the digital contract. For efficiency and scalability, in some embodiments, the enclaves themselves do not store large amounts of data, and data is stored in file systems by keys protected via attestation policies. Attestation is the process by which a relying party can verify that the service that they are sharing secrets with is running on genuine hardware that support secure enclaves and is running a version of the software that was agreed upon. The attestation process can be conducted based on difficult to emulate signatures generated based on hardware or software, including, for example, digests generated from versions of firmware or software that change if there is even a slight modification to the firmware or the software. Similarly, attestation values can be generated from hardware values that are difficult to reproduce (e.g., specific values for on-board resistors, capacitors, inductors).

Analytics in the VCR system 200 can be performed, for example, similar to SQL-based databases (inclusive of traditional SQL operators), but are executed in an always-encrypted environment.

An important distinction of the described system is that the analytics are executed using the underlying data, but the data itself is protected by hardware based security, specifically secure enclave technology and contract entitlement such that outside parties are not able to access the underlying data after it has been loaded. Key management can be based on public key infrastructure protected by secure enclave and hardware security models.

Figure 2C:
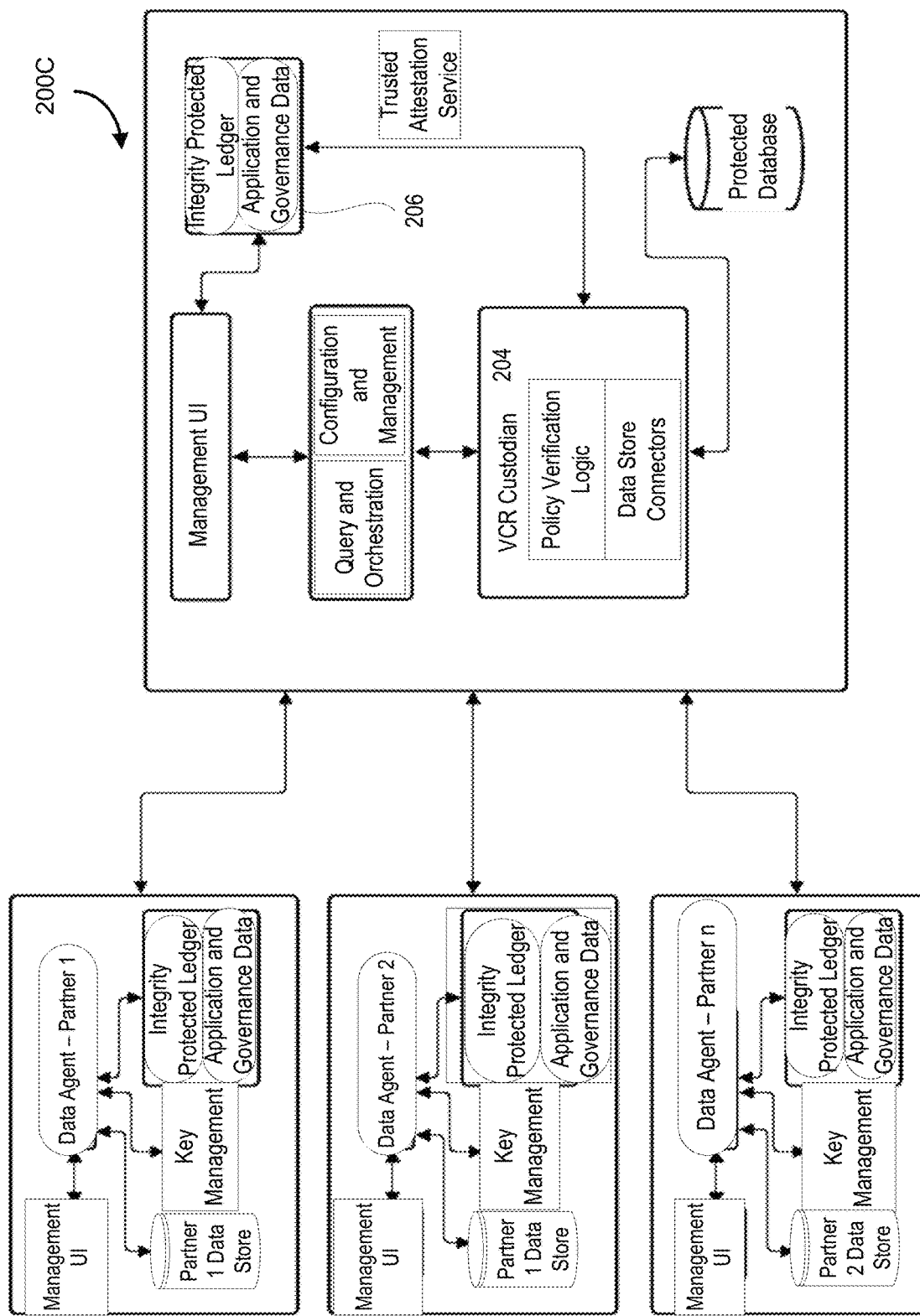
FIG. 2C is a diagram illustrating the VCR components for n partners, according to some embodiments.

FIG. 2C is a diagram illustrating the VCR components for n partners, according to some embodiments. The VCR system 200 is illustrated, for n partners, through to VCR Custodian 204 and VCR Core 206. The data custodian data process accordingly controls the processing of a query received in the form of a query data object.

The query data object represents a proposed query to be operated on one or more protected database elements residing on the protected memory region, and the proposed query can include, in some embodiments, domain-specific language instructions for parsing (e.g., SQL queries), natural language processing queries, or other types of query language based queries. The proposed query can be, for example, a query that utilizes the combination of two different database portions provided from different parties. In some embodiments, the protected data elements create an intermingled database from the various parties, and in some embodiments, it may be intentionally difficult to discern which protected data elements are provided from which party.

Upon a determination that the query data object adheres to the data protection policies, the data custodian data process generates and transmits a control message (e.g., a "quote message") to an attestation process to validate that the data custodian data process is operating on the secure enclave data processor. In a further embodiment, the query itself or a machine learning architecture (or both) is validated by the data custodian data process before execution. The query or the machine learning architecture can be associated with a hash (or other type of parity or error correcting/error validation approach) of the underlying instruction sets or machine learning architecture code/values/weights, and this additional validation step can be required before either execution or releasing of keys to unlock portions of protected databases or data tables.

The control message can include elements of information, such as a hash of the software code of the secure enclave to attest that the code is of a specific version and has not been tampered with, a version number or a firmware number of the secure enclave, various physical or identifying characteristics of the enclave (e.g., operation on a processor bearing the serial number 1GH5HY, on software build 1503), among others. The control message is provided, for example, to an attestation service or process which responds with an attestation token data object. The attestation token data object is then utilized by the data custodian data process to release data protection keys for the unlocking of the protected database elements.

For example, the attestation token data object can be provided to a key manager process to obtain the data protection keys. The query can then be executed on the protected database elements after they have been unlocked.

In a machine learning scenario, rather than having singular queries conducted, periodic or multiple queries may be handled by the data custodian data process, for example, to continually update the machine learning model data architecture based on incrementally received information to continue tuning the machine learning model data architecture during a training phase. In some embodiments, the training phase is continuous as the machine learning adapts to changes to current trends.

Figure 3:
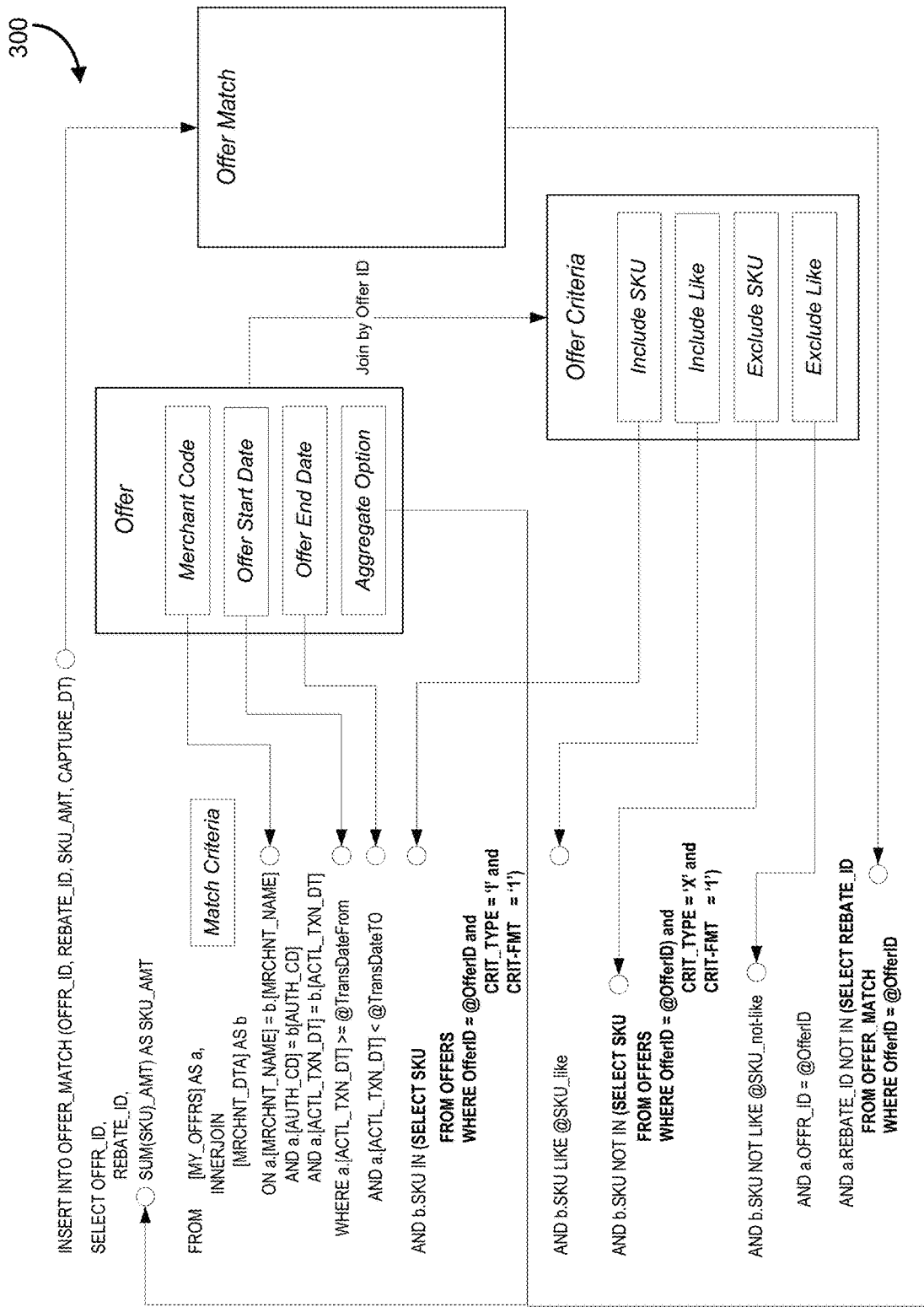
FIG. 3 is a labelled process diagram of a sample query, according to some embodiments.

FIG. 3 is a labelled process diagram of a sample query, according to some embodiments. Process 300 is a detailed sample query, which shows the match criteria. This includes the offer, with a merchant code, offer start and end date, and aggregate option, as well as the offer criteria which includes the conditions for including or excluding the SKU and other aspects. The offer and offer criteria can be connected by the offer ID, and together combine to give an offer match. FIG. 3 shows an example INNER JOIN operation for matching an offer and offer criteria. In this example, the information is obtained from two separate data tables that can be associated with different parties (e.g., from two different data providers). The system can be used to provide a secure ecosystem from which two separate parties who do not trust each other (or would like to maintain segregation for data privacy issues or regulatory compliance) can use to conduct an offer campaign across various products and/or offerings.

The system can be used as an improved privacy version for analytics campaign, for example, based on tracked interactions with web browsing, purchasing data, among others. A benefit to such the approach of some embodiments is the "always secured" nature of the raw data sets, while allowing specific analytics to be conducted thereon, does not provide underlying access to information that could ultimately be used to unduly obtain information about a specific individual. A challenge with privacy for alternative third party cookie approaches is that the behavior of individuals could be tracked, akin to spyware or malware, and there are little safeguards preventing the downstream malicious dissemination or use of the data stored on the cookies.

Embodiments are not limited to offer campaigns, and can include other types of analyses, such as collaborative machine learning (e.g., two hospital networks collaborating to improve a rare disease model, multiple insurance companies pooling data to improve accuracy of motor vehicle claim premium determinations), supporting accounting audits or statistical analyses (e.g., aiding in the generation of data sets across a randomized audit criteria or selection methodology), scientific or experimental studies or validations thereof (e.g., allowing third party observers to conduct blinded studies whereby there is no ability to influence or even observe the full raw data when conducting queries). For example, the data JOINs used are not necessarily all of a table, but rather, in an audit situation, based on an audit policy and protocol, randomly selected rows or fields of the table can be ingested instead.

Figure 4:
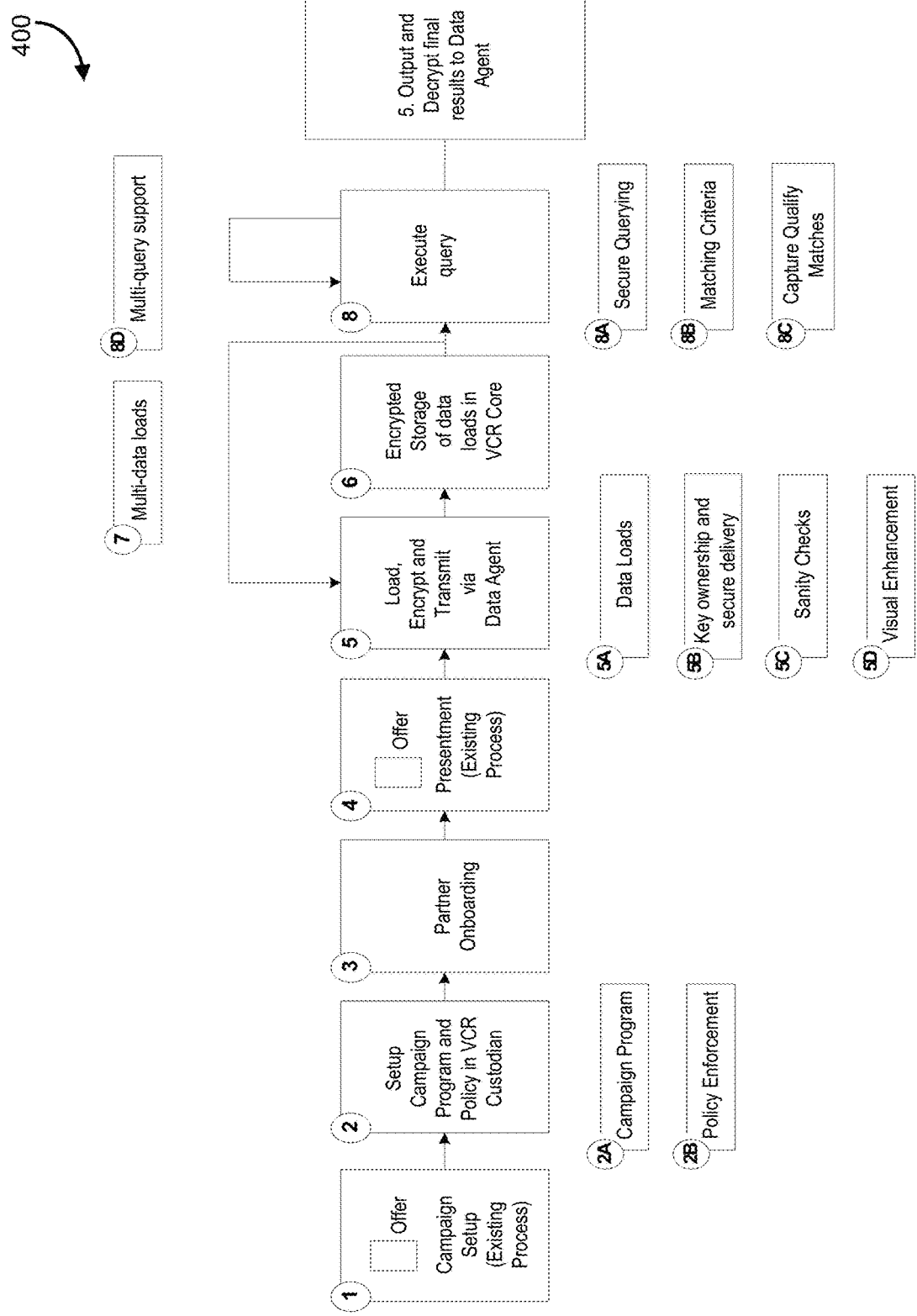
FIG. 4 is a flow diagram illustrating a conceptual view of the principle system flow from offer to output, according to some embodiments.

FIG. 4 is a flow diagram illustrating a conceptual view of the principal system flow from offer to output, according to some embodiments. Process 400 demonstrates the flow from the offer campaign setup to the output and decrypted final results to the Data Agent.

The offer campaign setup is an existing process, which includes a target audience for the offer.

In the setup campaign program and policy in VCR Custodian, a new campaign program can be created, in which the necessary data fields in the campaign specifications are completed (e.g., name of the campaign, partners, start date, end date, data schema), VCR partner tables are automatically generated per the data schema in always-encrypted SQL, and an SQL query based on campaign specific configuration is generated. The establishing of the campaign can also establish the initial roles being used, such as data provider, output consumer, enhanced output consumer, observer, etc.

The new campaign can be saved, as well as the existing campaign which can be edited, saved or deleted. The new campaign may be memorialized in the form of a policy data object that stores machine-interpretable instructions on how data provided by the partners can be used. The VCR custodian data process can automatically enforce the policy in the secure enclave, rejecting, in an embodiment, any query that is not adhering to the policy, or rejecting, in another embodiment, any query results that do not adhere to the policy, or a combination of both.

A new policy must be created, signed by the involved partners, and linked to the specific campaign. An audit log maintains a record of the created, edited, or deleted campaign programs, new policy, and signed policy. The log may capture information such as the date, time, campaign name, operation (e.g., create, edit, delete), "VCR operator", policy operation, policy signed, and/or PartnerID. The audit log can thus be used in the future for indicating adherence to a particular set of privacy principles, such as privacy requirements mandated by regulation.

Partner onboarding can involve various steps, one such step is providing the data agent to the partner and installation/usage instructions, which is a manual process. The data agent configuration files that contains specification (e.g., sanity check) are provided to the partner's data agent (manual process). As described in some embodiments is a Offer presentment is can be used to show offers to various customers based on the output results. Load, encryption and transmission of the data can be conducted via the data agent operating in conjunction with the secure enclave, and the data custodian, in some embodiments, can also use the policy information data object to ensure that the data is in adherence to quality requirements prior to successful loading. This involves data loads, sanity checks, key ownership and secure delivery, visual enhancements, and activity logging on the data agent.

Encrypted storage of data loads in the VCR Core 206 store a transmitted partner's data into the VCR. The dataset is appended to their associate table in the VCR and handles duplicate transactions. The system can be designed where the partner can transmit multiple data loads (e.g., Daily) before the query is executed (e.g., Weekly query). As the data is protected, in some embodiments, the data loads can be provisioned with sensitive information. In another embodiment, the data loader controls the generation of surrogate data prior to loading of the data (e.g., re-mapping sensitive data such as using hashes of names).

The campaign program can be scheduled to automatically initiate and execute a query on a regular interval, which is configurable. New data loads by either partner is detected, and automatically initiates the SQL queries. The matches are qualified based on the offers construct, adding the matches to the match table and removing the previous matches from the previous query. The output results are encrypted and appended, and execution supports multiple queries.

The final results are decrypted and output to the appropriate partner's data agent. In some embodiments, the output results are encrypted using the partner's public key and the partner's data agent utilizes the partner's private key to be able to decrypt the information.

Figure 5:
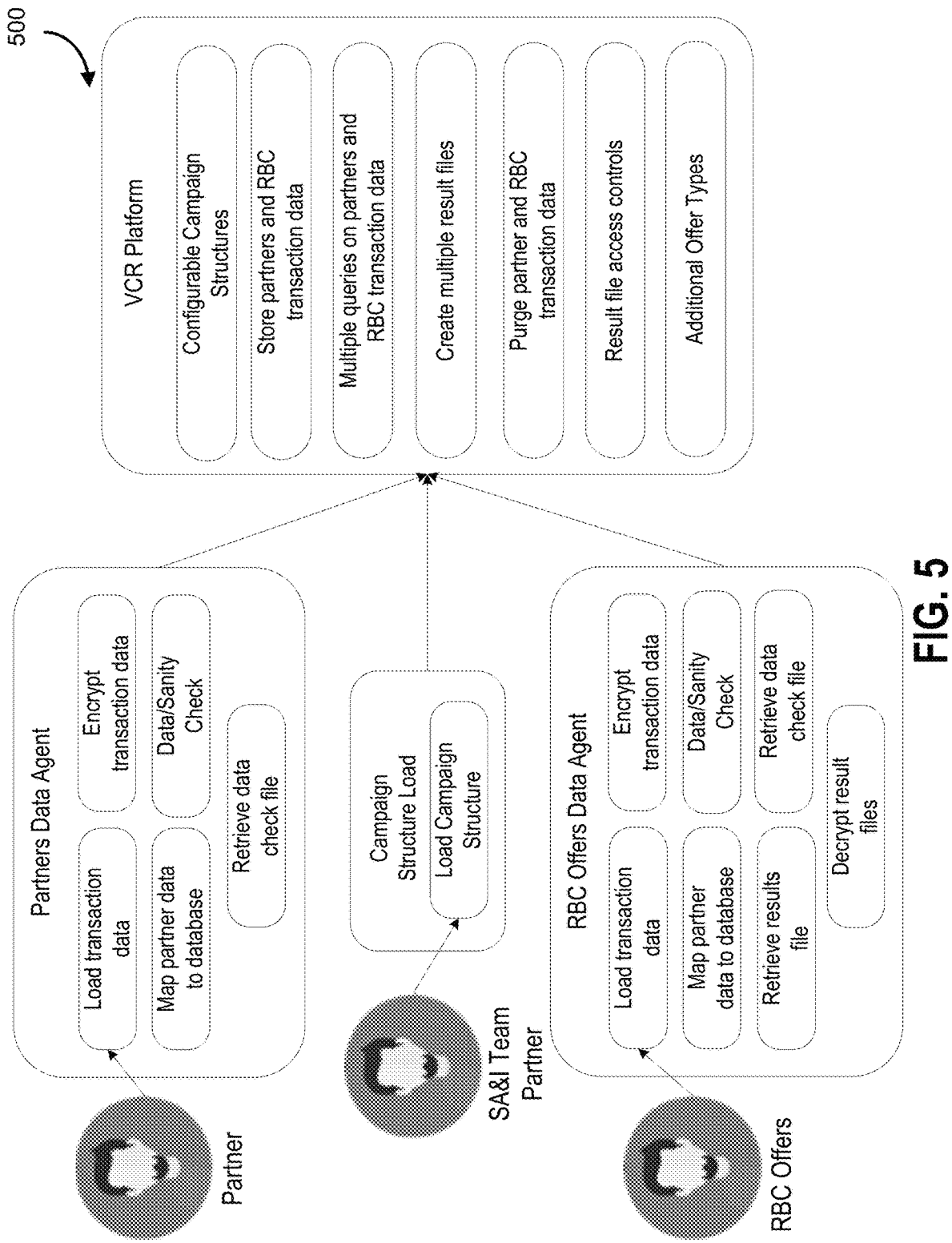
FIG. 5 is a block schematic, illustrative of the interaction between the partner data agents within the organization as data objects are transmitted and shared across tiers and systems, according to some embodiments.

FIG. 5 is a block schematic diagram, illustrative of the interaction between the partner data agents within the organization as data objects are transmitted and shared across tiers and systems, according to some embodiments. Diagram 500 represents the interactions within the system and opportunities that can be derived from the system.

For example, in 500, a partner's data agent and a bank offers data agent is represented, as well as an analytics team member. Both the partner and the bank data agents load transaction data, encrypt transaction data and map partner data to a database. Both agents create data/sanity checks and retrieve data check files. The bank offers data agent also performs two enhancements, where it retrieves the results file and decrypts the results. The analytics team member loads the campaign structure.

The VCR Platform possesses existing stored partner and bank transaction data, which can be purged from the platform so that it is not stored for an extended duration of time in an unprotected format. The VCR platform can also be configured to perform various enhancements, including configurable campaign structures, multiple queries on partners and bank transaction data, creates multiple result files, controls access to said result files, and additional offer types.

In some embodiments, the query response data object is inspected based on at least one of the data protection policies to ensure that the query response data object also adheres to the data protection policies. This is useful in a situation where a query is adapted maliciously or inadvertently to leak specific information (e.g., where a credit card number is not allowed to be exportable, but the query validation policy inadvertently allowed the number×2, which can then be easily reversed). A subset of policies can be adapted to investigate the query response data object as a secondary sanity check to ensure the policies were indeed adhered to. An example subset of policies can include preventing the output of any query results where a nine digit number is output (e.g., which may be a social insurance number). The data protection policies can be enforced through a result output validation engine and may have logical rules established therein that can be set at a global level for the platform (e.g., do not permit the output of social security numbers or fields thereof), or can be set at a local level for the platform for specific data sets, partners, or data fields (e.g., do not permit the output of counting queries where the count is less than 100—aids in reducing situations where even a count on a maliciously prepared query is able to be used for information leakage).

Figure 6:
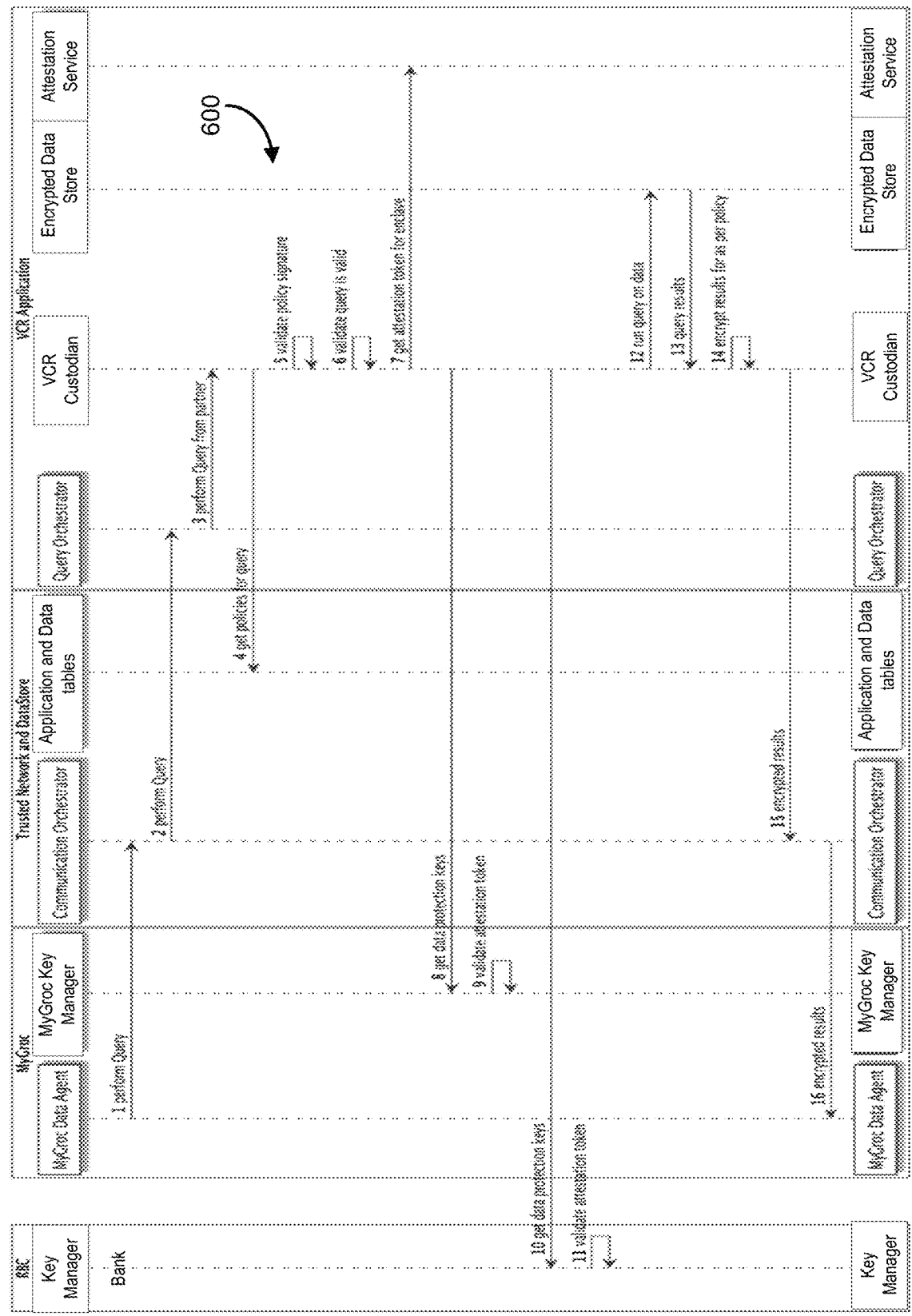
FIG. 6 is a flow diagram of an example query, illustrating the role of the VCR Custodian data process in processing and validating the example query to ensure automatic adherence to privacy principles, according to some embodiments.

FIG. 6 is a schematic diagram of an example query, illustrating the role of the VCR Data custodian data process, according to some embodiments. This scenario 600 assumes that data has been loaded into the VCR encrypted data store for querying. The query is initiated by one partner, in this example, MyGroc, via their data agent. The partner example here is a grocery store and a financial institution, but other examples are possible.

The query is constructed by the MyGroc data agent, and sent to the communication orchestrator for the trusted network. The orchestrator records the query for auditing purposes and sends the query to the VCR query endpoint. The query orchestrator forwards the query to the VCR Data custodian data process. The VCR data custodian data process queries the network to determine which policies apply to the query. The policies were previously recorded in the network by the partners that came to an agreement.

The data custodian data process verifies the policy to ensure that it is valid (signed by both parties) and active, and also validates the query that needs to be run against the policy. For instance, if the query is not valid (not within policy) and requests restricted information, the query will be rejected. For example, in the data metadata, credit card numbers may be marked as non-exportable. If a query requested all transactions for a specific credit card number, the data custodian data process would compare with the policy and reject the query. For example, in the data metadata the credit card number is marked "NE" which is non-exportable. So, if a query such as "give all transaction for a certain credit card number" the custodian will look at the policy that was agreed and will reject a "select" query.

The data custodian data process sends a quote (e.g., a control message) to the attestation service, that consists of the enclave measurements and proof that the data custodian data process is running on valid enclave hardware. The attestation service validates the quote and mints an attestation token which the custodian can provide to relying parties to ensure the data custodian data process is running the proper software on the appropriate hardware. The attestation token can also contain a data exchange public key that can facilitate secure communication of the data protection keys to the data custodian data process. The data exchange public key ensures that only the secure enclave can get access to the data protection key in plain text.

To run the query, the data custodian data process needs the data protection keys that are used to protect the data in the database. For example, in this case the two partners MyGroc and the Bank require the token provided by the attestation service to the data custodian data process to release the data protection keys. The data custodian data process provides the attestation token to the key manager to allow for the release of the keys.

The key manager enclave verifies the attestation token, sending back encrypted data encryption key to the data custodian data process. The data custodian data process requires the data protection keys, and verified tokens from all involved parties. The data custodian data process sends the query and data protection keys to the enclave running the computations in the database, which sends results back to the data custodian data process. The data custodian data process encrypts the data, in this example, using the MyGroc key as per policy. The results are orchestrated through the network and the success of the results is recorded in the audit trail. The results are received back by a data agent, in this example, the MyGroc data agent.

Figure 7:
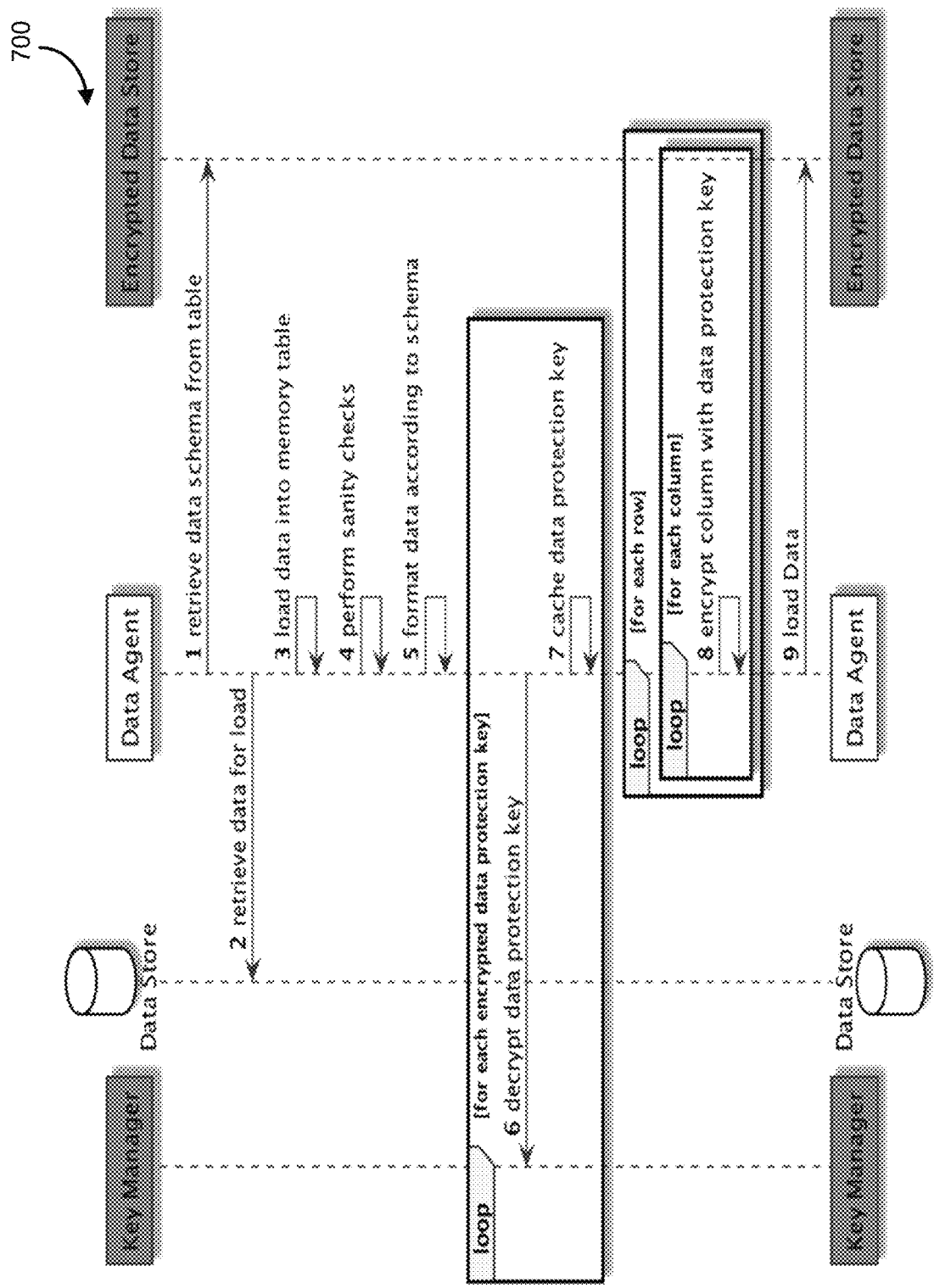
FIG. 7 is a flow diagram of table creation and data load, according to some embodiments.

FIG. 7 is a schematic diagram of table creation and data load, according to some embodiments. Once the policy has been verified and agreed upon, the involved parties can create tables and metadata, and upload data to the encrypted datastore, illustrated in 700. All the data sent to the datastore is protected by keys owned by the respective parties. Each data type can have a unique data encryption.

Scenario 700 assumes that the partners have already created tables as part of the policy agreement workflow. The data agent sends a query to the database to get the schema of the tables that it needs to upload to. The table name is either configured, or can be included in the policy. The data to be loaded into the platform is retrieved from the partner's data store. This can be done via a CSV file that is pre-formatted, or an adapter that the partner can create to their existing data sources.

The data is loaded into the memory of the data agent for formatting and sanity checks. These sanity checks are basic checks on the data against the policy to ensure that the data being loaded into the platform will provide optimum results. An example of a sanity check is the date range, to ensure the desired dates are being loaded. These checks may also include security checks to ensure protection against SQL injection attacks. The data may require further formatting, according to the schema. For example, normalizing time zones for the data. Time zone normalization can be particularly important in certain situations, especially where there is global or multi time-zone based operations. In some embodiments, the time-zone normalization is based on normalizing on a relative standard, such as UTC.

As part of the key management process, the symmetric data protection keys used to protect data in the database are part of the database, encrypted under an asymmetric key encryption key. In this step the data agent decrypts the data protection key(s). Key management can be performed at the partner location, and leverage the enclave for additional protection of the data protection keys. The data protection keys are cached in application memory.

Each data type (column) is encrypted using a symmetric algorithm, for example AES-256. The encrypted dataset is loaded into the database using tools such as SQL bulk copy.

Figure 8:
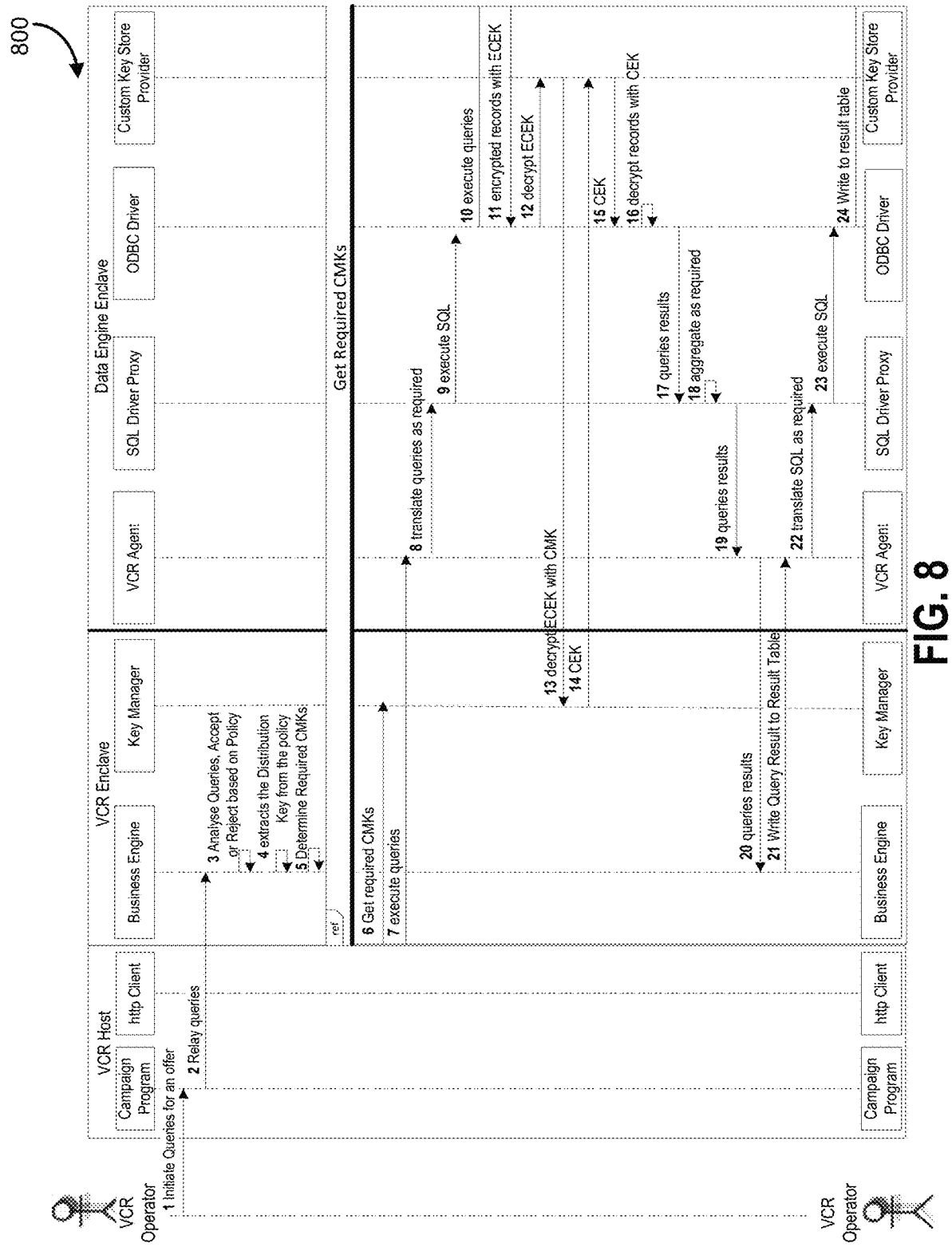
FIG. 8 is a flow diagram example of running a campaign query, according to some embodiments.

FIG. 8 is a flow diagram example of running a campaign query, according to some embodiments. In process 800, the VCR operator initiates a campaign query for an offer. The data custodian is a data process that, in an embodiment, is operated within a secure enclave data processor that conducts automated policy enforcement of data protection policies to periodically or continuously ensure that privacy principles of the secured environment are being adhered to. The data custodian applies the data protection policies to control whether the query should be processed or rejected, and the data protection policies can include data-level data protection policies, global data protection policies, or party-specific data protection policies.

For data-level data protection policies, the underlying data may be associated or flagged with (e.g., in accompanying metadata) including the types of query operations that are permitted or prohibited, or if additional transformations are necessary to the data before it can be surfaced (e.g., replacement with a hashed surrogate version). For example, the data-level data protection policies can allow aggregate level operations (e.g., count the number of customers having purchased avocadoes in August), but prohibit inclusion of the specific sensitive information in any outputs (e.g., names, dates of birth, social insurance numbers, credit card numbers, phone numbers, addresses, pre-existing health condition status can all labelled non-exportable and in accordance with such a policy, any query attempting to obtain any of these as an output will be declined). In some embodiments, data-level data protection policies are provided in coupled metadata, stored, for example, in a separate tabular row or column, or as reference data objects (e.g., using pointers to establish interrelationships).

For global data protection policies, various types of underlying data can always be set as having specific permissions or prohibitions always occurring. For example, a global data protection policy can enforce various technical and operational standards (e.g., those adapted to protected credit card information). These policies can apply regardless of the party who originated the loaded data. An example global data protection policy can include a prohibition on extracting from a query, which party specific information originated from. This can be a useful increase in privacy as, for example, for a very rare disease, even identifying an insurance provider may be enough to identify the individual. Similarly, there may be use cases where the parties themselves do not wish to be identifiable (e.g., anonymous submissions of code vulnerability reports).

Party-specific data protection policies can include specific requirements provided by a party in respect to all original data owned by or provided by the party, and in some embodiments, can be inherited by any data derived from the original data owned by or provided by the party as well. For example, a financial institution may enforce a policy whereby all data associated with the financial institution must be replaced with surrogate data, or whereby all account numbers are protected with a highest level of access security.

Party-specific data protection policies can also be used to control access by various parties and to control remuneration (e.g., a compensated data exchange wherein the underlying data is always protected with privacy preserving principles) or other type of statistical usage tracking. For example, in some embodiments, a party may seek to obtain remuneration for its efforts in making data available and a policy may be to set an access control list for its data. In another embodiment, the system may track data usage and interconnections to establish an audit trail in the event of a breach or to track statistics on which data sets were more often accessed.

Figure 9:
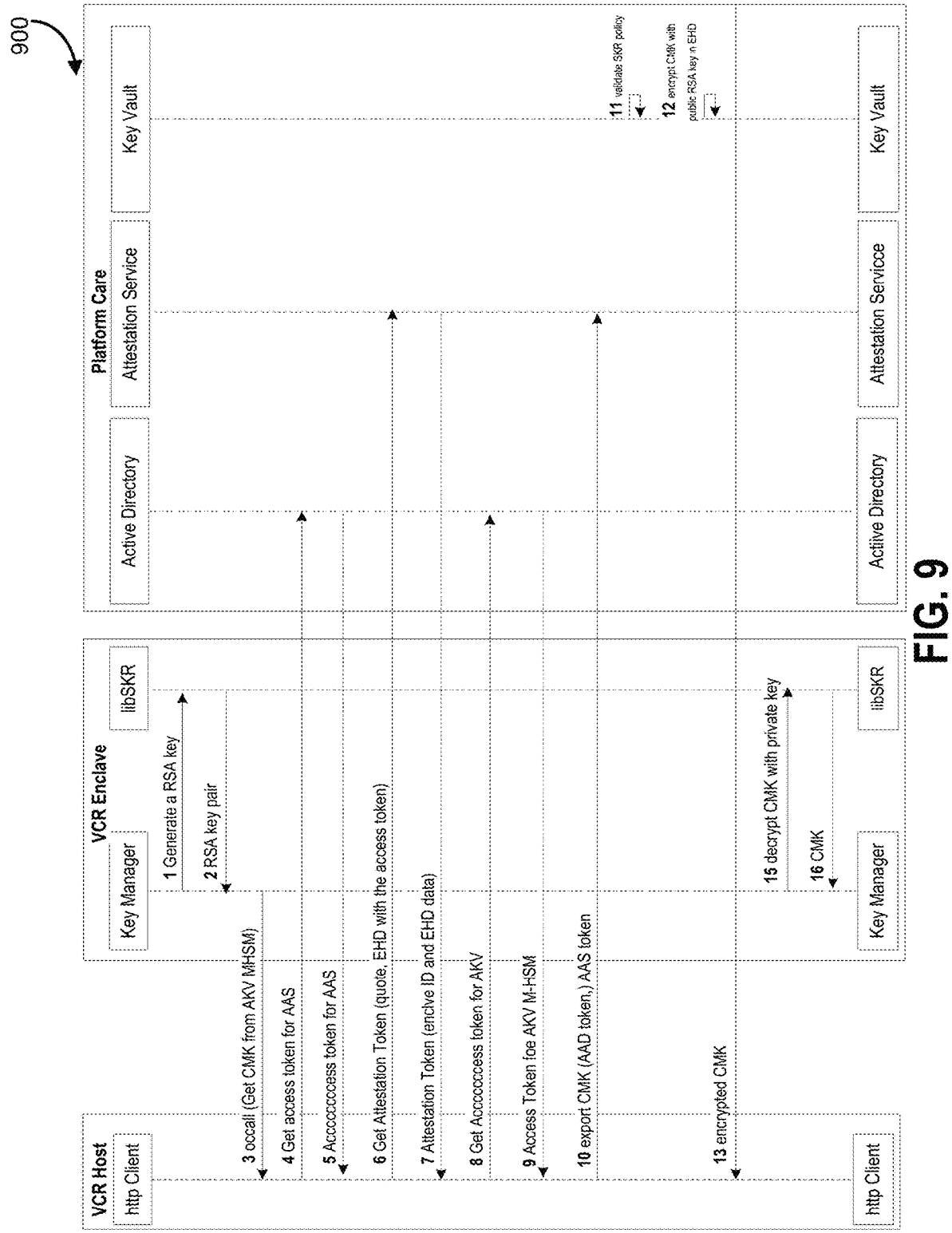
FIG. 9 is a flow diagram illustrating the retrieval of required CMKs, according to some embodiments.

FIG. 9 is a flow diagram illustrating the retrieval of required customer master keys (CMKs), according to some embodiments. In some embodiments 900, the data agent data process operates with a key manager to encrypt the data prior of encrypted data packets to the secure enclave system for loading onto as protected data elements. In some embodiments, the encryption is conducted using a public/private key shared in advance with the secure enclave so that the secure enclave is able to decrypt the transmitted data and load the data into the protected data elements (in some embodiments, encrypting it again using an internal key and inserting it into the secure enclave). In this example, the key manager obtains keys from the key vault.

In some embodiments, the query response data object is encrypted using a public key associated with a requesting party prior to provisioning as an encrypted output data object. In this embodiment, the query response data object is not exposed, and instead, only the encrypted output data object is exposed to further improve computational security and reduce potential exposure.

Figure 10:
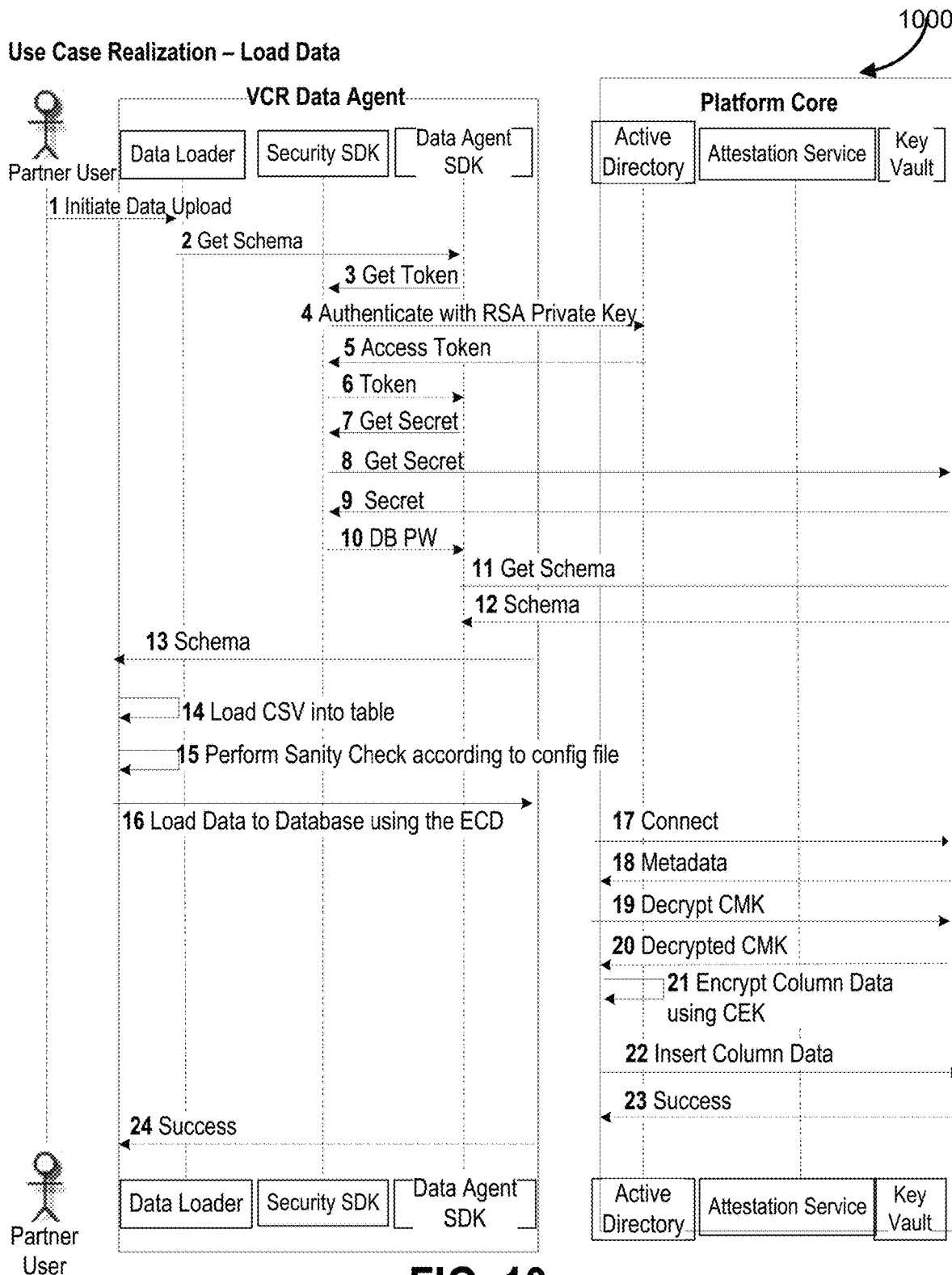
FIG. 10 is a flow diagram example of data uploading to the VCR platform core, according to some embodiments.

FIG. 10 is a flow diagram example of data uploading to the VCR platform core, according to some embodiments. Process 1000 illustrates the data loading, in some embodiments, with more depth. The data agent data process is configured to receive data inputs indicative of a schema of data elements (e.g., data tables) that the data agent is adapted to load data into. The data agent data process receives raw data from a data repository (e.g., SKU-level transaction data) and conducts one or more validation processing steps to process the raw data in accordance with the schema requirements.

These validation processing steps are particularly important as once loaded into data warehouse (e.g., always-secure database structure) by the secure enclave, it may be very difficult or impossible to change or update the data. Accordingly, the insertion of unclean, incorrect, malicious, or incomplete data could have significant negative effects that the data agent data process is adapted to mitigate.

These validation processing steps can include, in some embodiments, the application of formatting (e.g., time code formatting), security (e.g., avoiding SQL injection attacks), or sanity checks (e.g., blank avoidance, numerical validation), and in some embodiments, additional transformation to the data is conducted, for example, to perturb specific data values to add a level of uncertainty (e.g., credit scores can be adjusted so specific credit scores are never provided, even into the secure enclave). In some embodiments, the data is transformed such that the data is replaced with surrogate data at this step. The data transformation can be conducted using, for example, various generative approaches, or a substitution approach. In a generative approach, a set of new data values can be generated with a level of noise applied to perturb the data sets prior to load as an additional layer of information security. If the noise is not too great, the data may still be useful for various types of rough queries. In a substitution approach, data values in sensitive fields may be swapped with hashes or other encoded representations of the data values. This can include assigning a number for each of the unique data values and using that as a substitute (e.g., creating a userID for every unique user, and swapping their names for the userID so that even if the data is compromised, it will be difficult to make the connection between UserID 10204 and Username="John Smith").

The data can have one or more associated data-level data protection policies applied at this step through, for example generation of metadata or adding information into the database structure (e.g., adding rows or columns to the table). In some embodiments, the schema itself includes space (e.g., columns) for metadata indicative of data-level data protection policies.

Data-level data protection policies can include aspects such as ensuring that specific data is never exposed ("NE") as is, and this can be used, for example, for sensitive information, such as addresses or names. On the other hand, information such as ZIP codes, can be coded as exposable.

In some embodiments, the data itself is formatted with metadata associated with a confidence level/score attesting to the accuracy of the data. For example, time data obtained by a GPS system can be extremely precise, while time data obtained by a computer clock has limited precision. The confidence level/score can be used during downstream processing to indicate the limits of possible precision as the lowest accuracy level of the combined data, for example. In this example, the combined data should likely not be utilized for location determinations requiring highly precise time values.

Figure 11:
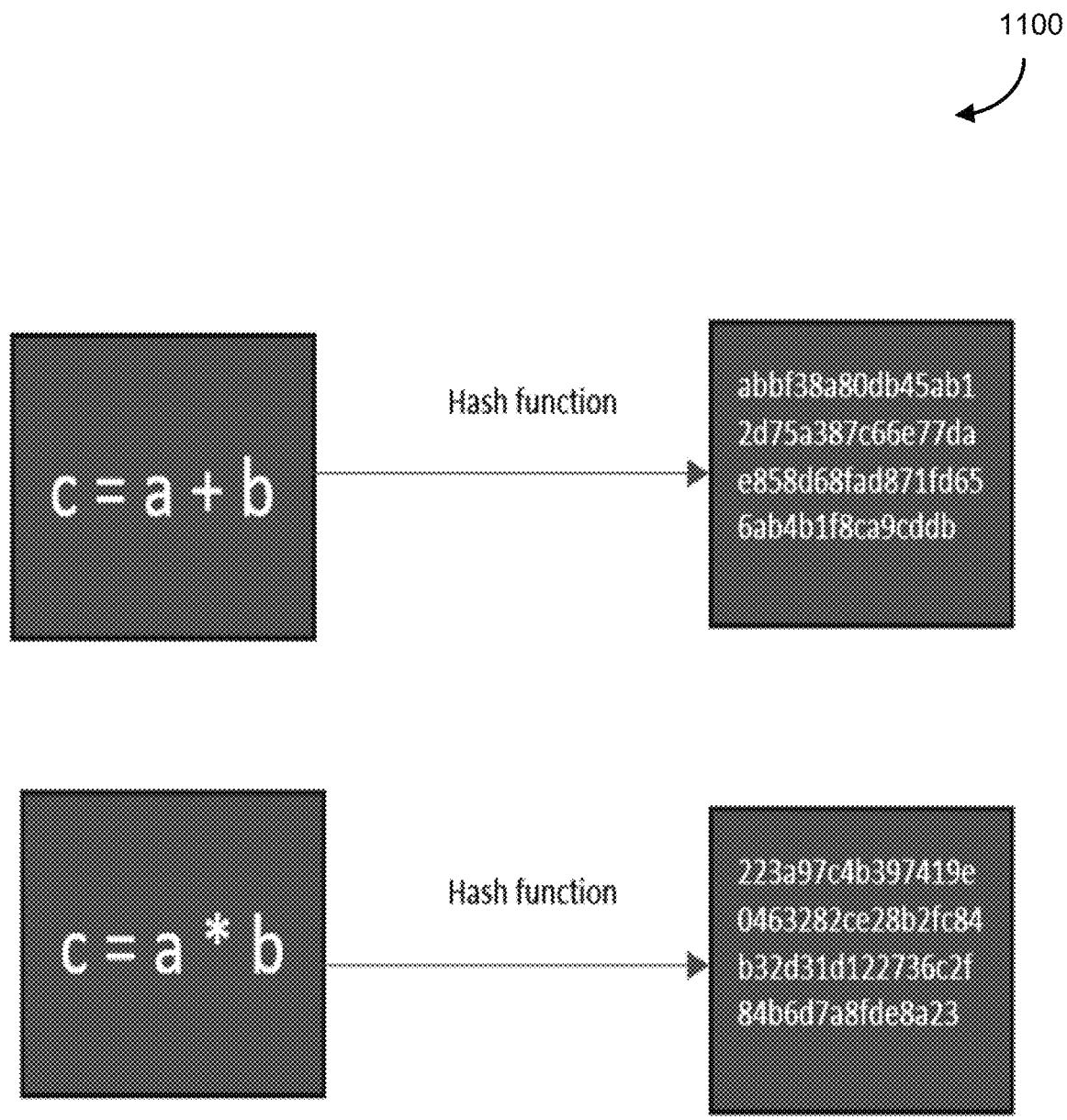
FIG. 11 is a diagram of attestation illustrating an example hash function to provide additional security, according to some embodiments.

FIG. 11 is a diagram of attestation illustrating an example hash function to provide additional security, according to some embodiments. In 1100, attestation provides a useful opportunity to provide an additional layer of trust, using tools such as the secure enclave (e.g., Intel SGX™). Using attestation, cryptographic proofs can provide assurance to partners that the code operating on their data has not been compromised or modified.

Attestation of an application on a remote platform can include checking the integrity of the enclave (hash of code, data pages), verifies whether the enclave is running on real SGX CPU, and verifies that the enclave possess certain data (enclave held data). Attestation can establish a secure channel between enclaves.

Transformations can be used, for example, to conduct hashing of sensitive information in some aspects to replace information with a surrogate (e.g., John Smith→328faa9b4e0a798947a8c80913e993d4). As described in some embodiments, the transformations may modify data even further by perturbing the data to cause loss of fidelity. An example lossy transformation can include intentionally modifying values prior to transformation, applying lossy compression, or intentionally using a small hash mapping. Accordingly, the lossy transformation, even when reversed, yields an intentional level of computational uncertainty, at the cost of accuracy of the output data set.

Figure 12:
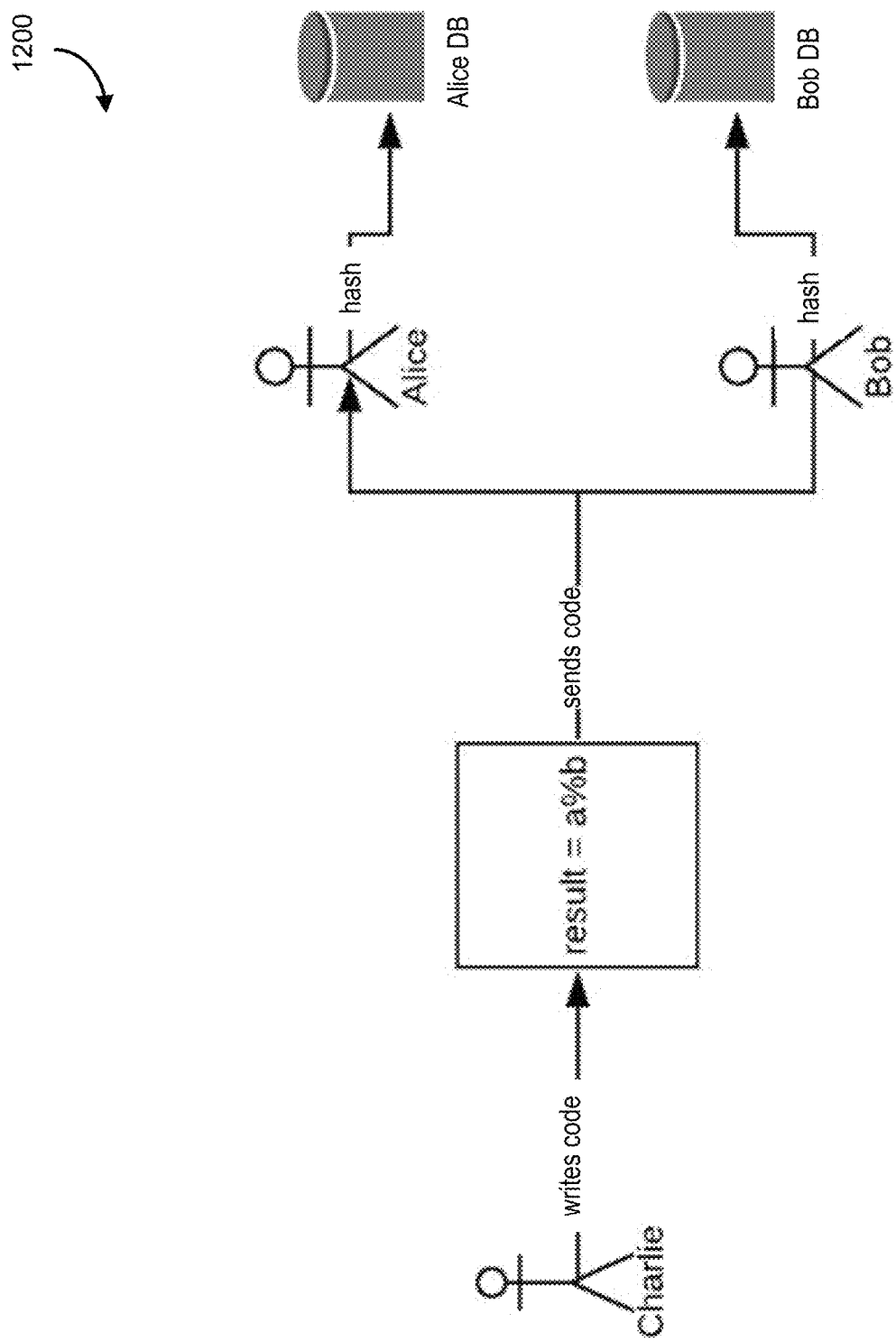
FIG. 12 is a diagram illustrating a simple attestation example scenario, according to some embodiments.

FIG. 12 is a diagram illustrating an open sourced simple attestation example scenario, according to some embodiments. In the example scenario 1200, Alice, Bob and Charlie agree that Charlie will run a service that returns whether the sum of numbers they share is even. Charlie will run the service on a machine that has Intel SGX™. Charlie writes the code and shares the hash of the code with Alice and Bob.

In this model, Alice and Bob can ask Charlie to provide the source code and calculate the hash themselves, to validate the calculations performed by Charlie.

Figure 13:
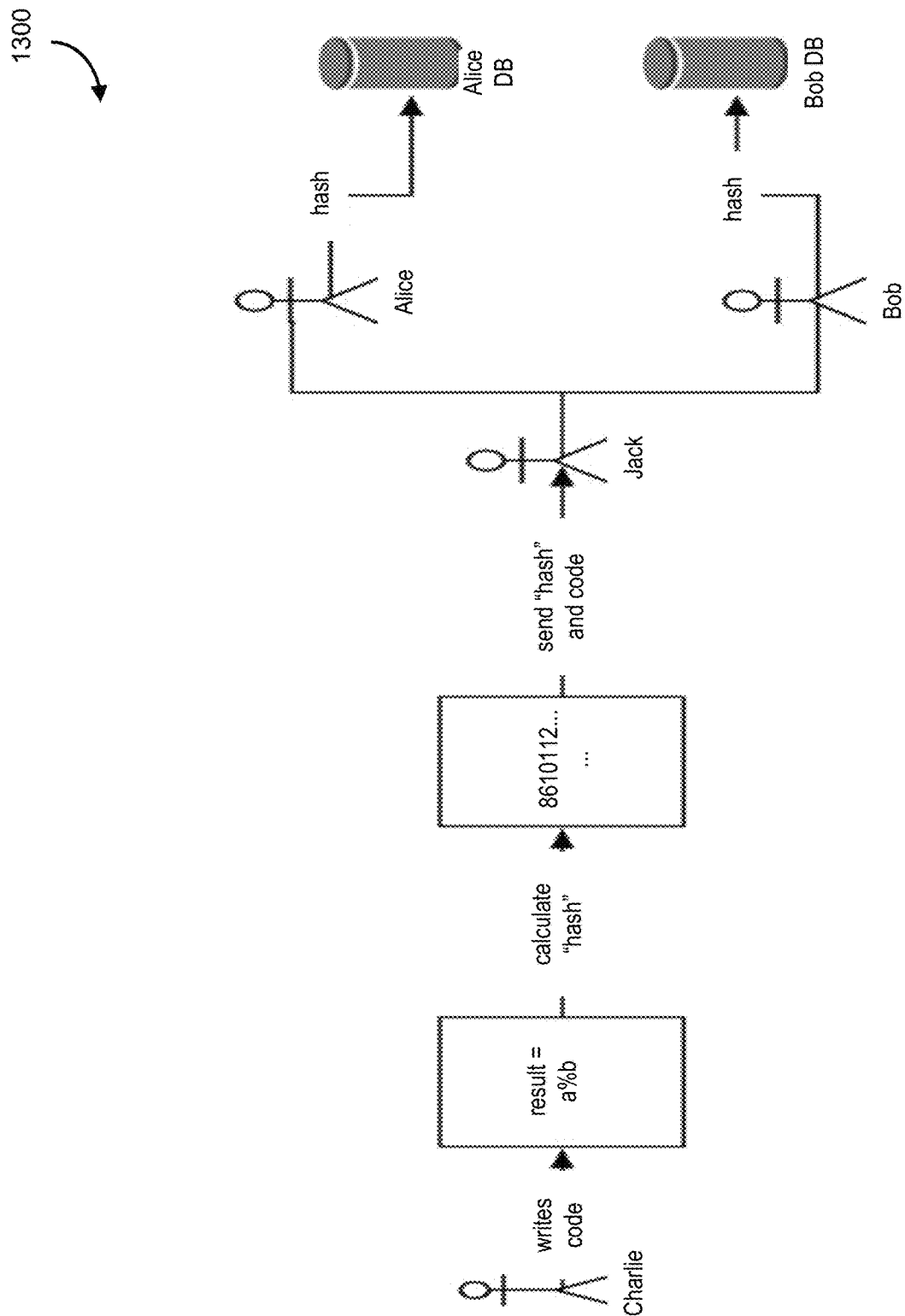
FIG. 13 is a diagram illustrating a simple attestation example using third-party audit and certification, according to some embodiments.

FIG. 13 is a diagram illustrating a simple attestation example using third-party audit and certification, according to some embodiments. Similar to 1200, in example scenario 1300 Alice, Bob and Charlie agree that Charlie will run a service that returns whether the sum of numbers they share is even. Charlie will run the service on a machine that has the secure enclave. Charlie writes the code and shares the hash of the code with Alice and Bob.

In 1300, Charlie will use a neutral-third party, Jack, to verify and check that Charlie is not doing anything malicious with the code. Jack will certify that the code does what is intended and also verifies the hash is the same as what Charlie calculated (auditing).

Figure 14:
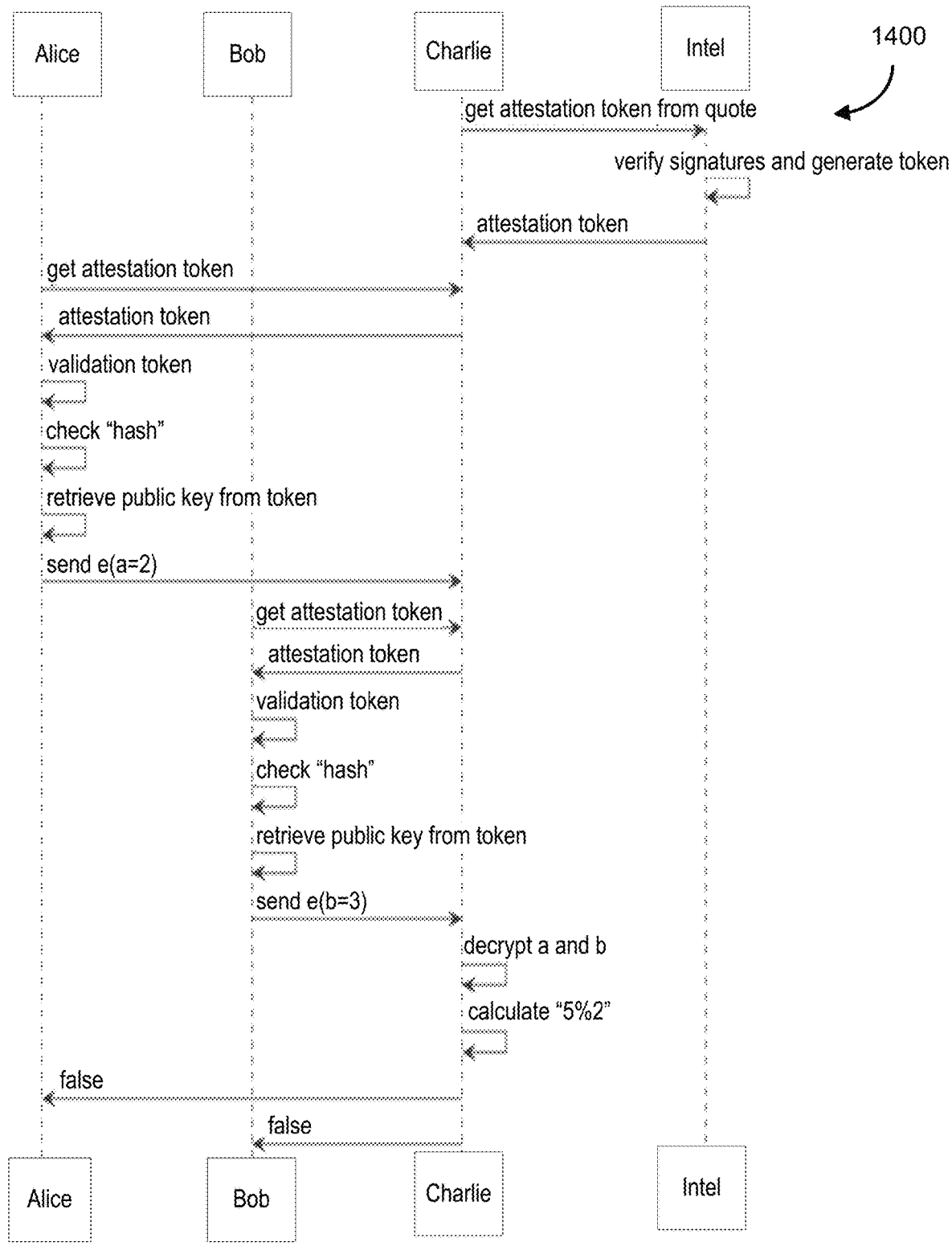
FIG. 14 is a flow diagram demonstrating a simple attestation example operation and result verification, according to some embodiments.

FIG. 14 is a flow diagram demonstrating a simple attestation example operation and result verification, according to some embodiments. Process 1400 continues the example with Alice, Bob and Charlie.

Alice and Bob have two numbers and they want to know if the sum of numbers is even. Alice and Bob know that Charlie will provide the right result if the code running has the hash that was shared with them. The device (in this example denoted as "Intel") can provide an attestation token that guarantees that Charlie is running code on the secure enclave and running a version of the code and the hash of the code its running. Additionally, Intel can also attest that Charlie's code has a public key that can be used for data protection from Alice and Bob to Charlie.

Attestation is applicable in many embodiments described herein as the VCR system 200 operates on partner data, which will include highly sensitive data. This requires a higher level of guarantee for the protection of the data being shared. End to end protection of the data, during rest, motion and use. Partners will need to trust that the VCR system 200 is operating within the bounds agreed upon by the partners, and that the policies are enforced.

Certain processes and applications need to be trusted, including application software, host OS kernel, VM admin, host OS admin, and physical access to hardware. Assuming the software and infrastructure is not owned by the user of the software. Additional trust can be provided via control standards (NIST, CIS controls, etc.), security standards (TLS 2.0, FIPS, etc.), and audit and certifications (PCI, GovCloud, etc.).

In the example, if a Charlie, or someone working for Charlie acts maliciously and changes the code to give improper output, the hash check will fail and Alice and Bob can refuse to send data. Partners need the ability to have the VCR code audited, or need access to the source code. The secure enclave and attestation gives the opportunity to provide those guarantees which are not possible in traditional software models.

Figure 15:
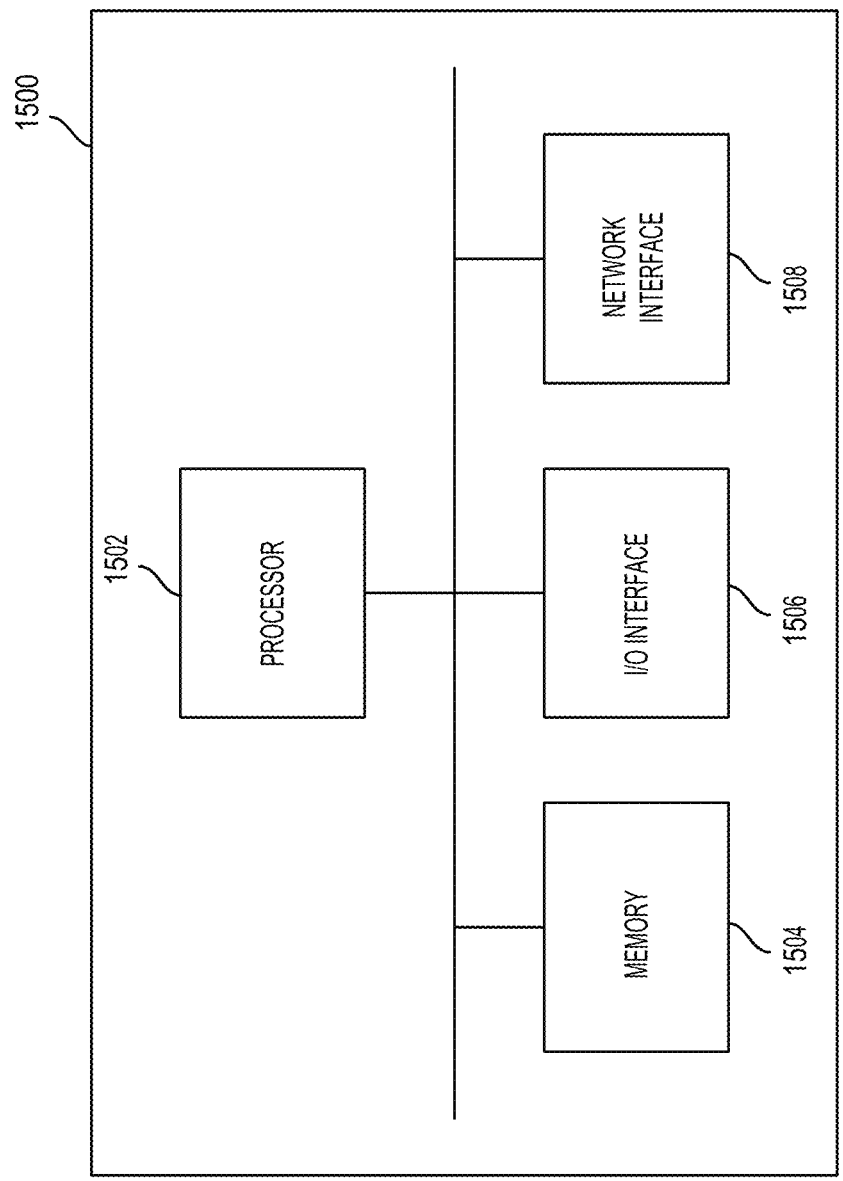
FIG. 15 is a schematic diagram of a computing device used to implement the example platform, according to some embodiments.

FIG. 15 is a schematic diagram of a computing device 1500 such as a server. As depicted, the computing device includes at least one processor 1502, memory 1504, at least one I/O interface 1506, and at least one network interface 1508.

Processor 1502 may be an Intel or AMD x86 or x64, PowerPC, ARM processor, or the like. Memory 1504 may include a combination of computer memory that is located either internally or externally such as, for example, random-access memory (RAM), read-only memory (ROM), compact disc read-only memory (CDROM). Each I/O interface 1506 enables computing device 1500 to interconnect with one or more input devices, such as a keyboard, mouse, camera, touch screen and a microphone, or with one or more output devices such as a display screen and a speaker.

Each network interface 1508 enables computing device 1500 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others.

Computing device 1500, in some embodiments, is a special purpose machine that may reside at a data center. The special purpose machine, for example, incorporates the features of the system 100 and is provided in a portable computing mechanism that, for example, may be placed into a data center as a rack server or rack server component that interoperates and interconnects with other devices, for example, across a network or a message bus, and configured to generate insights and create new composite data objects based on loaded data from the protected database elements (e.g., protected tables) as training data or query targets, and received data requests (e.g., queries).

Figure 16:
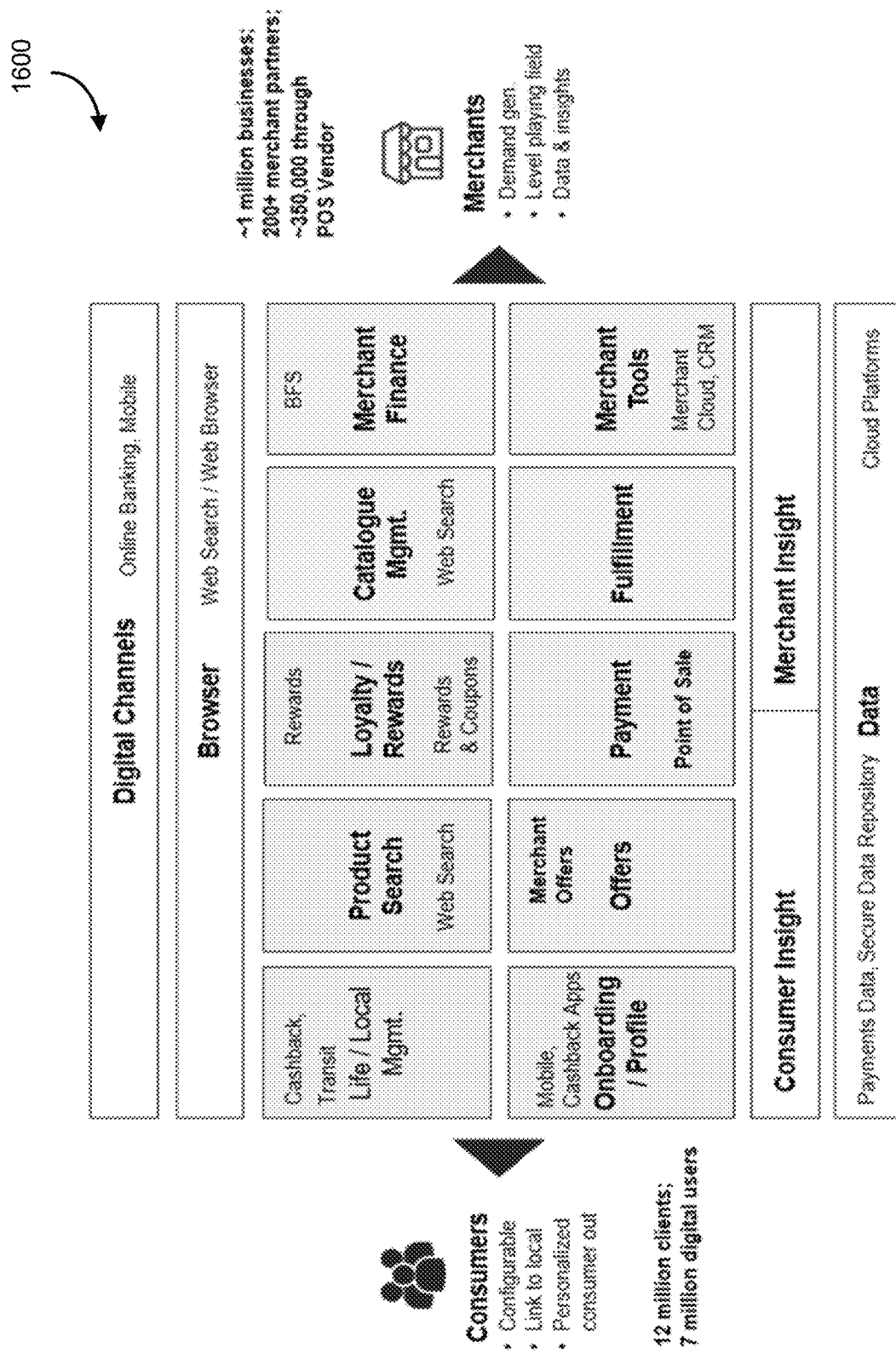
FIG. 16 is a high level architecture diagram showing components that operate in concert to provide a secure computing infrastructure platform, according to some embodiments.

FIG. 16 is a high level architecture diagram showing components that operate in concert to provide a secure computing infrastructure platform 101, according to some embodiments. In diagram 1600, digital channels such as online banking systems, mobile applications can be integrated along with web search and web browser to support computing services adapted to support everyday eCommerce interactions for a customer. eCommerce interactions can include searching for products, collecting loyalty rewards, using applications to support wayfinding, payments, fulfillments, among others. The data may be loaded, for example as described earlier into a secure data repository that collates data, among others, to enable the generation of customer or merchant insights. Accordingly, the customer is able to provide consent to allow certain services to establish a well-rounded understanding of her profile, and she may also allow or control access of third parties to use her data in generating analytical outputs (e.g., targeted marketing campaigns, market research).

Figure 17:
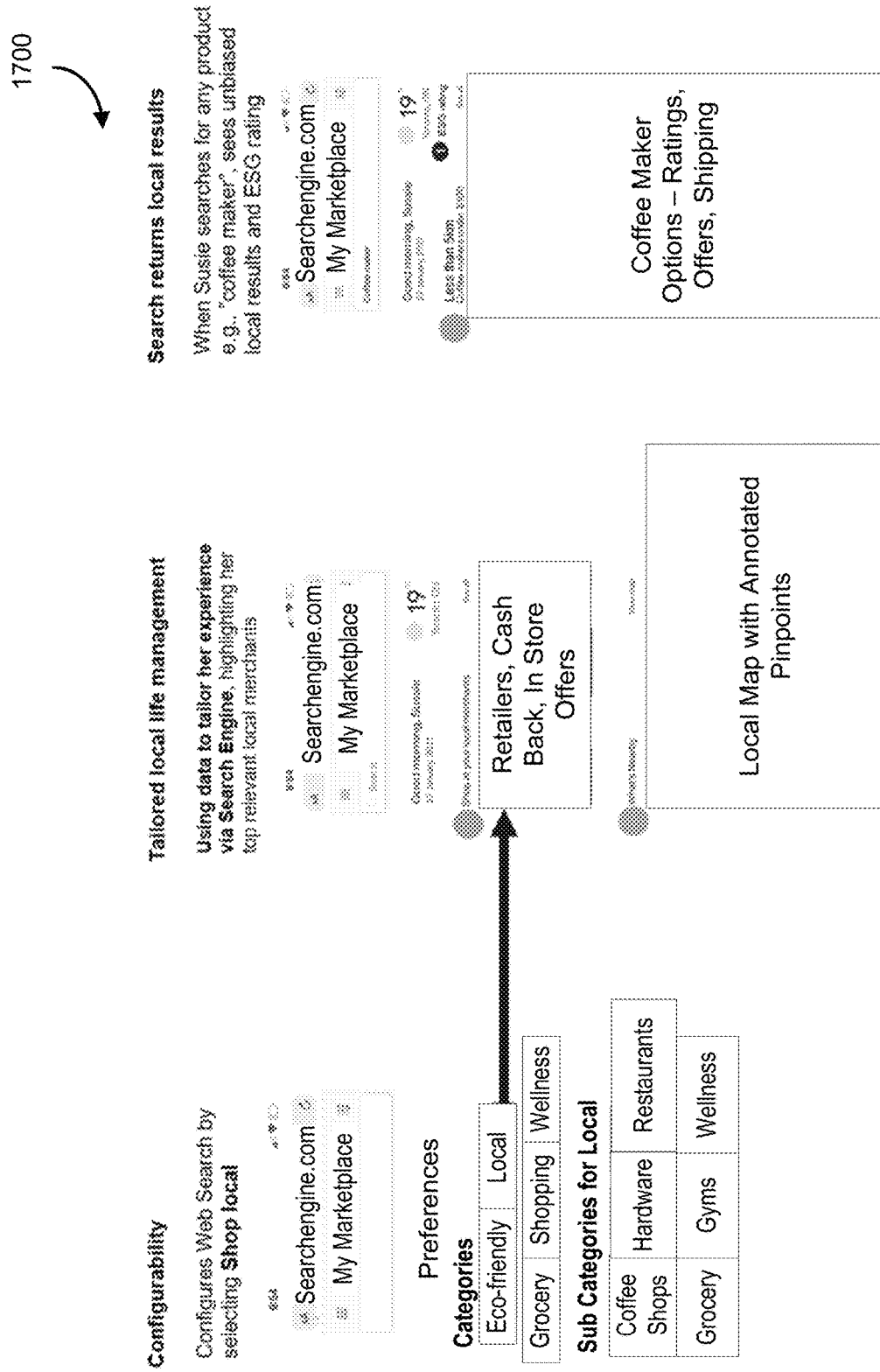
FIGS. 17-19 show example screenshots of a sample set of eCommerce interactions for a customer, according to some embodiments.
Figure 18:
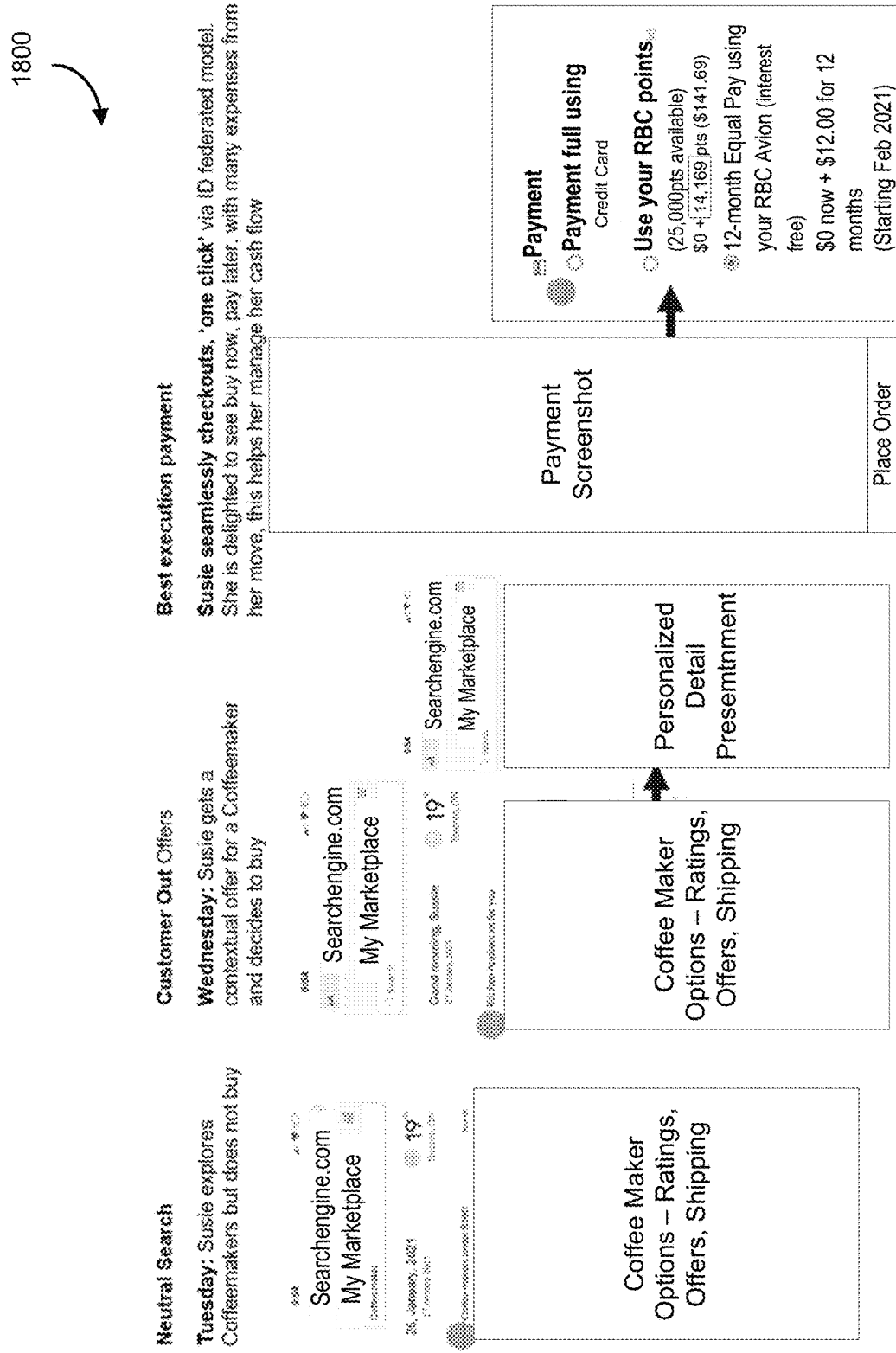
Figure 19:
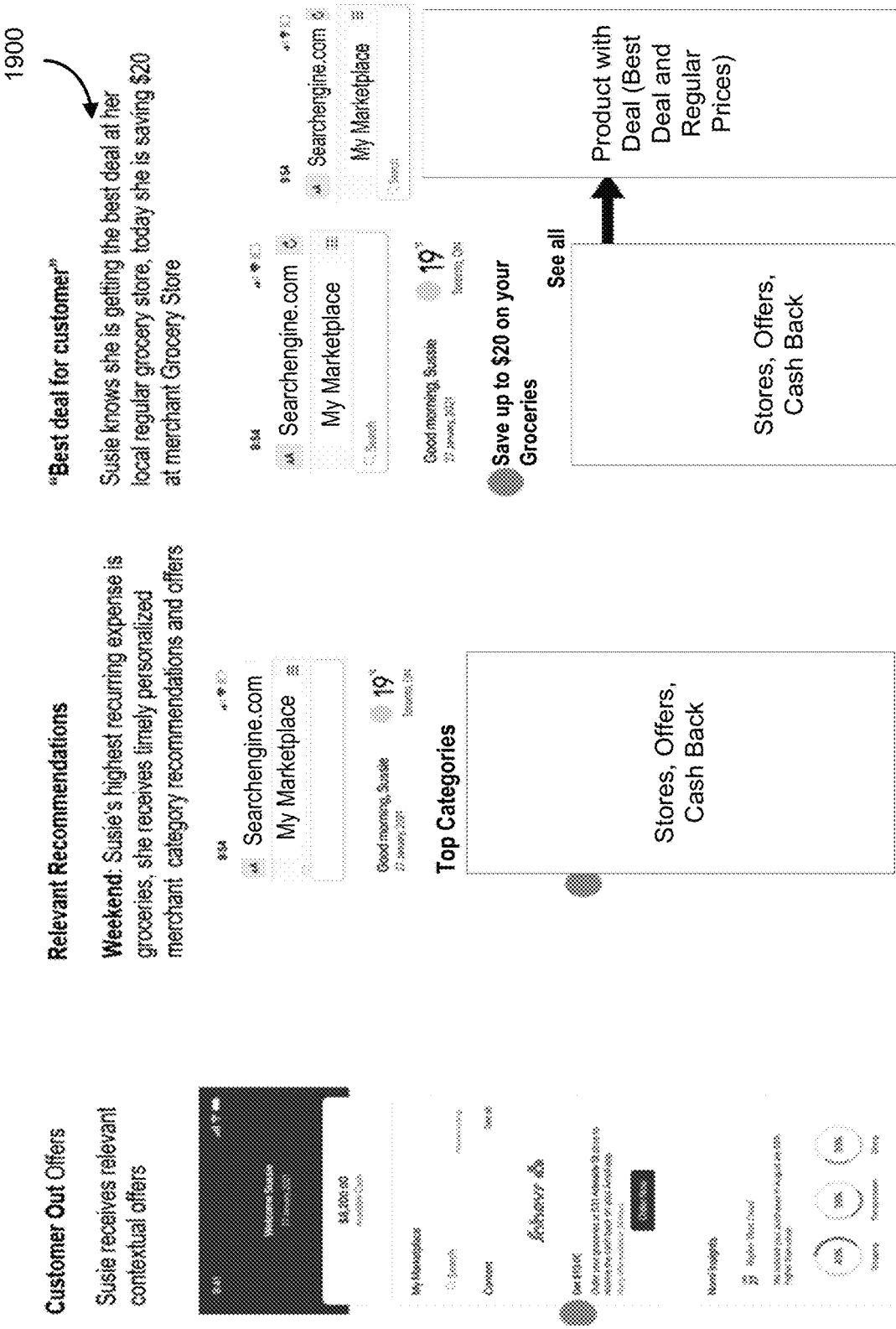

FIGS. 17-19 show example screenshots 1700, 1800, and 1900 of a sample set of eCommerce interactions for a customer, according to some embodiments. As shown in FIG. 17, a customer is able to set preferences for interactions with a marketplace, and the customer's underlying data and profile can be utilized to link relevant offers and local merchants, and the search can return local results in accordance to her preferences.

At FIG. 18, the system is able to estimate that she is updating her kitchen based on recent transactional data, financial (mortgage) and web search history, and the intelligence engine can be adapted to produce insights that a merchant can use, for example, to generate an offer specifically tailored for her, a high propensity to buy client, thus aiding in the optimizing of marketing spend.

At FIG. 19, she receives relevant offers and recommendations as part of 'Always best for Customer' proposition (marries financial and behavioural data). These recommendations can be generated based on, tracked highest recurring expenses is $100-150 per week on groceries, via her credit card. Behavioral data can, for example, show 85% spend on Sundays, majority at one merchant (grocery store). Top categories are Produce, Seafood, Bakery and Beverages. Personalized recommendations can be populated in a web search, "best deal" is highlighted making it easy to know she would be getting best deal (vs. biased), and checkout can be conducted via merchant site with federated ID and payment support.

Figure 20:
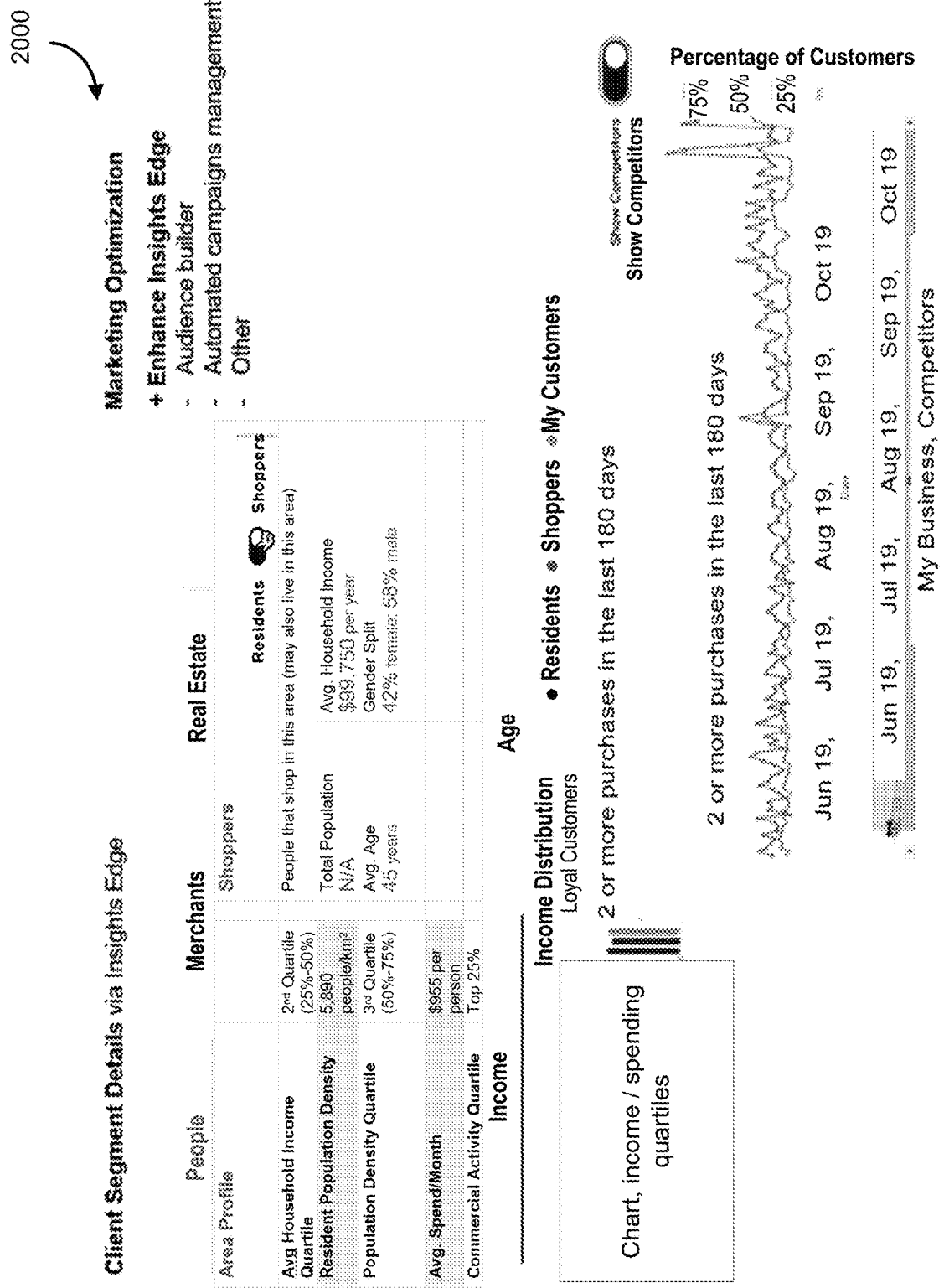
FIG. 20 is an example screenshot of an analytics dashboard adapted for a merchant to generate purchase insights and aggregate information, according to some embodiments.

FIG. 20 is an example screenshot 2000 of an analytics dashboard adapted for a merchant to generate purchase insights and aggregate information, according to some embodiments. In this example, the data may be accessed from the secure data repository, and the merchant computing systems or analytics platforms may submit queries to be processed. The query is validated against privacy policies by the data custodian data process, and upon a successful validation, the query responses can be utilized to conduct analytics or generate metrics.

Figure 21:
FIG. 21 is an example data control dashboard having interactive interface elements that may be rendered on a user's computing device (e.g., smartphone, laptop).

FIG. 21 is an example data control dashboard 2100 having interactive interface elements that may be rendered on a user's computing device (e.g., smartphone, laptop) where the user is able to utilize various controls to modify one or more consent preferences. A simplified example is shown, but variations are possible where more granular controls are utilized in relation to specific types of access requests and queries that are possible.

Figure 22:
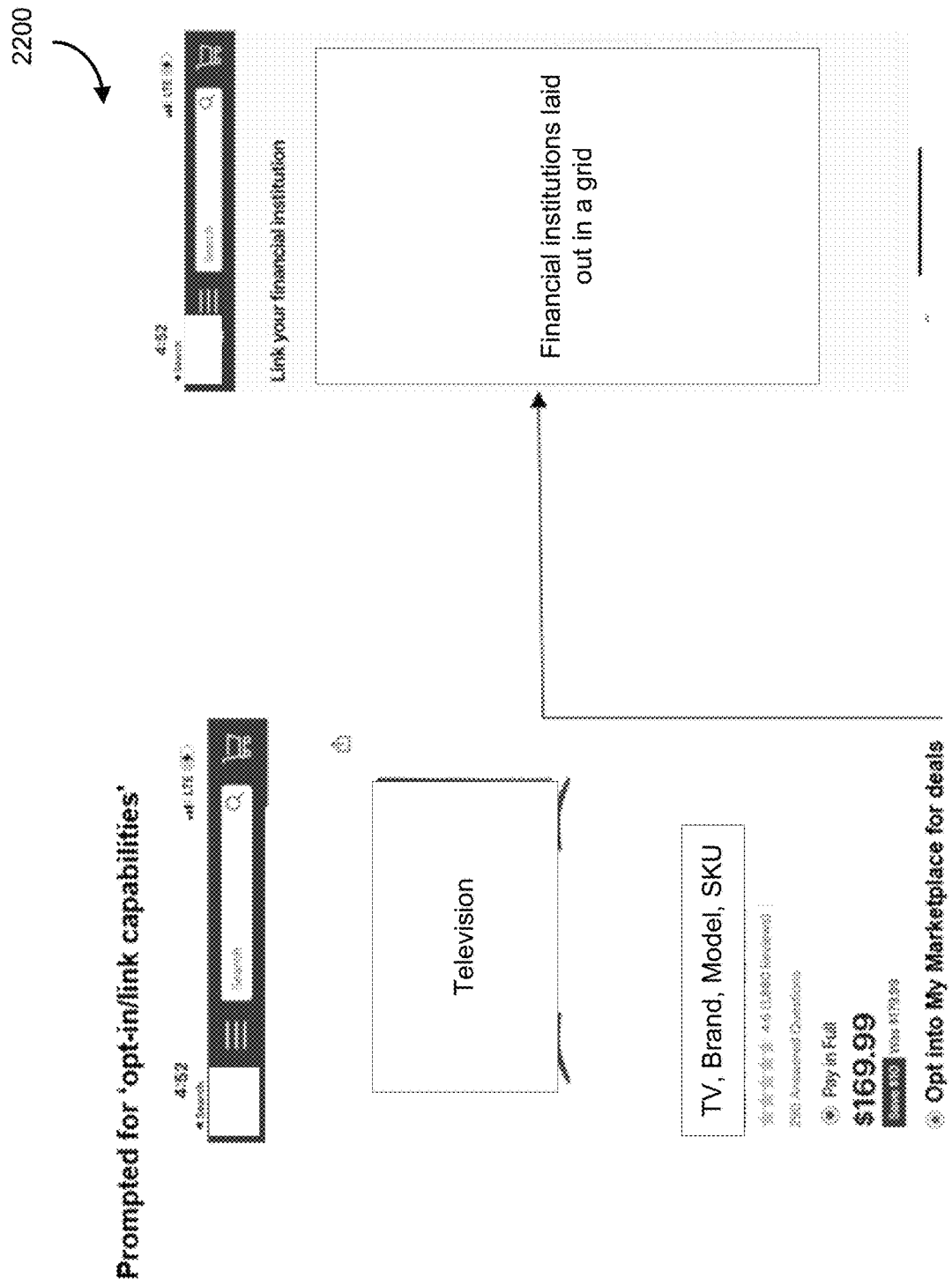
FIG. 22 is an example screenshot of an example user interface where an option is provided to opt into providing data into the secure computing infrastructure platform, according to some embodiments.

FIG. 22 is an example screenshot 2200 of an example user interface where an option is provided to opt into providing data into the secure computing infrastructure platform 101, according to some embodiments. In this example, upon selecting the "opt into my marketplace for deals" interactive control element, the user may be transitioned to select from a financial institution associated with a particular secure computing infrastructure platform 101. If the user opts in, for example, the transaction data may be loaded by a data loader into the secure repository.

Figure 23:
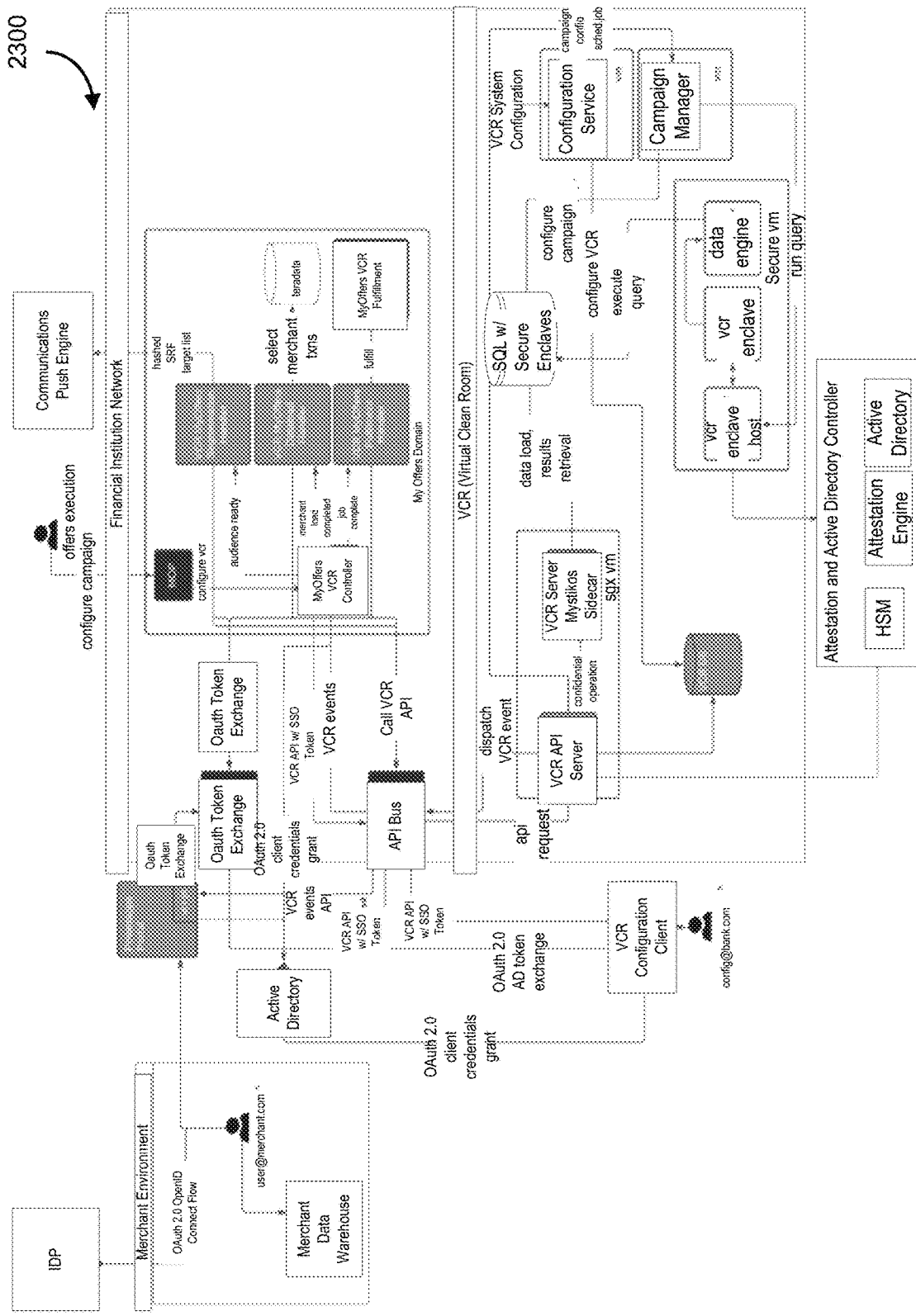
FIG. 23 is an example block schematic of an example backend infrastructure that can be utilized to implement the approaches described herein in some embodiments.

FIG. 23 is an example block schematic 2300 of an example backend infrastructure that can be utilized to implement the approaches described herein. In this example backend infrastructure, an IDP (identity provider engine) is configured to track a set of set of roles, such as for merchant partners, data providers, among others. The roles can be segmented and stored on a directory data structure, and roles can be assigned to specific accounts associated with credentials of parties or computing systems associated with the various roles. For example, roles can be defined in data structures indicative of data provider, data owner, data consumer, level of data access, any special access restrictions or capabilities, among others. Roles can be classified and given different levels of default access. For example, there may be special classes of roles for auditor, regulator, academic, or governmental authorities and their associated roles (e.g., only as observers) who may have special levels of access permissions for specific situations.

An auditor may be granted special access rights to conduct queries to conduct random sampling based on an audit sampling request, for example, and the data set to be loaded and ultimately used for querying may represent only the randomly selected audit sample as obtained across the heterogeneous set of data sets. Similarly, a governmental statistics agency may have a default level of access that allows them to only conduct population level queries that never return data on individuals (e.g., tracking diversity levels in human resources platforms or conducting correlation analysis for health trends using sensitive health data).

During portal on-boarding, parties (e.g., merchants), can be on-boarded and initial roles can be assigned to specific computing devices, and these roles can be coupled with credentials, such as certificates required, among others. In some embodiments, enhanced credentials are required if the roles are given access in respect of highly sensitive data (e.g., of other parties) for the purposes of conducting queries (e.g., certain data providers may be able to request enhanced security before any queries can be processed on any of their data sets).

A browse and load portal can be utilized to enable data submission through various interfaces, and, in an example, merchants can bulk-load SKU-level transaction data into the system as data providers. This SKU-level transaction data can include, in an example, John Smith (or in some cases CustomerIDHash ACDA1224A); Jan. 1, 2021; 10:30 AM, SKU #1002020101; quantity=1; promotionCode=Yes; phoneNumberHash=1ABDDDG02021A; loyaltyNumber=1200202). A large volume of SKU-level transaction data can be bulk loaded (e.g., batches of 30K records). As part of the loading process, the merchant or the merchant computing system can authenticate with OAuth credentials to receive an access token for invoking the VCR data load APIs, and a mapping can be maintained between roles and identities so that the portal can authenticate using the access token with an OAuth Engine.

In respect of an example for a campaign in respect of offer targeting campaigns, when the data loading is complete and a job complete event is triggered, a data load can occur then from a second data source, in this case, a financial institution to load a second data set from the financial institution. The first and second data sets can be combined for query processing. The combination can include a data join based on a primary key or other shared key as between the data sets. In other embodiments, the data sources may periodically automatically load data into the system that can be retrieved as required for future query processing. All or a portion of the data can be loaded.

After this data load, a marketing campaign job ("segmentation job" to create a list of users to target for a particular offer) can be scheduled that can conduct a query that retrieves results based on a query run on the combined data sets, identify the targets for the marketing campaign, and then push them as an audience for an offer or transition the targets to a downstream computing engine for a fulfilment. This list can be pushed into a CRM engine to associate the targeting list with the offer. After the query is conducted, the system of some embodiments can proceed to wipe the combined data set so that it cannot be used again. In another embodiment, the system instead may store in cache the combined data set or in another protected area shared by both parties for future query processing, and a combined set of credentials would be required to run queries on the stored combined data set. A campaign management engine can be provided to create acceptable campaign query and to dispatch query jobs to secure enclaves to begin the query processing workflows, executing the queries to return result values which can then be used for downstream analysis or processing.

In this case, the merchant could be assigned the role of data consumer and the data can be returned as output values for the merchant. The output values can include, depending on data security settings and query structuring, a list of loyaltyID numbers, a list of names, a list of contact information, a match level for a particular offer (e.g., if query conducts a holistic analysis of purchase behaviour and returns a score), a confidence level for a particular match (e.g., if the purchase behaviour sample size is small, a confidence level could be low), among others.

A benefit of the approaches described above are that neither the merchant or the financial institution were able to access the combined data sets or the data sets that did not belong to them, and rather, the queries are processed separately and only results are provided.

Figure 24:
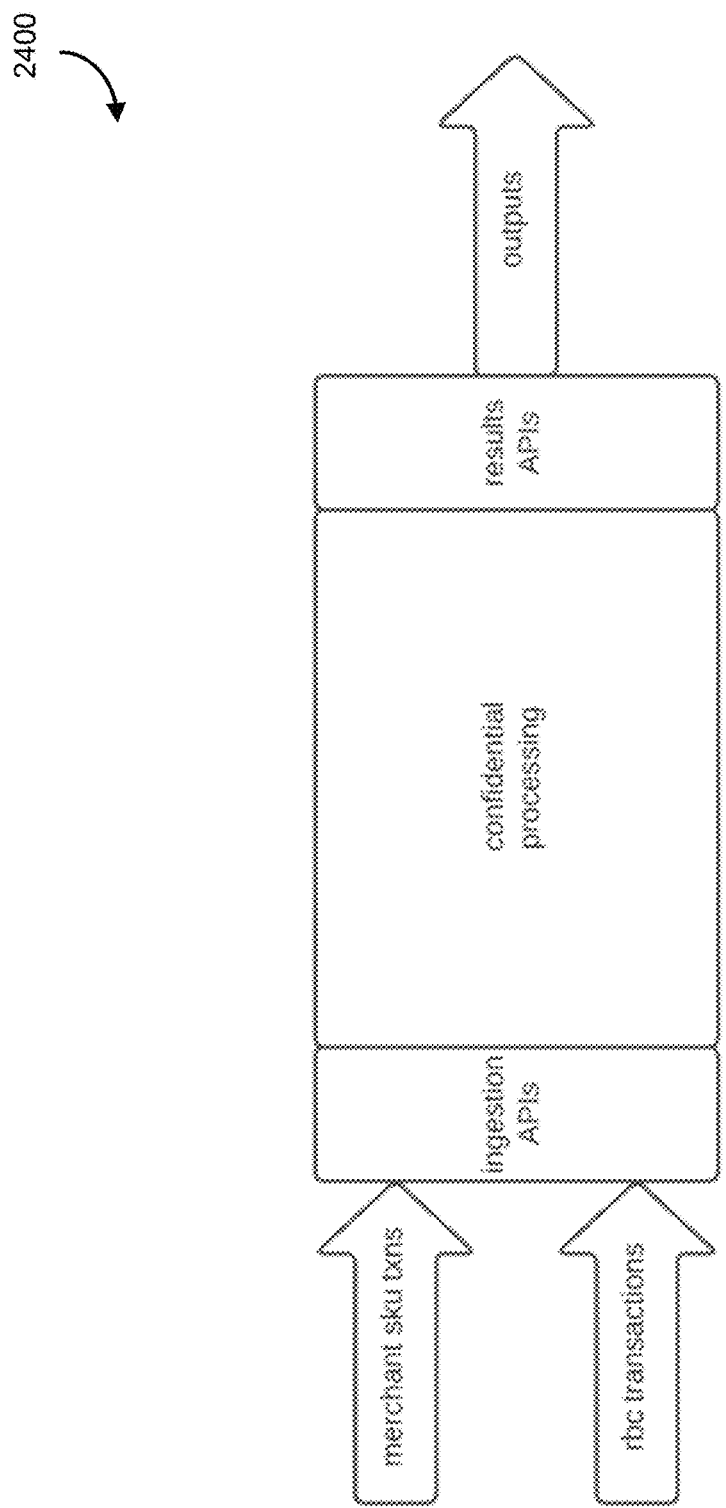
FIG. 24 is a block schematic diagram of an example batch data processing system for confidential processing, according to some embodiments.

FIG. 24 is a block schematic diagram of an example batch data processing system for confidential processing, according to some embodiments.

The batch data system 2400 can be contemplated in terms of data inputs, jobs that operate on data and data outputs in a "pipes and filters" architecture. In the case of the VCR implementation described in this example, however, inputs are delivered into the platform from multiple sources before operations take place and the VCR load and process model is event driven. Interactions with the system can be configured to execute through a REST APIs that the platform exposes for submitting data via submission resources, processing data through jobs resources and retrieving data by interacting with results resources.

Figure 25:
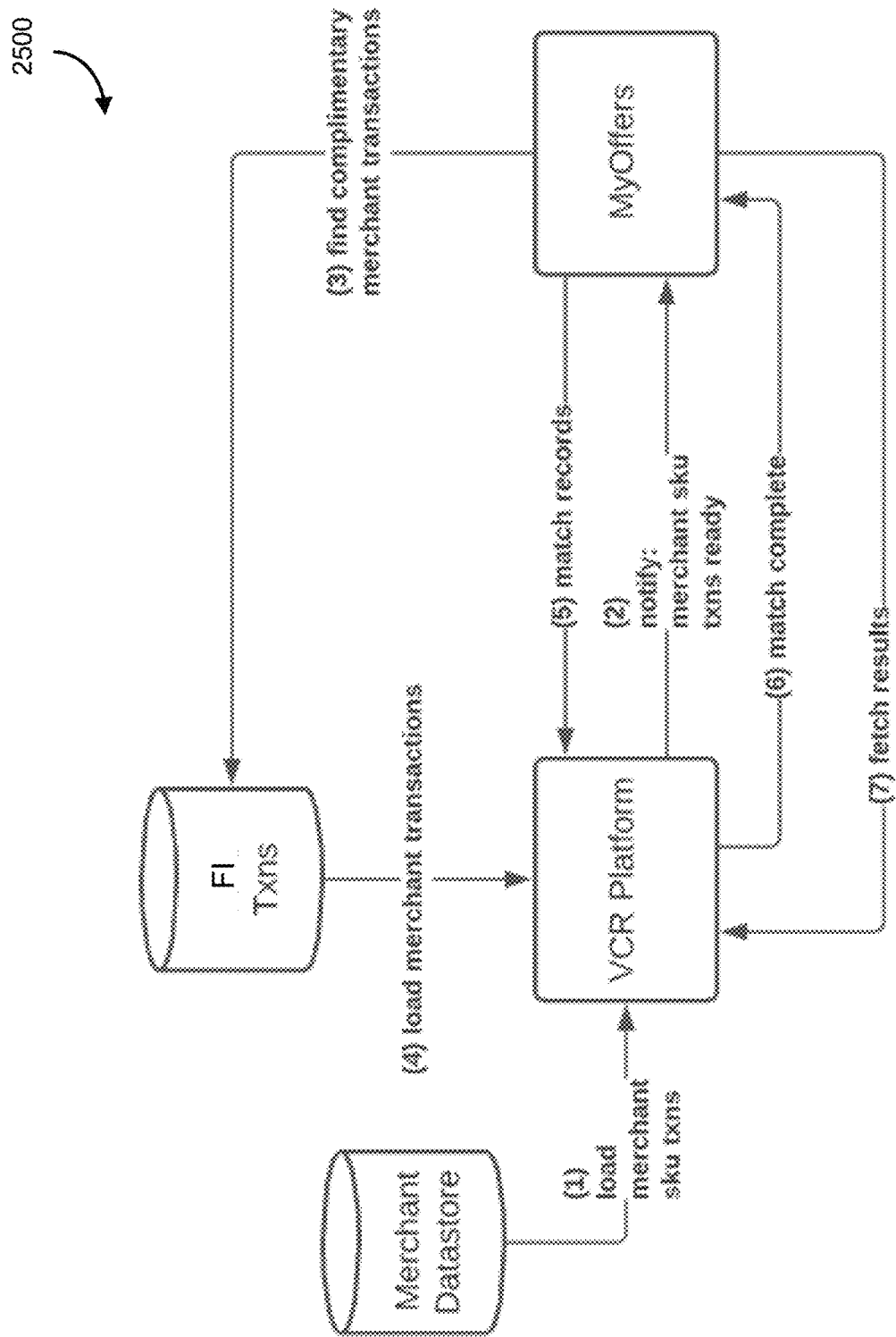
FIG. 25 is a more specific block schematic diagram of an example batch data processing system for confidential processing, according to some embodiments.

FIG. 25 is a more specific block schematic diagram of an example batch data processing system for confidential processing, according to some embodiments. As shown in FIG. 25, system 2500 is adapted to load merchant SKUs into the VCR platform, and interact with a MyOffers Engine that is adapted to, upon being notified that the transactions are loaded, identify complementary merchant transactions through data that is loaded into the VCR platform, which conducts the matching and provides results back to the MyOffers Engine.

Figure 26:
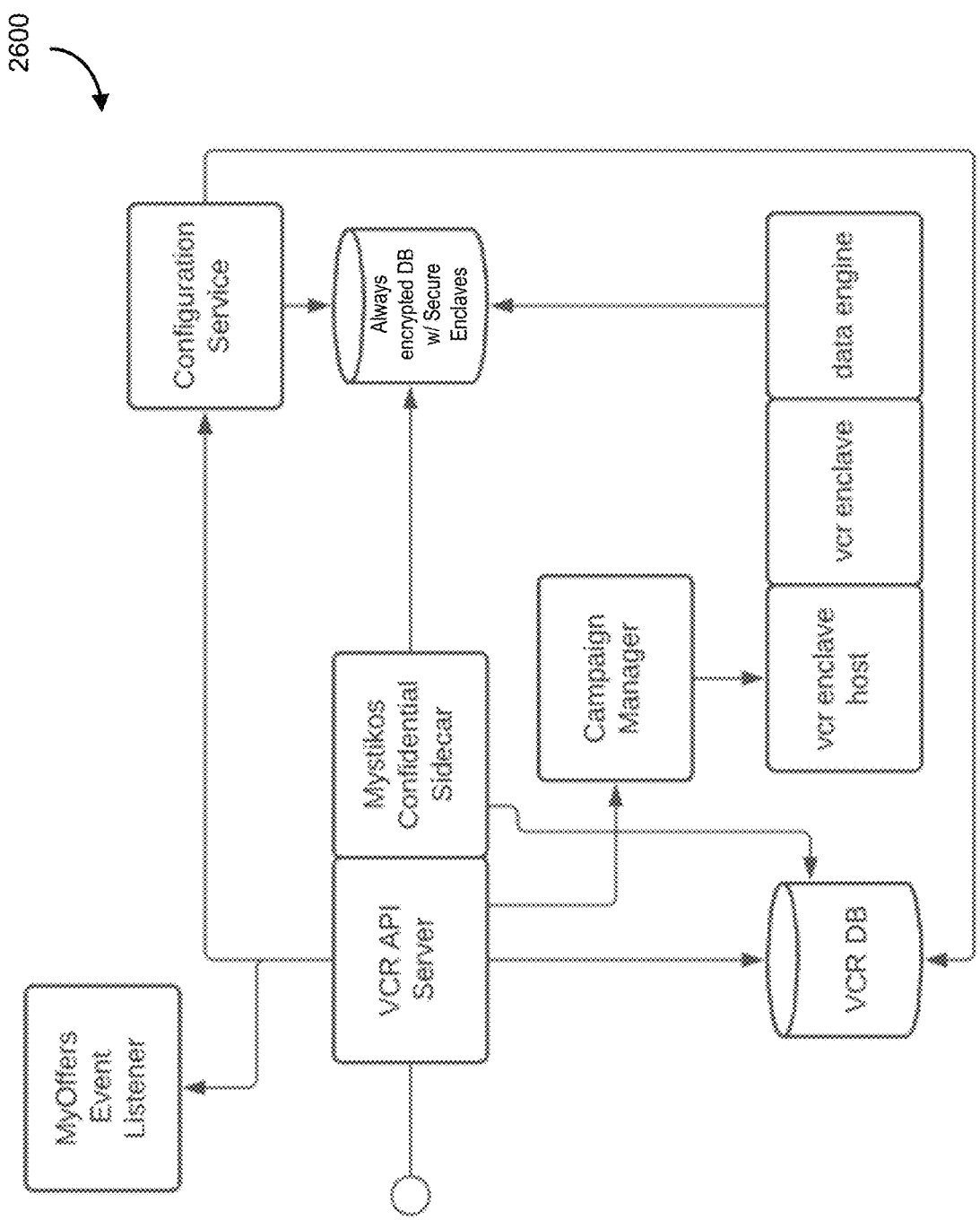
FIG. 26 is an example application component architecture, according to some embodiments.

FIG. 26 is an example application component architecture, according to some embodiments. As shown in this example architecture 2600, the VCR API Server/Data loader exposes interfaces for interacting with other computing systems. The VCR API Server/Data loader is configured to enforce access control policies, and can load data into a data storage (e.g., SQL), such as databases of secure enclaves. This can be implemented, for example, using isolation approaches in firmware, software or hardware (e.g., Intel SGX™) and can be a C++ application itself running inside a secure enclave in a confidential processing system. The campaign manager is a module that can couple internally to VCR API Sever, and run campaign query jobs, which are run on VCR enclave host/enclave/data engines, and the VCR API Server/Data loader may then load event data (e.g., polled or on demand) to a listener of the MyOffers service data process that listen for job completion and submission events.

The Mystikos Confidential Sidecar is a data process that runs as a companion application to the VCR API server. It is responsible for executing operations that should be performed inside of a VCR enclave. Its scope is limited to minimize its footprint and attack surface area. The sidecar is configured to have various service functions.

A first service function is for creating channel keys to create an ECDH key pair for a new channel, having a private key encrypted with CKEK retrieved from AKV, and a public key wrapped in AAS.

A second service function is for loading submission information to submit required submission information to the sidecar to (re)generate the shared secret/map CSV rows to SQL fields token. In this approach, the client public key in clear, and the enclave private key from VCR DB is still encrypted with CKEK. A submission shared key can be derived via ECDH then HKDF, and SubmissionIds are associated with every record that is loaded. i.e., a column in the dataload table for the particular submission type will include the submission ID so that loaded records can be clearly associated to a particular submission resource instance.

A third service function is for loading submission chunks into the database, and the confidential sidecar data process can be configured for returning a custom gRPC error type if the required submission info needs to be generated via a function, such as LoadSubmissionInfo( ) (the second service function).

Figure 27:
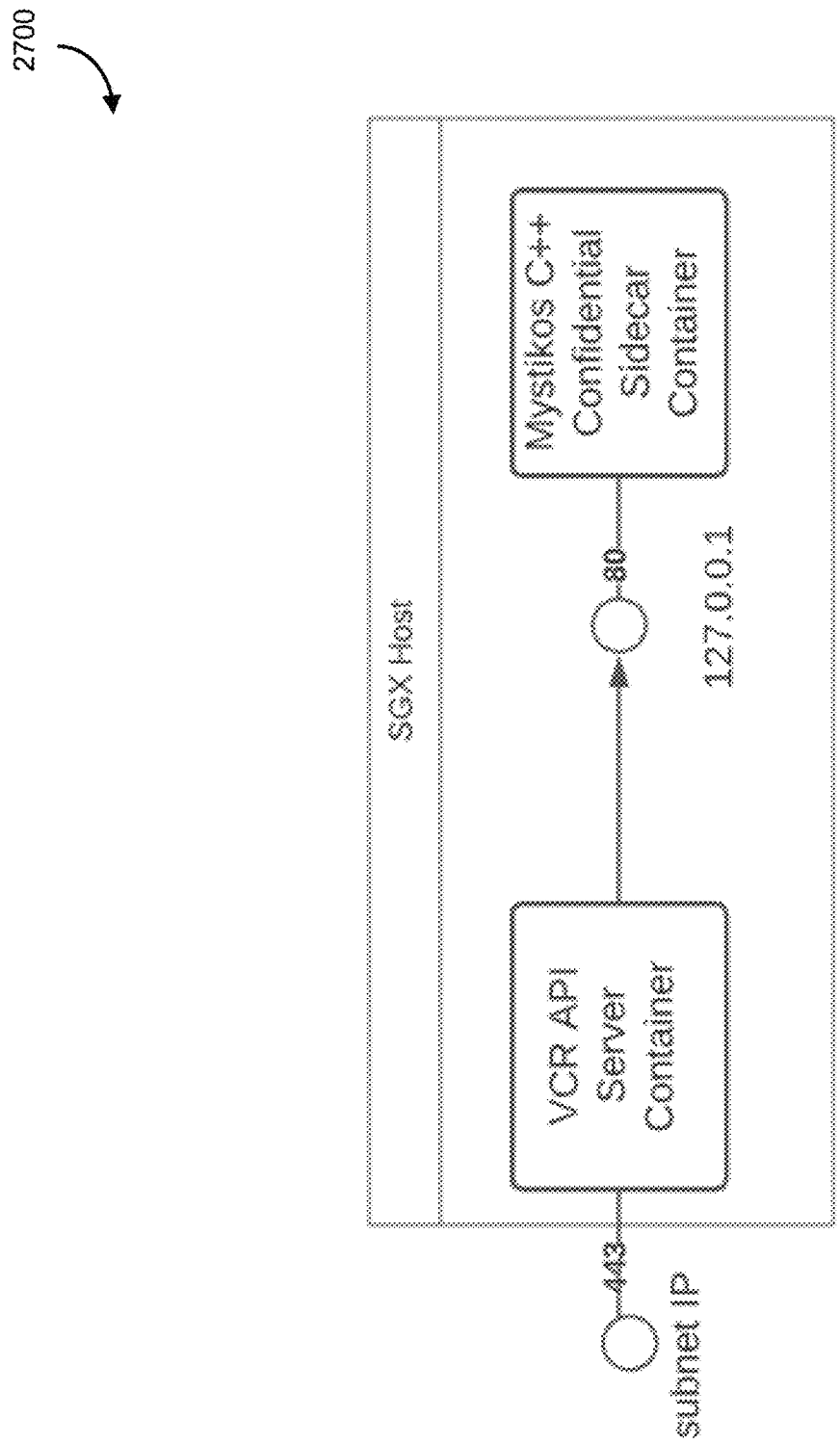
FIG. 27 is a block schematic of a confidential sidecar data process, according to some embodiments.

FIG. 27 is a block schematic of a confidential sidecar data process, according to some embodiments. In FIG. 27, the objective of the confidential sidecar data process 2700 is to localize enclave-aware application code to a specific container that the main body of API server code is a client to. This approach implements API server application logic outside of a confidential enclave.

The VCR API server implements all external API endpoints, implements access control and job control logic. Only operations requiring confidential computing capabilities will be delegated to the confidential sidecar via 127.0.0.1:80 (or another appropriate local port).

The sidecar enclave can be provide the sidecar data process, which works side-by-side with the API server to provide horizontal scalability and sealing of data that is received from a client.

Figure 28:
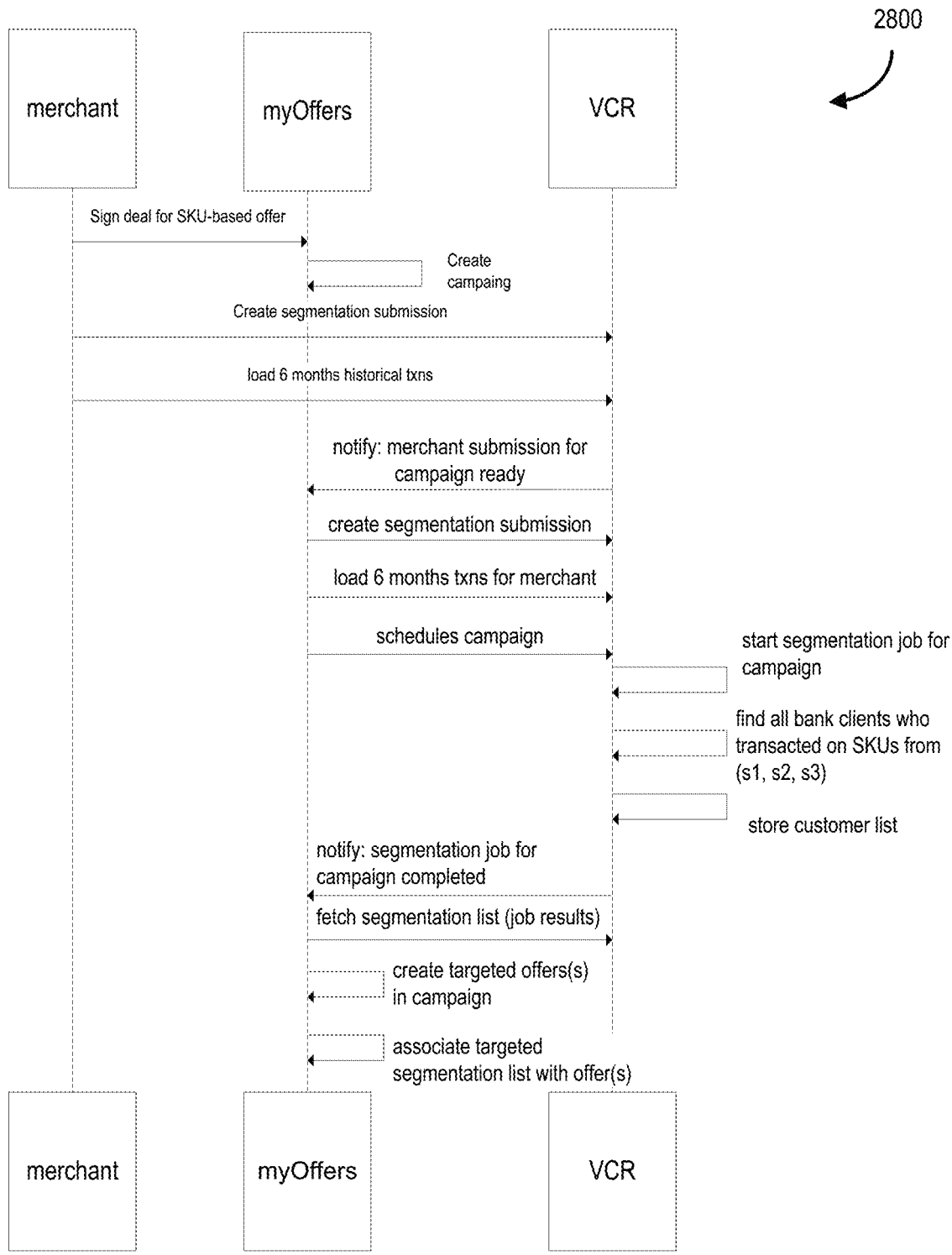
FIG. 28 is a method diagram showing an example approach for a scheduled campaign segmentation job, according to some embodiments.

FIG. 28 is a method diagram showing an example approach for a scheduled campaign segmentation job, according to some embodiments.

In method 2800, at the beginning of a MyOffers campaign, after a merchant has reached a deal with the financial institution, and merchant onboarding has been completed, an audience for a campaign must be created so that it can be associated to highly-targeted offers. In this example, historical transactions can be loaded, and campaign segmentation jobs are scheduled to obtain a customer list. The job results in this example are a list of bank clients who transacted on the particular SKUs, which is then utilized in an outreach engine to created targeted offers (e.g., associating client accounts with offers, pushing out offers via email or mobile application). In this example, the financial institution and the merchant are able to securely and privately conduct queries on the shared data set while preserving customer privacy through the use of confidential computing.

Figure 29:
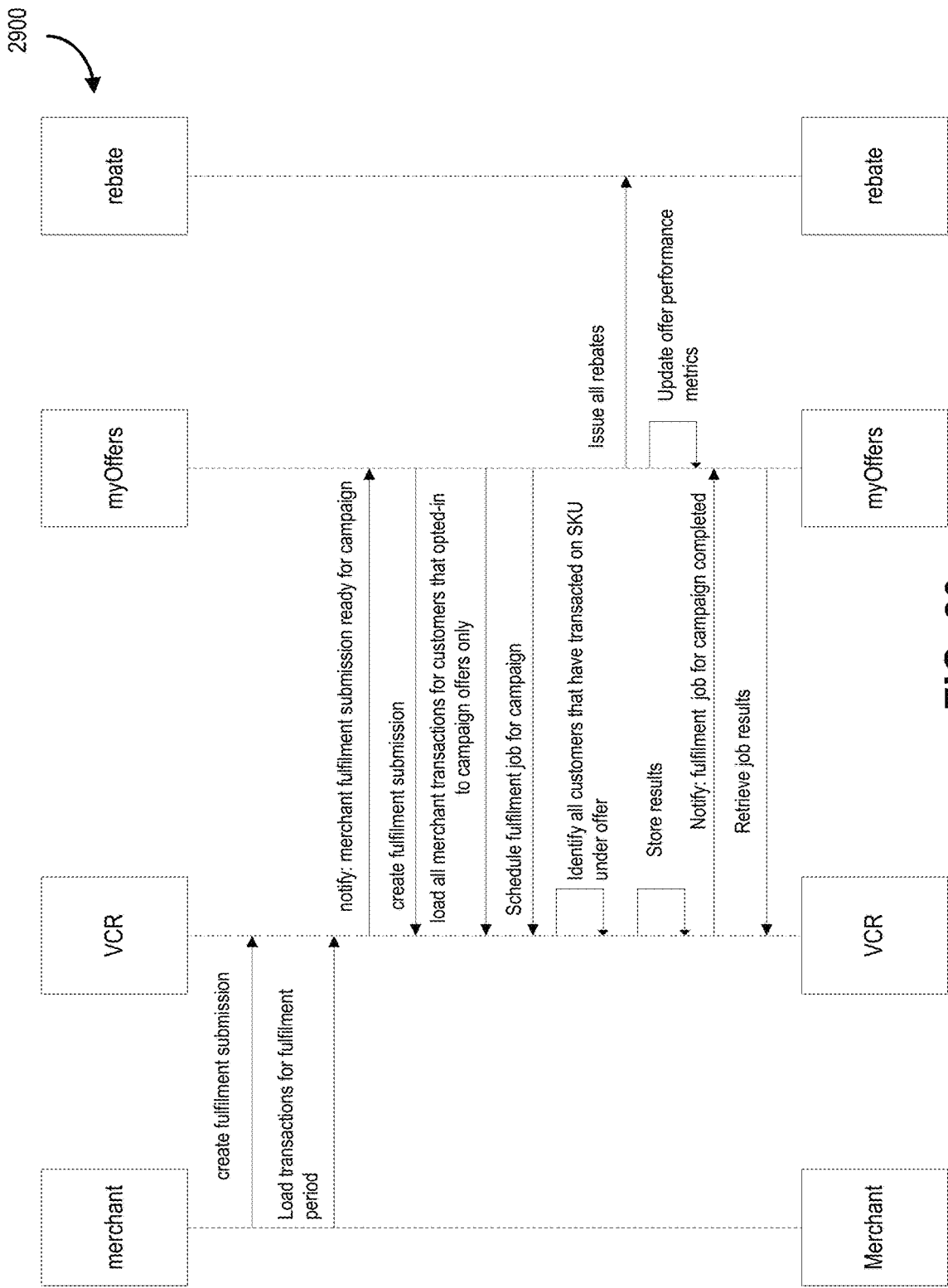
FIG. 29 is a method diagram showing an example approach for a scheduled campaign segmentation job, according to some embodiments.

FIG. 29 is a method diagram showing an example approach for a scheduled campaign segmentation job, according to some embodiments. In method 2900, once offers are out in market, for the duration of the campaign, fulfilment actions will need to run on an ongoing basis to ensure that customers are rewarded for offers that they've opted into. To do so, the system needs to collect data from both merchants and financial institution offers and then provide fulfilment instructions. For this example, rebates are provided in respect of transactions that have occurred in the past (e.g., rewarding on past behavior).

Figure 30:
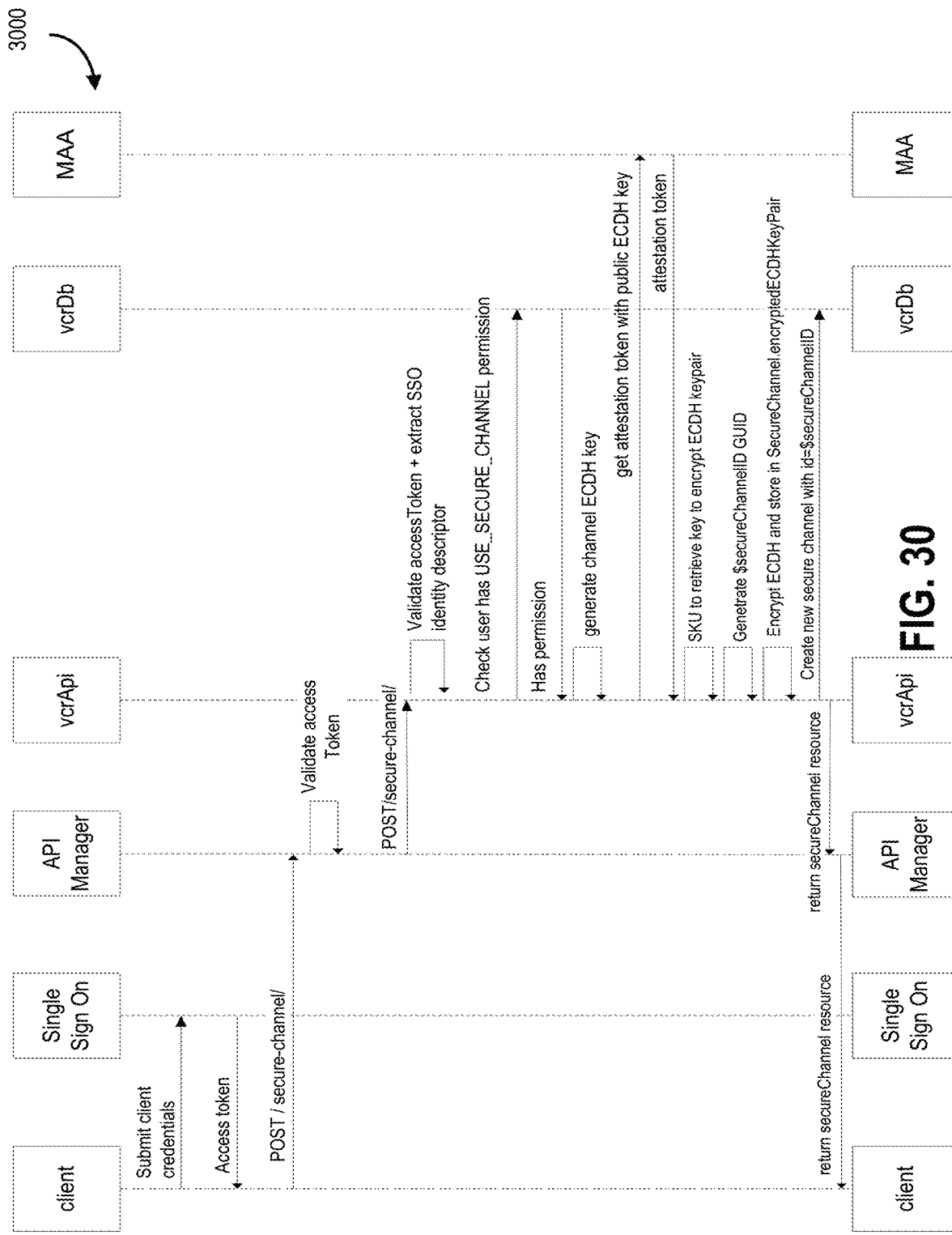
FIG. 30 is a method diagram showing an example approach for a creating a secure channel, according to some embodiments.

FIG. 30 is a method diagram showing an example approach for a creating a secure channel, according to some embodiments. In method 3300, before submitting data to the VCR platform, a secure channel is, in some embodiments, negotiated between the data submitter and the VCR platform. The client encrypts all data before submitting to VCR via data submission requests. The secure channel setup process creates the resources necessary for a shared symmetric key to be derived that can be used to encrypt the data that will be transmitted, such that only the client and an application running in an enclave can decrypt it.

The VCR can be implemented as a multi-tenant SaaS platform which exposes a REST interface. The interface into the system is designed to meet the needs of secure-multi-party computation on datasets provided by multiple parties. The API and system configuration enables this through the design of resources which model datasets and jobs that operate on them, and policy-based configurations that describe parties as either data providers, results readers or both.

Clients, in an embodiment, instead of providing keys to enclaves, negotiate an ephemeral key just prior to data submission after verifying an attestation which originated in an enclave.

If the client is satisfied with the claims in the attestation, a shared-symmetric channel key (basically a session key) will be derived known only to the enclave and the client. At this point the client is ready to encrypt data and provide it to VCR as what is defined as a Submission (e.g., as a submission data object). VCR will decrypt it using this shared channel key, and re-encrypt it with a key that was released to the enclave, which is under management of the VCR platform.

Given that the SaaS platform is exposed to the outside world through common REST APIs, there can be a variety of clients that can become a consumer of these services, including, among others, a web application that facilitates secure data load. This web application includes a javascript library, VCR-JS. This library mediates interactions between the client browser and the VCR platform. It prepare datasets for secure ingestion into the platform, and automatically verifies attestations provided to it during the secure channel setup stage just prior to data load.

In an example secure data load process, the merchant conducts, for example, POSTs against the secure-channel resource endpoint using an OAuth token which identifies the merchant.

The enclave verifies the merchant identity and then generates an ECDH keypair, an enclave quote which includes the hash of the public key of the ECDH keypair, and a attestation service attestation data object which envelops the public key and hardware generated quote. An ephemeral key is included in the attestation data which is returned to the client as part of a SecureChannel resource.

The client will then, on their end, generate a new ECDH keypair, and derive the symmetric channel key using their newly generated private key and the public key that was included in the attestation data from the enclave. The client now knows that the enclave is genuine and running code that they expect, and that only the enclave and the client have a symmetric key that can be used to protect the clients data. The client then uses this key to encrypt the dataset.

A submission resource is created and then the encrypted data set is uploaded one chunk at a time, to the enclave, where each chunk is decrypted and re-encrypted using another key which can only be released to the enclave as per security module policy. At this point, the data can be considered securely retained by the enclave and only accessible to the enclave.

Accordingly, as part of the creation of session key, two ECDH keypairs can be needed in some embodiments, one generated on the client side and one generated on the enclave side.

On the client side, the secure channel key is derived using the client's private key and the enclave's public key, and on the enclave side this same symmetric key is generated using the clients public portion of the generated ECDH key and the enclave's private ECDH key. The enclave can generate this ECDH keypair as soon as a secure channel is created. This keypair is then encrypted with a key protecting key which is released only to the enclave by AKV-MHSM).

This way, any instance of these sidecar instances can access this key and thus generate the channel key, this is how scalability is achieved since AKV-MHSM will release the key protecting key to any instance of the sidecar fleet.

The data submission package is encrypted using the session key and transmitted to VCR, and VCR decrypts package using the session key, and re-encrypted with a new data key within an always encrypted database (e.g., a secure SQL database) with secure enclaves. In some embodiments, the VCR platform manages this key as opposed to the data loader application, and the confidential sidecar writes directly to the always encrypted database.

In a model where using the ephemeral key, none of the clients/partners/merchants need to maintain any key infrastructure, their participation is completely predicated on the trust they have in an attestation they receive from the enclave (sidecar). The security of their data submission is guaranteed by the ECDH shared channel key derivation process.

Figure 31:
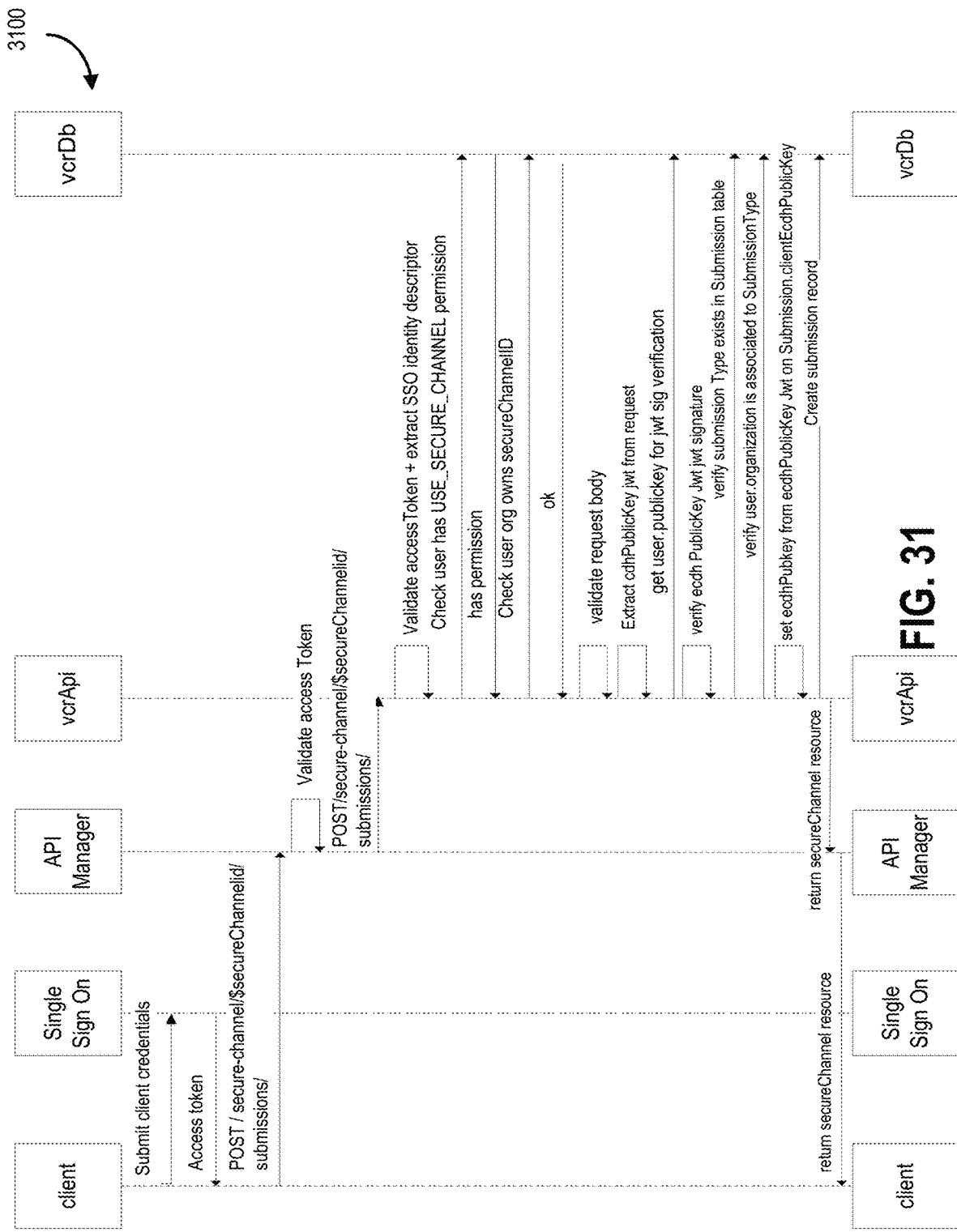
FIG. 31 is a method diagram showing an example approach for a creating a submission resource, according to some embodiments.

FIG. 31 is a method diagram showing an example approach for a creating a submission resource, according to some embodiments. Once a secure channel is created, a submission resource should be created. In method 3100, in this example, each organization has a one or more unique submission types associated to it.

A submission resource can be a metadata resource—it is not actually the data which will be submitted in a following step, and it can be adapted to be used to keep track of the secure channel, how many parts make up the submission, some descriptive information, the clients public key needed to derive the shared key, and ownership information.

In creating a submission resource, the submission resource may be a data object created that maps to a particular database table, the data object having the following fields: description—description of the data; submissionType—application defined data type that conforms to a particular schema and maps to a particular table; clientChannelPublicKey—ephemeral ecdh public key created by the client to use in the generated of a shared channel key, the server would use this public key to derive the shared channel key which is used to encrypt data sent over the secure channel; startDate—earliest record date in the dataset; endDate—latest record date in the dataset.

A data submission can be broken down into multiple parts, and for CSV data, the part should begin and end on a record boundary. A binary payload size may be determined, and a request may have an identifier, X-VCR-SUBMISSION-PART: n that indicates a part number. A X-VCR-SUBMISSION-PART set to −1 indicates end of submission data, which will set Submission.status=completed, and Submission.checksum will be set at this point. This part number is a sequence which will be used to reassemble the data submission. The part may request a payload, which can be input data encrypted with generated shared data key that can only be decrypted by an enclave.

On the backend, the submission will be associated to a specific data loader configuration that will map all of the records associated to this submission to a database table.

Figure 32:
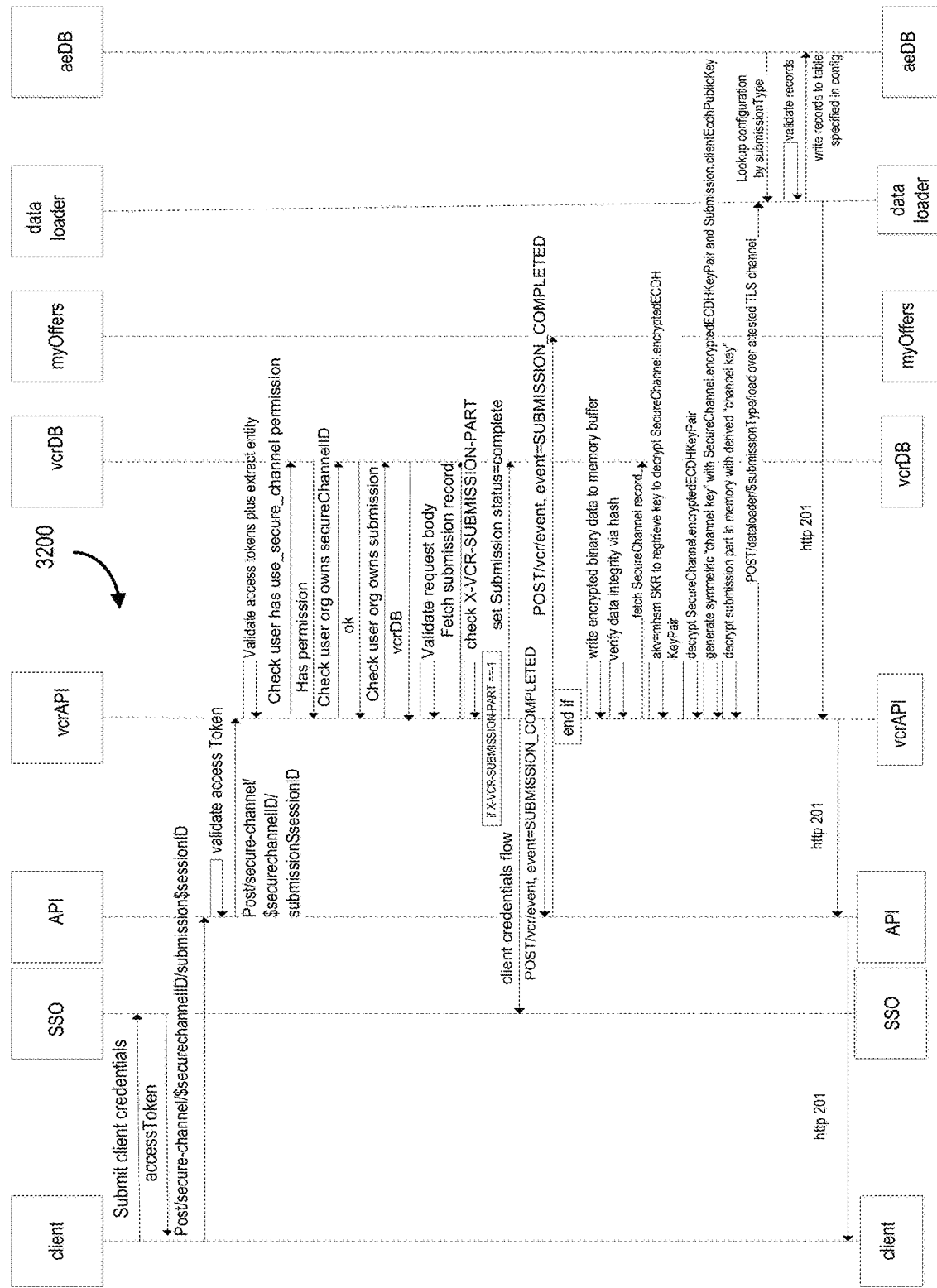
FIG. 32 is a method diagram showing an example approach for portioning data sets for data loading, according to some embodiments.

FIG. 32 is a method diagram showing an example approach for portioning data sets for data loading, according to some embodiments.

In method 3200, each submission ultimately is associated with a data set. these data sets are broken up into chunks and then loaded into the system with this API call. Once all parts have been received, the submission is understood to be completed. The API server will decrypt the payload sent with this request, decrypt it with the derived shared key and then forward it to the data loader for further processing and ultimately ingestion into the always encrypted DB where it can then be operated on.

An example approach is described where a user's permissions are checked to determine that the user does indeed have permission to schedule a job, that a particular job type exists, and that submission types are valid for the particular job. The query is executed through the campaign manager engine, controlling the VCR EnclaveHost, VCR Data Engine, and ultimately writing results into the always encrypted database.

Figure 33:
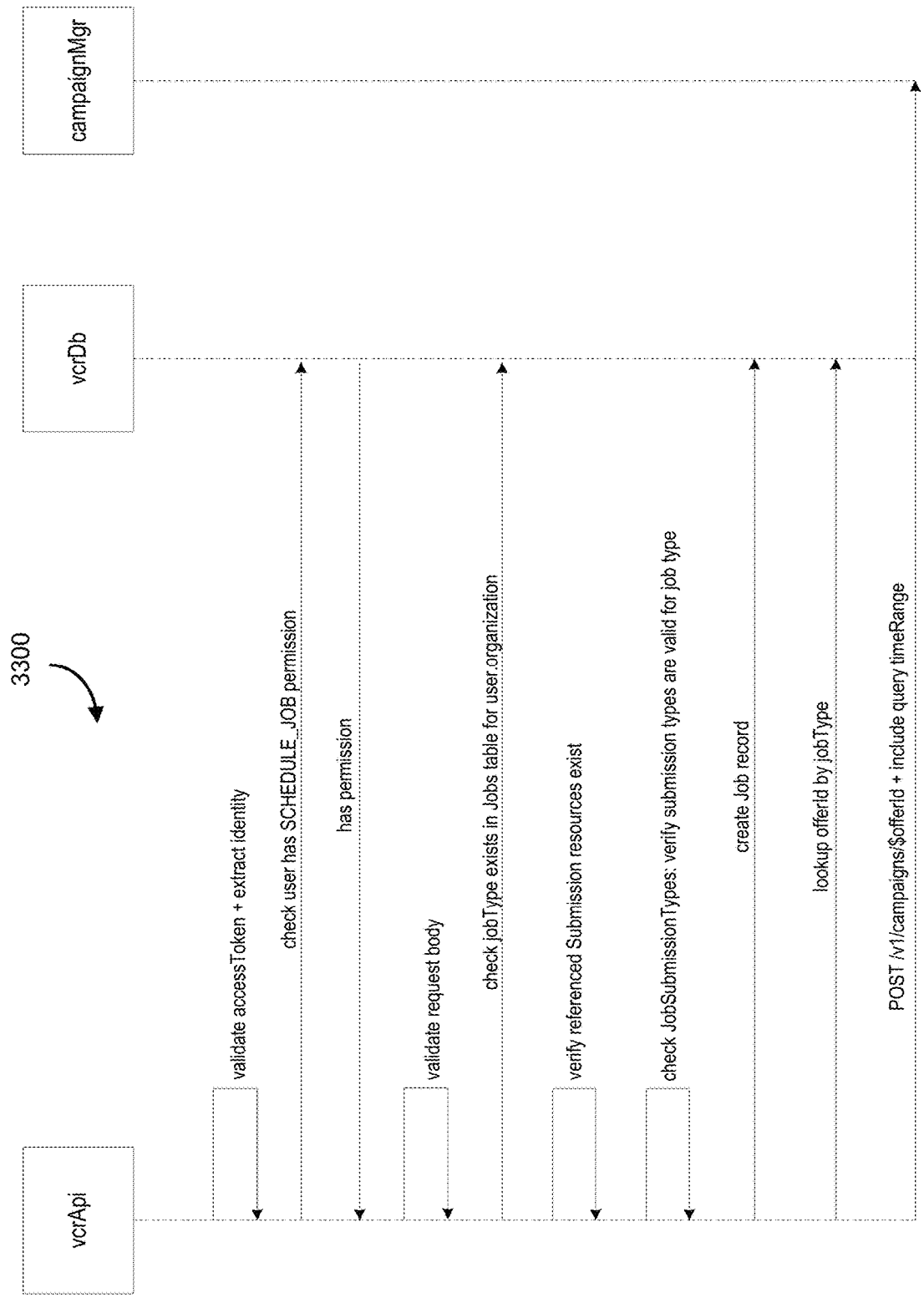
FIG. 33 is a method diagram showing an example approach for job scheduling, according to some embodiments.

FIG. 33 is a method diagram showing an example approach for job scheduling, according to some embodiments. In method 3300, once submissions are created and data is made available, jobs can be created to operate on those inputs. Creating a job resource will result in the campaign manager dispatching a query for a particular offer campaign. Once the job has been completed results will be available for retrieval.

Figure 34:
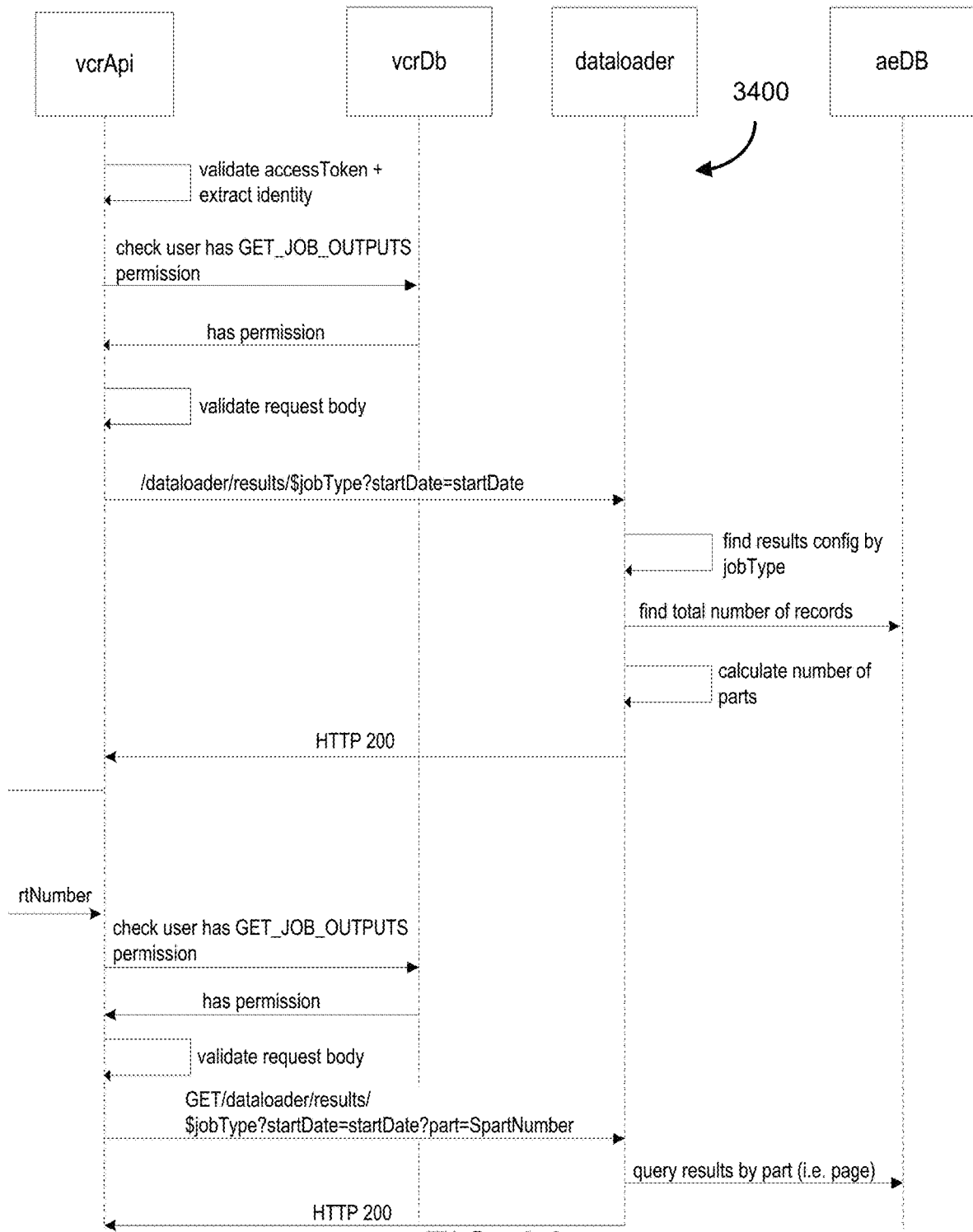
FIG. 34 is a method diagram showing an example approach for job result retrieval, according to some embodiments.

FIG. 34 is a method diagram showing an example approach for job result retrieval, according to some embodiments.

In method 3400, result data sets can be retrieved after a job has produced them. The results can be queried by a "since" date parameter that will retrieve all results since a particular date range, since multiple jobs will drop off results within the same results table.

Jobs can be automatically created by the platform (and executed). This is an optional feature which is driven by the autorun configuration setting. When autorun is set to 'true' each time a submission is created where this submission is associated to a JobType where JobConfig.autorun=true, the system will attempt to determine if all submissions for a specific JobType have landed in the system and are completed. If this is the case, VCR will create a Job resource and automatically run the job.

Logic is provided to aid the system in deciding if VCR should automatically create the Job resource. When a submission is moved to 'completed' state, the system is configured to check the JobType associated to the submission, using the JobType look up JobConfig. If autoRun is true, then the system determines if all submissions for the jobType exist in the Submissions table have status 'completed' and ARE NOT associated to a job already by checking the submissions table. The system checks SubmissionsMeta for all submissionTypes given a jobType, and checks the Submissions table to see if all of these submissions exist in this table in the 'completed' state and are not yet associated to a Job/ if they all exist then the Job has all data available to run. A new Job resource is then created, including all of these submissions as parameters Job. creatorUserId can be set to the organization system user for the organization which owns the Submission that completed, triggering the auto run.

Each onboarded organization will have created a user account known as the "organization system user". This user is used internally by the VCR platform for ownership of resources that are automatically generated by the system.

VCR has the ability to support different operational scenarios which will be requested based on campaign parameters. For example, some offer campaign constructs may only require historical data from a merchant to create an audience list and VCR can be used to analyze historical data to identify customers that have expressed previous interest in particular product types. A campaign hypothesis would be constructed by the MyOffers team to craft an offer that targets these individuals with the belief that their previous purchase history might drive more business activity.

Fulfilment only scenarios would be in response to offer constructs that reward users for transacting on specific SKU items. The results would be passed on to another process for fulfilment that might mean statement credits or rewards points balance increases for example. Finally, other offer constructs may require both audience building and fulfilment. This can also be supported by VCR provided that the audience construction and ongoing fulfilment activities are orchestrated by another party such as MyOffers which is the system of record for Offers presentment and execution.

Example types of offer integration types include audience generation segmentation, where the system is used to build an audience from records of the combined data sets, the user list is sent to an offer engine and then fulfilled. Another type of offer integration can include offer fulfillment, where MyOffers instead builds an offer audience (e.g., all senior citizens), and the VCR system is used instead to identify transactions that qualify given a SKU transaction and provides this list to MyOffers. A combination type of offer integration could include segmentation and fulfilment, where VCR is used to build an audience using historical transactions, identify qualifying transactions, and then provide them to the Offers Engine for fulfilment.

Figure 35:
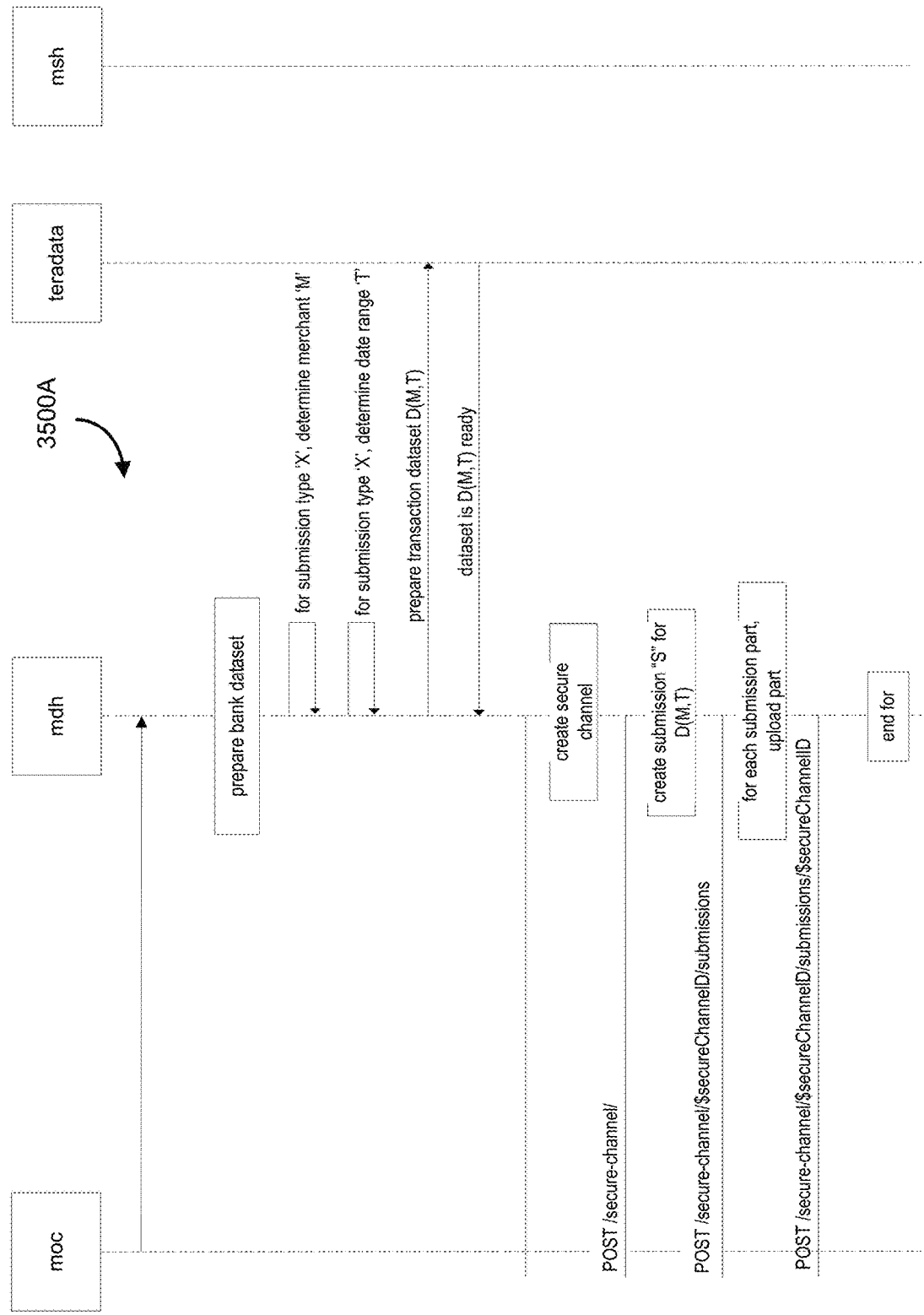
FIG. 35 is a method diagram showing an example approach for audience generation, according to some embodiments.

FIG. 35 is a method diagram showing an example approach for audience generation, according to some embodiments.

In this scenario shown in method 3500, once a merchant has provided a historical dataset necessary to create audience lists, the MyOffers integration will become aware of this and prepare a dataload into VCR that compliments the merchants dataset.

Once the data has been provided by both parties (Bank and merchant), MyOffers will instruct VCR to run an audience building job. When the audience results become available, MyOffers will make them available to a specific offer.

Figure 36:
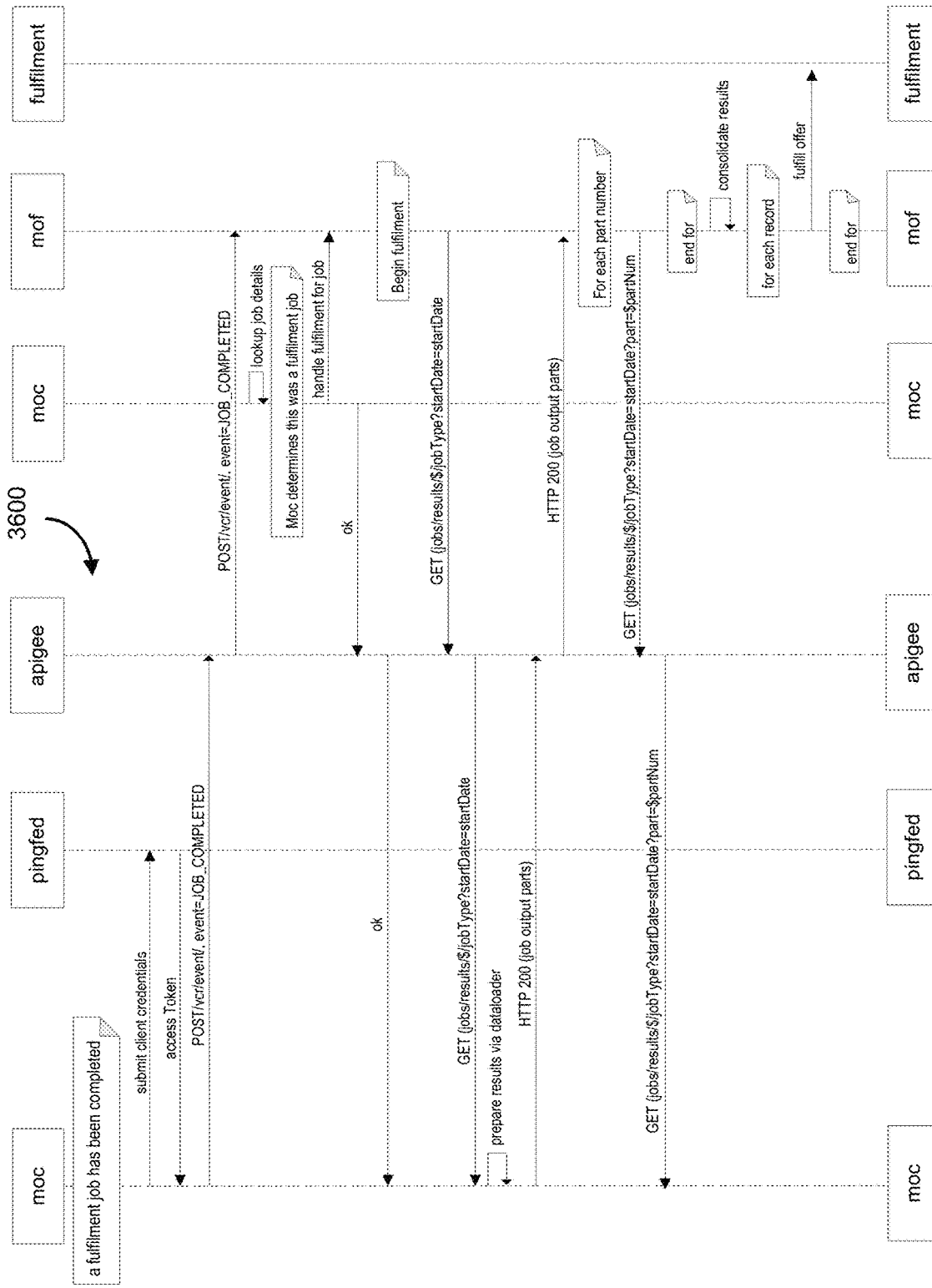
FIG. 36 is a method diagram showing an example approach for audience fulfillment, according to some embodiments.

FIG. 36 is a method diagram showing an example approach for audience fulfillment, according to some embodiments. In method 3600, after a fulfilment job executes on both Bank and Merchant data, MyOffers will receive an event indicating that the job has been completed. MyOffers will pull fulfilment data from VCR and execute it to ensure clients are rewarded.

Figure 37:
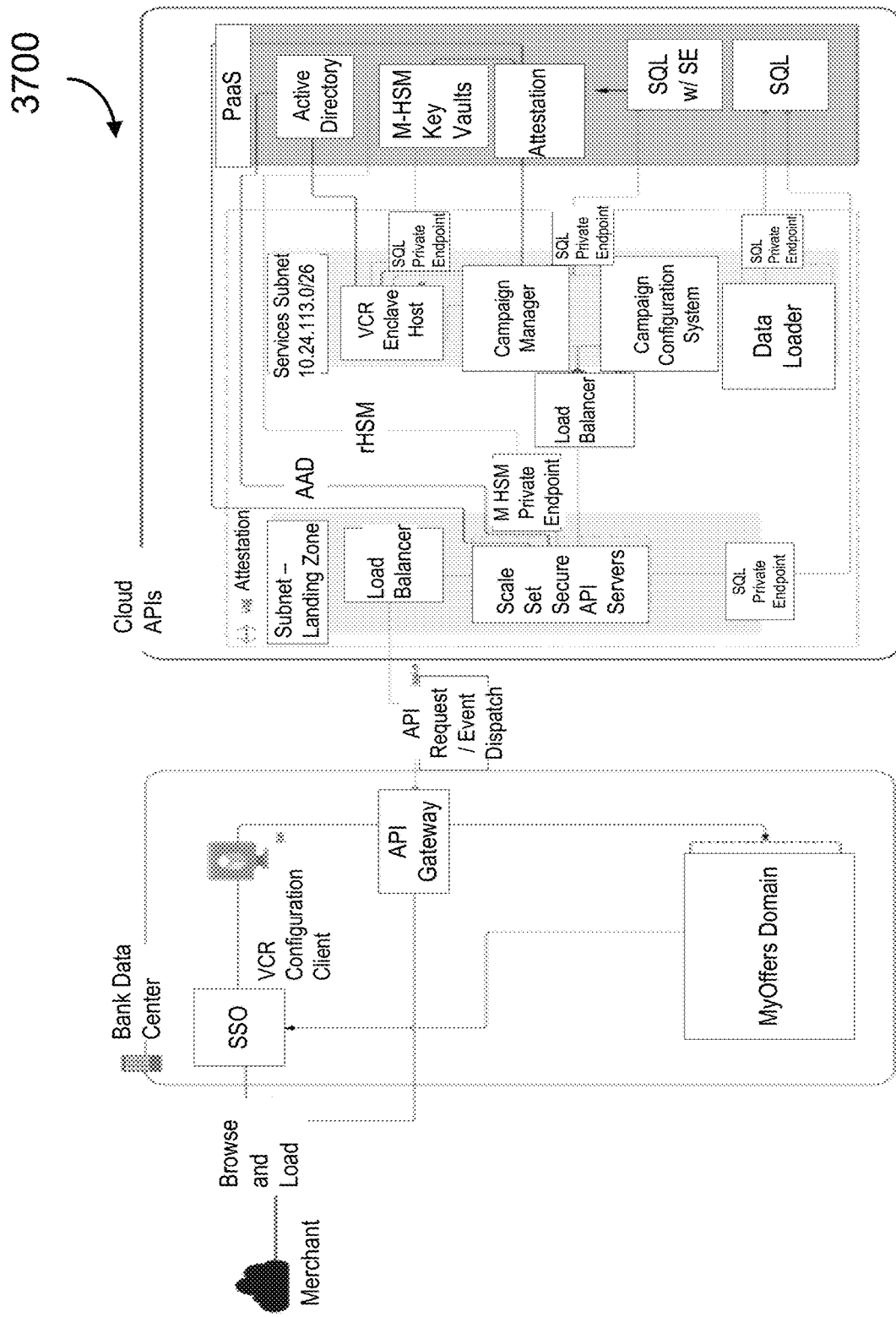
FIG. 37 is a block schematic diagram of an example architecture, according to some embodiments.

FIG. 37 is a block schematic diagram of an example architecture, according to some embodiments. In FIG. 37, an architecture 3700 is shown where a financial institution's data center is responding to an API request through an event dispatch. In this example, a scalable infrastructure is shown that is configured to autoscale when it is detected that the sidecar data process is getting too busy, adapted to trigger a horizontal scaling of an API server pool when a threshold condition is exceeded (or met).

Figure 38:
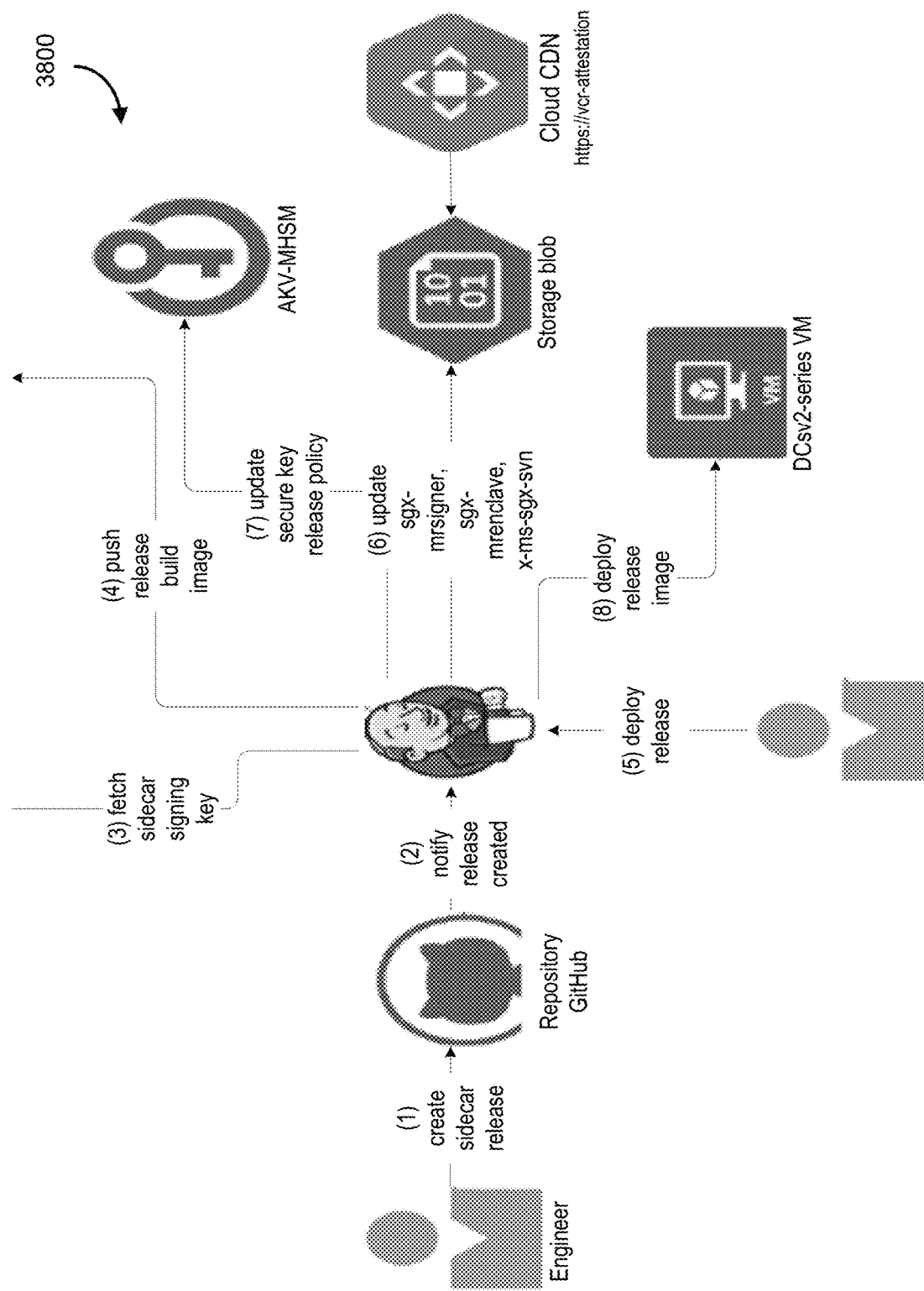
FIG. 38 is a block schematic diagram of an image deployment, according to some embodiments.

FIG. 38 is a block schematic diagram of an image deployment, according to some embodiments. In this deployment diagram 3800, after the image has been deployed it is expected that the attestation-verification endpoint is updated to reflect new attestation verification values immediately, and secure key release policies are immediately updated so that the new application image can continue to retrieve keys as needed. The system can be configured to support a rollback-to-previous image operation in the event that there needs to be a "push button" rollback that will re-deploy the last image and update both AKV-MHSM and the storage blob serving the attestation verification values.

Figure 39:
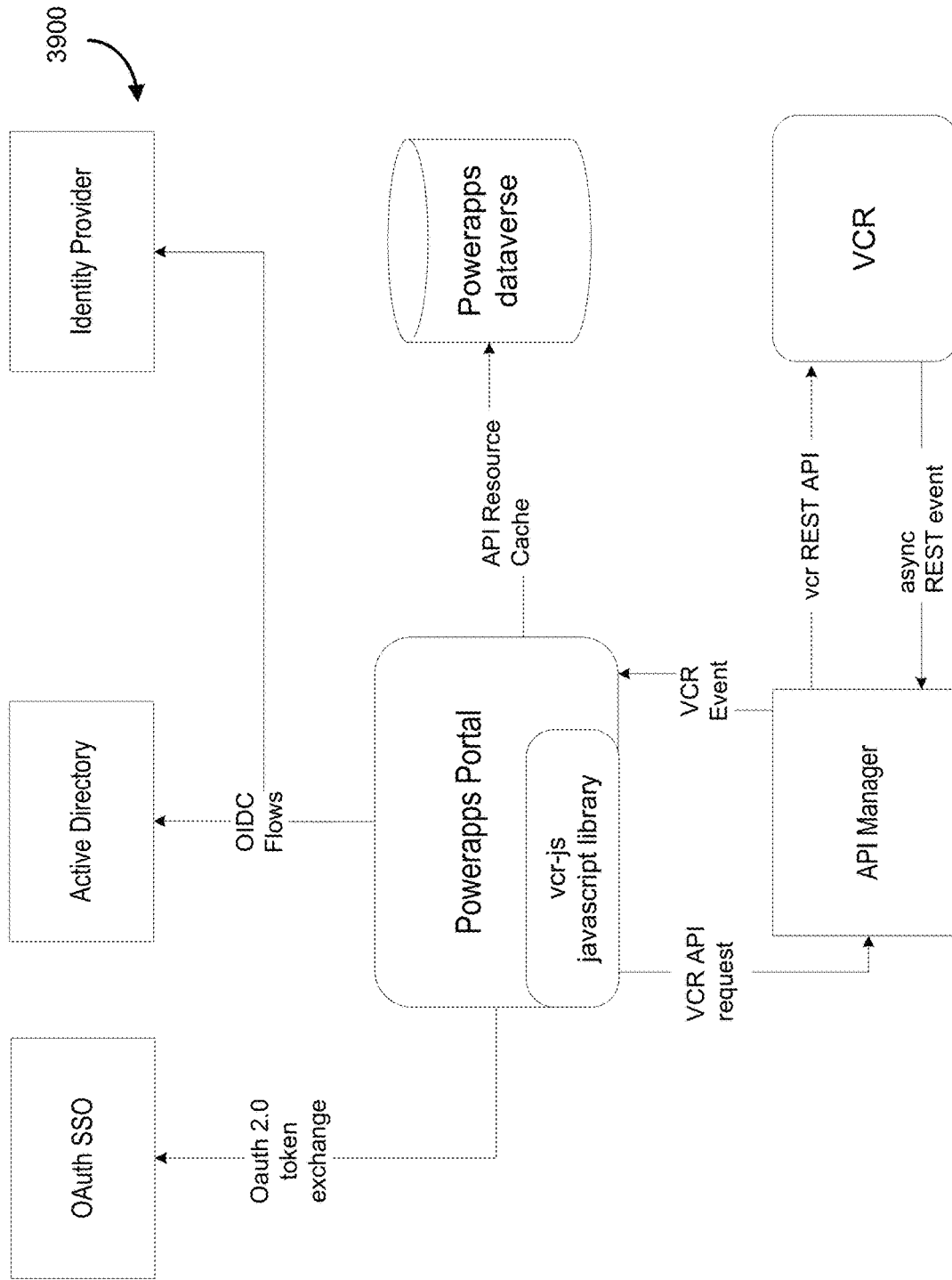
FIG. 39 is an example logical data model that can be utilized, according to some embodiments.

FIG. 39 is an example logical data model that can be utilized, according to some embodiments. The logical data model 3900 includes a set of entities, including:

JobTypesToOffers—A mapping dictionary of JobType to specific offer IDs that the campaign manager is aware of, showing one jobtype to one offer id, mapping establishing the relationship between an offer configured through the campaign config API to a specific job type.

Job—Represents a unit of work that is to be executed by the VCR platform, and associated to one or more Submissions that the job will operate upon. The Job will be associated with results produced by the job in a specific output table in the VCR AE w/ secure enclaves DB (OutputData in the model).

JobConfig—Job Type configuration, autoRun=true indicates that the VCR platform will attempt to create a Job instance and run it automatically when it detects that all of the required submissions become available.

JobTypeCollaborators—indicates which organizations collaborate on a job. Jobs often involve multi-party data submissions (bank+merchant provide inputs for example), and organizations can collaborate as inputProviders or outputReaders.

OutputData—A table for job output in the VCR AlwaysEncrypted w/ SecureEnclaves database. Job query results are inserted here. Each job type has a specific output table unique to it.

JobSubmissions—When a job is created, it will be linked to one or more submissions and this relationship is tracked here; one jobId to many submissionIds.

Submission—represents a dataset that is submitted into VCR by a user. jobs operate on these submission datasets, each unique submissionType maps to a specific database table in the VCR AlwaysEncrypted with SE DB status=waitingForData|completed SubmissionMeta—various types of submission metadata; (submissionType, jobType): job type for submission. each submission type is valid for only one job typeI; validationInstructions: validation instructions for CSV data are stored in the validation instructions column and specify columns in positional order and their expected data types; relationalMappingInstructions: relational mapping configuration is stored in the relationalMapping instructions column and specifies which table csv records should be written to and how columns in the csv map to database columns; organizationId: associations submission types to an organization. Each submission is unique to an organization.

BankSubmissionData—Table for Bank merchant transactions that will be joined against merchant skulevel transactions.

MerchantSubmissionData—Merchant sku-level transactions to be joined against BankSubmissionData.

Organization—An organization interacting with VCR APIs.

eventConfig—VCR event delivery configuration, one orgId to many eventHandlerUris, VCR will deliver job completion and submission completion events to organizations that have an eventConfig entry specifying the URI to deliver events to in the following circumstances: the submission is owned by the organization specified in the event config; the job is owned by the organization specified in the event config; the submission is owned by an organization under stewardship of the organization specified in the event config; the job is owned by an organization under stewardship of the organization specified in the event config.

SecureChannel—A resource representing the encrypted channel used by a client to submit data into VCR securely.

Audit—records of all system interactions stored for audit review.

User—A user that interacts with the system through the API. Belongs to ONE organization; userType=external|Bank|orgSystemUser Organization—Collections of users can belong to an organization. This represents one legal functional entity (Bank, or a merchant)

Permissions—Permissions can be assigned to individual users that govern their ability to interact with the platform.

Entity Field Descriptions

JobTypeToOffers
a. jobType—unique job type enum
b. offerId—unique offer id

JobTypeCollaborators
a. jobType—unique job type enum
b. organizationId—unique Organization id
c. inputProvider—boolean. an input provider organization can create Submissions for this job type and upload data against the submission
d. outputReader—boolean an output reader organization can read the outputs of a job SubmissionMeta
a. submissionType—unique submission type enum
b. description—human readable description of the submission type
c. relationalMappingInstructions—csv→relational table mapping instructions for depositing this submission into a specific DB table
d. validationInstructions—instructions to validate each field of a CSV file
e. jobType—unique job type enum—associates a submisisonType to a particular job. A submissionType is only good for one job type.
f. organizationId—unique Organization id for this submissionType Job
a. jobId—unique identifier for this job
b. status—job status enum
c. errorStatus—error description if the job has ended in error
d. errorStatusDescription—more detailed error description
e. jobType—unique enum representing the job type which is unique to organization and offer type f. creatorUserId—unique id of User that created this job
g. createdAtDateTime—dateTime when this job was created
h. parametersJson—contains a list of Submissions that this job operates on JobConfig
a. jobType—unique enum representing the job type which is unique to organization and offer type
b. autoRun—boolean value indicating that VCR should attempt to create a new Job resource when it detects that all Submissions are available for a job run JobSubmissions
a. jobId—unique job id
b. submission—unique submissions associated to a job when a job is created Permissions
a. userid—unique user id
b. permission—permission enum Submission
a. submissions—unique S of this submission
b. channels—unique id of the SecureChannel associated to this submission
c. description—human readable description of this submission
d. startDate—oldest record timestamp in dataset
e. endDate—newest record timestamp in dataset
f. clientEcdhPublicKey—users ECDH public key that the server will use to derive the shared encryption key
g. createdAtDateTime—time that the submission was created
h. creatorUserId—User id of the user that created this submission
i. submissionType—submission type enum uniquely identifying the type of this submission
j. status—status enum
k. errorStatusDescription—more detailed error description checksum—serverside computed checksum of the dataset
recordCount—total number of records that have been counted as part of this dataset User
a. Id—unique vcr user id
b. orgId—Organization id of the org this user belongs to
c. userType—type of user (internal Bank or external)
d. name—full name
e. description—human readable description of this user
f. idpUniqueUserId—user ID in their external IDP Organization
a. Id—unique id of organization
b. Name—name of organization (Bank Offers, Merchant, etc.)
c. Description—human readable description EventConfig
a. orgId—organization associated to this event configuration record
b. eventHandlerUri—event handler API endpoint
c. authConfig—authentication config for calling the endpoint. API key, client id and secret, authentication method (basic auth, bearer token, oauth flow required)

SecureChannel
a. channelId—unique id
b. encryptedECDHKeypair—encrypted ECDH keypair, encrypted by enclave
c. createdAtDateTime—when was this created
d. creatorUserId—unique User id that created this resource Audit
a. createdAtDateTime—when was this log msg created
b. userid—which user took the action resulting in audit log being created
c. message—what's the specific interaction that took place
d. entityId—what system Resource/entity was the object of the action described by this audit record In some embodiments, in the always encrypted database with secure enclave tables, all dataload tables that land submission records will have a column to identify the submissionId with records that are associated to a particular submission, and all job output tables will have a jobId table so that records can be traced to a particular job execution.

VCR Configuration can be expressed as a JSON object (e.g., VCR Configuration Object) that maps to the VCR DB. Configuration changes can be made, reviewed and stored in source control ensuring peer review prior to approval of any changes.

Changes would be pushed into the VCR system through the VCR Configuration API. Storing these configurations in source control will allow an ability to roll back to previous working configurations if necessary.

An example VCR configuration object is shown below:

```
{
"submissionMeta": [
{
"submissionType": "",
"jobType": "",
"organizationId": "",
"description": "",
"relationalMappingInstructions": "",
"validationInstructions": "",
}
],
"jobConfig": [{
"jobType": "",
"autoRun": "true|false"
}],
"jobTypesToOffers": [{
"jobType": "",
"offerId": ""
}],
"JobTypeCollaborators": [{
"jobType": "",
"organizationId": "",
"inputProvider": "T|F",
"outputReader": "T|F",
}],
"users": [{
"id": "",
"organiztionId": "",
"userType": "",
"name": "",
"description": "",
"publicKey": "",
"pingFedId": ""
}],
"organizations": [{
"id": "",
"name": "",
"description": ""
}],
"permissions": [{
"userId": "",
"permission": ""
}],
"eventConfig": [{
"organizationId": "",
"eventHandlerUri": "",
"authConfig": ""
}]
}
```

FIG. 39 is an example architecture diagram for a merchant portal, according to some embodiments. The merchant portal provided by architecture 3900 can be used to submit datasets required by VCR processes for audience building and fulfilment. VCR can define a javascript library (VCR-JS) which mediates all interactions between a user and the VCR platform from within a web browser. This design will can be used to expose VCR to not only the Powerapps portal, but any web application, and guarantee that all data is securely ingested into VCR directly from a user's host machine. VCR-JS is the VCR javascript integration library. It can be used to embed into webpages that integrate with the VCR platform. It takes care of tasks such as authentication and wraps the VCR APIs to simplify integration activities. The portal library can, for example, be a javascript library that will provide portal pages with the capability to integrate with the VCR API, and libraries may be utilized in respect of cryptographic operations, encryption, and ECDH key operations, as well as file system access APIs adapted for reading data from disks, streaming bytes into workload chunks, among others.

The VCR API is exposed via an API manager that is adapted to work with a token authority, which can be used to perform a token exchange such that these tokens are "converted" into tokens that the API manager accepts. The VCR-JS library will expect to receive an active directory access token. The library will call a token exchange endpoint exposed by a single sign on engine to exchange this token for a single sign on engine issued token and store it within the library's memory. The token authority can be used to verify whether tokens are expired, to validate cryptographic signatures, among others, and specific sub-tokens or values can be utilized as an idpUniqueUserID field as a link between IP identities and VCR identities.

Figure 40:
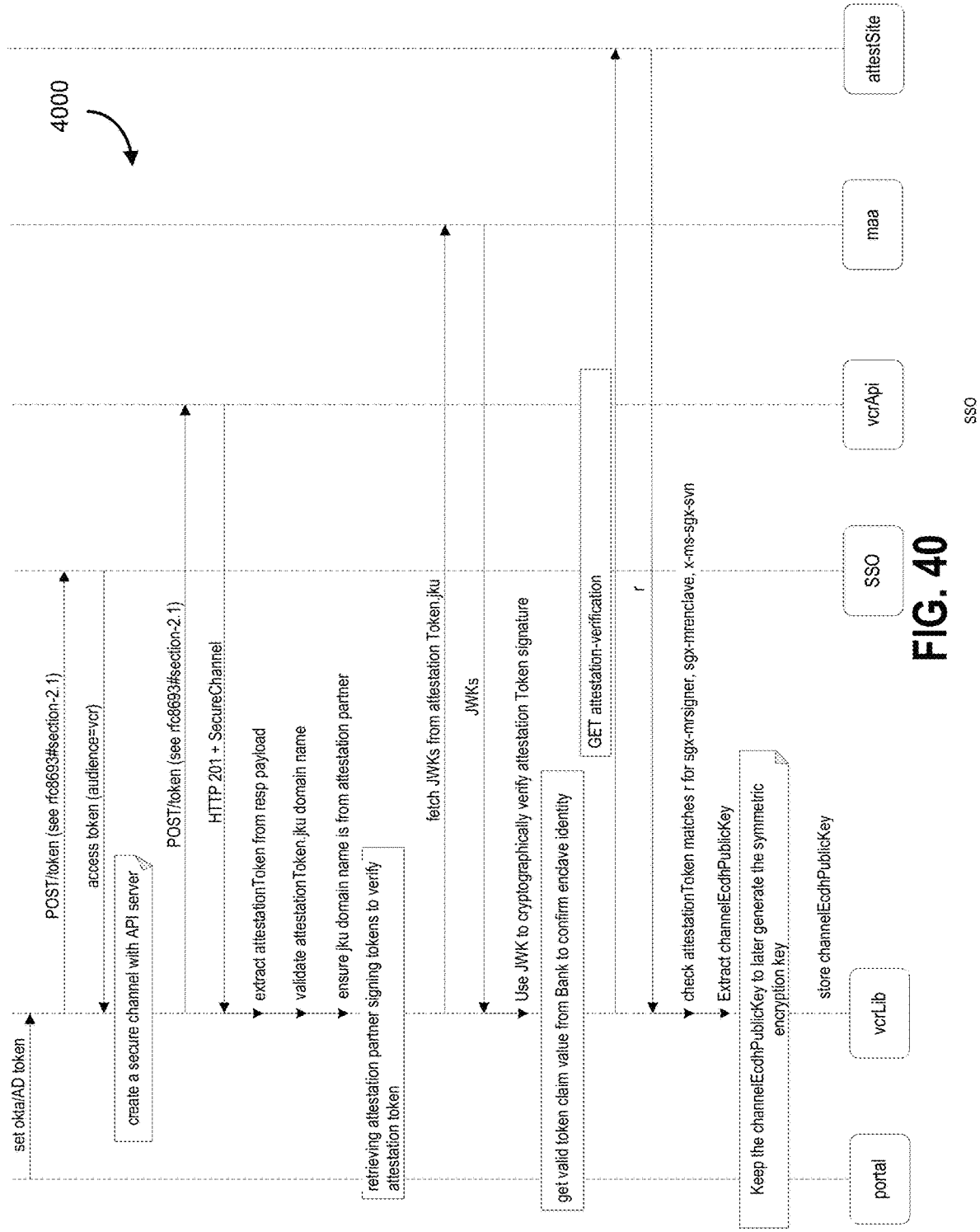
FIG. 40 is an example method diagram showing a method for a secure channel and being used to verify an attestation token, and to confirm enclave identity, according to some embodiments.

FIG. 40 is an example method diagram showing a method for a secure channel and being used to verify an attestation token, and to confirm enclave identity, according to some embodiments. As shown in method 4000, prior to submitting any data to VCR a secure channel must be established between the client and the VCR platform. The secure channel resource will deliver an attestation that the client will use to decide if it wants to continue a confidential conversation with the VCR platform.

If the attestation checks out in that it is cryptographically valid and signed by a valid attestation authority, with valid claims about the contents of the enclave, the client can proceed. The attestation will include a public key that was generated within an enclave that will be used to derive a shared channel key. This shared channel key is known only to the client (e.g., partner data repository) and to an enclave, such that only the enclave is capable of decrypting data presented to it by the client. No other party along the network of hops will be able to decrypt the payload submitted by the client. Webcrypto functions can be used to generate a shared key with the API server.

In FIG. 40, sgx-mrsigner is the hash of the enclave author's public key which is used to sign the enclave binary. By validating MRSIGNER via an attestation policy, customers can verify if trusted binaries are running inside an enclave. When the policy claim does not match the enclave author's MRSIGNER, it implies that the enclave binary is not signed by a trusted source and the attestation fails.

sgx-mrenclave is one of the enclave measurements which can be used to verify the enclave binaries. It is the hash of the code running inside the enclave. The measurement changes with every change to the enclave binary code. By validating MRENCLAVE via an attestation policy, customers can verify if intended binaries are running inside an enclave. However, as MRENCLAVE is expected to change frequently with any trivial modification to the existing code, it is recommended to verify enclave binaries using MRSIGNER validation in an attestation policy.

x-ms-sgx-svn is a number whereby the enclave author assigns a Security Version Number (SVN) to each version of the SGX enclave. When a security issue is discovered in the enclave code, enclave author increments the SVN value post vulnerability fix. To prevent interacting with insecure enclave code, customers can add a validation rule in the attestation policy. If the SVN of the enclave code does not match the version recommended by the enclave author, attestation will fail.

attestationServiceHost is a host address of the attestation service. In some embodiments, it is necessary for the client creating submissions to the VCR platform to validate that hostname in the "iss" claim of the attestation token as the token is signed by a self signed certificate. An attestation token is a token that is to be verified to establish the identity of an enclave and the application running within it. The token can contain enclave public key to generated shared data key for input encryption, and must be cryptographically verified.

Figure 41:
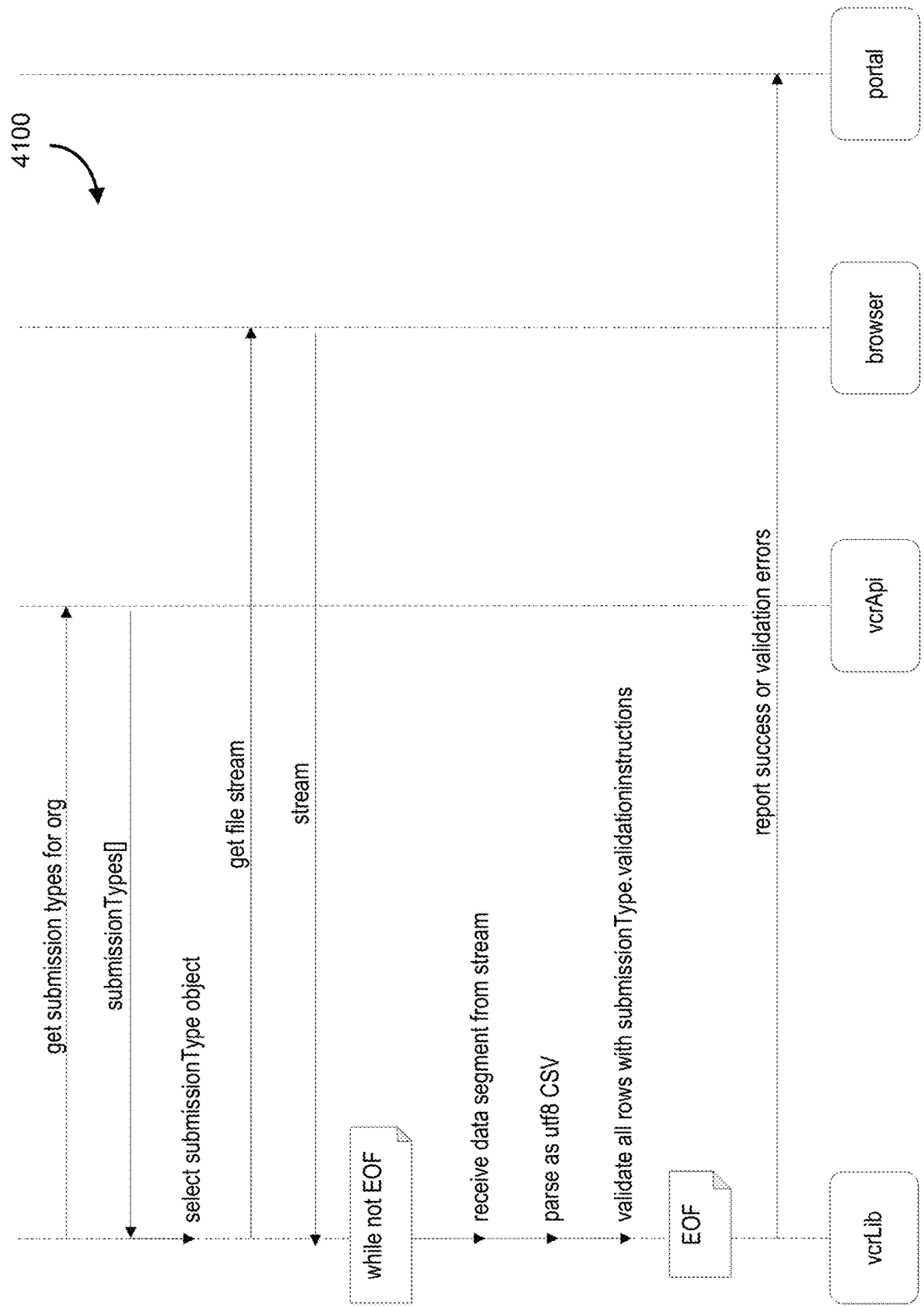
FIG. 41 is an example method diagram showing a method for validating data, according to some embodiments.

FIG. 41 is an example method diagram showing a method for validating data, according to some embodiments. As shown in method 4100, the client validates submission data before uploading anything to VCR.

The first pass through the data is typically used to validate the structure of the csv file and make assertions about the datatypes, field structure and domain of acceptable values. CSV validation data is associated with a SubmissionType and is accessible to clients through the API.

Figure 42:
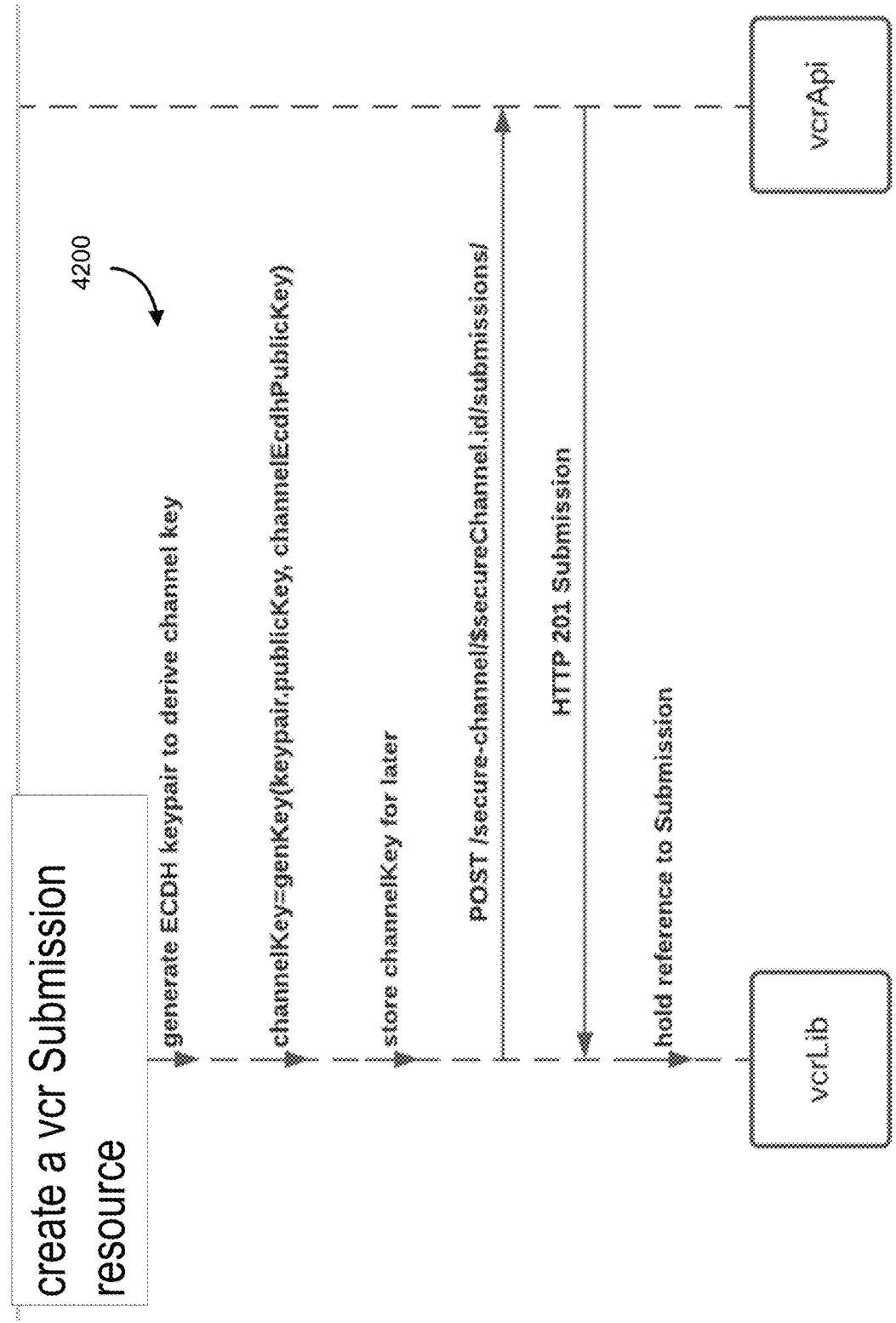
FIG. 42 is an example method diagram showing a method for validating data, according to some embodiments.

FIG. 42 is an example method diagram showing a method for validating data, according to some embodiments. As shown in method 4200, once a secure channel is established, the client can begin the next step in the dataload process by creating a submission. A submission is a data object that represents a dataset that has been provided to VCR by a client. The submission resource itself is not the data but an object that describes it and provides a reference to it so that the platform can operate upon the data. It can be contemplated as dataset metadata.

Figure 43:
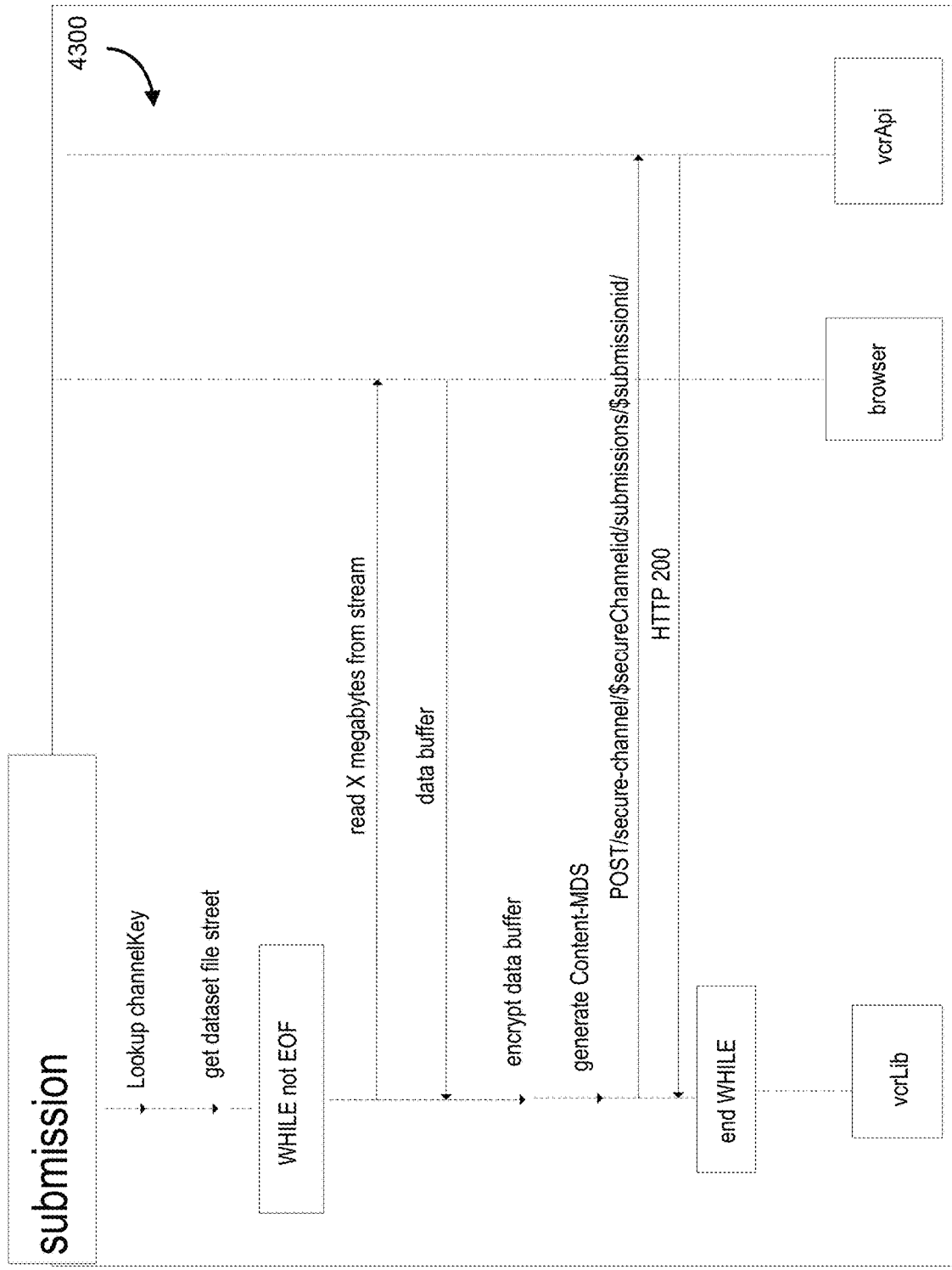
FIG. 43 is an example method diagram showing a method for uploading a submission, according to some embodiments.

FIG. 43 is an example method diagram showing a method for uploading a submission, according to some embodiments. In method 4300, once a data validation has been created and a Submission has been created, data transfer to VCR can begin using the shared encryption key only known between the client and the receiving enclave.

In addition to receiving requests from a client such as the portal, the VCR system can also deliver events to the client through an Events API. Authentication can take place between the API Manager and implementers of the events API.

The events API endpoint can be implemented by any clients of VCR that wish to receive notifications that can be used to drive job workflow. VCR is an event-driven system that deals with primitives Submissions and Jobs. Submission completion events indicate that a Job may be ready for execution. Job completion events indicate that results may be available for retrieval.

Figure 44:
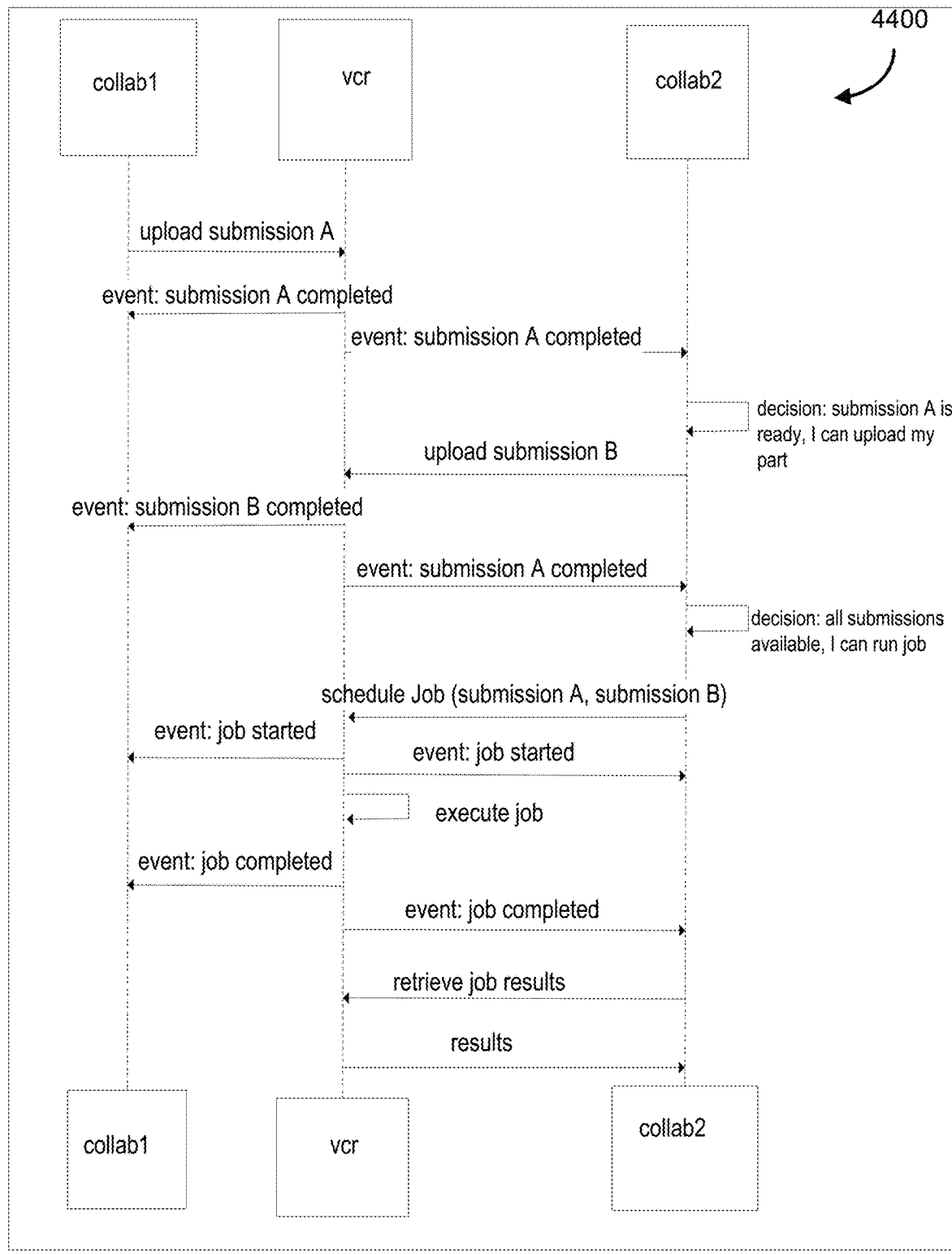
FIG. 44 is an example method diagram showing a method for event delivery of results, according to some embodiments.

FIG. 44 is an example method diagram showing a method for event delivery of results, according to some embodiments. In method 4400, an example of 2 organizations collaborating within VCR by sharing datasets and triggering a job run. One of the collaborators in this case is entitled to retrieve results.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the embodiments described herein are intended to include within their scope such processes, machines, manufacture, compositions of matter, means, methods, or steps.

As can be understood, the examples described above and illustrated are intended to be exemplary only.

What is claimed is:

1. A computer implemented system for operating a trusted execution environment maintaining a segregated data processing subsystem:
    a computer readable memory having a protected memory region that is encrypted such that it is inaccessible to both an operating system and kernel system, the protected memory region including at least a data storage region and a data processing subsystem storage region maintaining the segregated data processing subsystem;
    a computer readable cache memory; and
    a secure enclave data processor operating a data custodian data process for automated policy enforcement of one or more data protection policies, the data custodian data process configured to:
        receive a query data object representing a proposed query to be operated on one or more protected database elements having access controlled by the segregated data processing subsystem on the protected memory region;
        apply the one or more data protection policies operable on the query data object to determine whether the query data object adheres to the one or more data protection policies;
        upon a determination that the query data object adheres to the one or more data protection policies, provide a control message to an attestation process to validate that the data custodian data process is operating on the secure enclave data processor and to receive an attestation token data object from the attestation process;
        transmit the attestation token data object to release one or more data protection keys; and
        access the one or more protected database elements using the data protection keys and cause execution of the proposed query to receive a query response data object.

2. The system of claim 1, wherein data stored on the one or more protected database elements are coupled with one or more data protection attributes to be adhered to prior to any release of the data, wherein the data includes at least one of web query data and purchase transaction data, and the one or more data protection attributes are represented in metadata indicative of a user's tracked privacy preferences.

3. The system of claim 2, wherein the one or more data protection attributes includes restrictions on a type of query computation to be performed on the one or more protected database elements.

4. The system of claim 1, wherein the control message includes one or more characteristics of the secure enclave data processor operating the data custodian data process, and the attestation token is generated only when the control message is successfully validated.

5. The system of claim 4, wherein the one or more characteristics of the secure enclave data processor include an identification or a hash representation of a version of a software operating the secure enclave data processor.

6. The system of claim 1, wherein the attestation token data object includes a data exchange public key.

7. The system of claim 6, wherein the data exchange public key is utilized to encrypt the query response data object to generate an encrypted output data object.

8. The system of claim 1, wherein the one or more data protection policies include one or more data owner specific policies.

9. The system of claim 1, wherein a subset of the one or more data protection policies are applied to the query response data object to validate that the query response data object adheres to the subset of the one or more data protection policies.

10. The system of claim 1, wherein the one or more protected database elements are encrypted during times when the data is at rest on a server, during movement between a client and a server, and while the data is in use.

11. A computer implemented method for operating a trusted execution environment maintaining a segregated data processing subsystem coupled to a computer readable memory having a protected memory region that is encrypted such that it is inaccessible to both an operating system and kernel system, the protected memory region including at least a data storage region and a data processing subsystem storage region maintaining the segregated data processing subsystem; a computer readable cache memory; and a secure enclave data processor operating a data custodian data process for automated policy enforcement of one or more data protection policies, the method comprising:
    receiving a query data object representing a proposed query to be operated on one or more protected database elements having access controlled by the segregated data processing subsystem on the protected memory region;
    applying the one or more data protection policies operable on the query data object to determine whether the query data object adheres to the one or more data protection policies;
    upon a determination that the query data object adheres to the one or more data protection policies, providing a control message to an attestation process to validate that the data custodian data process is operating on the secure enclave data processor and to receive an attestation token data object from the attestation process;

transmitting the attestation token data object to release one or more data protection keys; and accessing the one or more protected database elements using the data protection keys and cause execution of the proposed query to receive a query response data object.

12. The method of claim 11, wherein data stored on the one or more protected database elements are coupled with one or more data protection attributes to be adhered to prior to any release of the data; wherein the data includes at least one of web query data and purchase transaction data, and the one or more data protection attributes are represented in metadata indicative of a user's tracked privacy preferences.

13. The method of claim 12, wherein the one or more data protection attributes includes restrictions on a type of query computation to be performed on the one or more protected database elements.

14. The method of claim 11, wherein the control message includes one or more characteristics of the secure enclave data processor operating the data custodian data process, and the attestation token is generated only when the control message is successfully validated.

15. The method of claim 14, wherein the one or more characteristics of the secure enclave data processor include an identification or a hash representation of a version of a software operating the secure enclave data processor.

16. The method of claim 11, wherein the attestation token data object includes a data exchange public key.

17. The method of claim 16, wherein the data exchange public key is utilized to encrypt the query response data object to generate an encrypted output data object.

18. The method of claim 11, wherein the one or more data protection policies include one or more data owner specific policies.

19. The method of claim 11, wherein a subset of the one or more data protection policies are applied to the query response data object to validate that the query response data object adheres to the subset of the one or more data protection policies.

20. A non-transitory computer readable medium storing machine interpretable instructions, which when executed by a processor, cause the processor to perform a computer implemented method for operating a trusted execution environment maintaining a segregated data processing subsystem coupled to a computer readable memory having a protected memory region that is encrypted such that it is inaccessible to both an operating system and kernel system, the protected memory region including at least a data storage region and a data processing subsystem storage region maintaining the segregated data processing subsystem; a computer readable cache memory; and a secure enclave data processor operating a data custodian data process for automated policy enforcement of one or more data protection policies, the method comprising:

receiving a query data object representing a proposed query to be operated on one or more protected database elements having access controlled by the segregated data processing subsystem on the protected memory region;

applying the one or more data protection policies operable on the query data object to determine whether the query data object adheres to the one or more data protection policies;

upon a determination that the query data object adheres to the one or more data protection policies, providing a control message to an attestation process to validate that the data custodian data process is operating on the secure enclave data processor and to receive an attestation token data object from the attestation process;

transmitting the attestation token data object to release one or more data protection keys; and accessing the one or more protected database elements using the data protection keys and cause execution of the proposed query to receive a query response data object.

* * * * *